(12) United States Patent
Guemmer

(10) Patent No.: US 7,387,487 B2
(45) Date of Patent: Jun. 17, 2008

(54) TURBOMACHINE WITH FLUID SUPPLY

(75) Inventor: Volker Guemmer, Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 354 days.

(21) Appl. No.: 10/996,601

(22) Filed: Nov. 26, 2004

(65) Prior Publication Data

US 2005/0141990 A1    Jun. 30, 2005

(30) Foreign Application Priority Data

Nov. 26, 2003    (DE)   .............................. 103 55 241

(51) Int. Cl.
*F01D 5/14*    (2006.01)
(52) U.S. Cl. .................. 415/115; 416/97 R; 416/90
(58) Field of Classification Search ............... 415/115, 415/116, 914, 97 R, 90, 91, 92
See application file for complete search history.

(56) References Cited

U.S. PATENT DOCUMENTS

| | | | |
|---|---|---|---|
| 2,933,238 A | 4/1960 | Stalker | |
| 3,066,912 A | 12/1962 | Scheper | |
| 3,572,960 A | 3/1971 | McBride | |
| 3,694,102 A | 9/1972 | Conrad | |
| 3,846,038 A | 11/1974 | Carriere | |
| 3,993,414 A | 11/1976 | Meauze | |
| 4,155,680 A | 5/1979 | Linko | |
| 4,415,310 A | 11/1983 | Bouiller | |
| 4,642,027 A | 2/1987 | Popp | |
| 5,059,093 A | 10/1991 | Khalid | |
| 5,203,162 A | 4/1993 | Burge | |
| 5,230,605 A | 7/1993 | Yamaguchi | |
| 5,327,716 A | 7/1994 | Giffin | |
| 5,480,284 A | 1/1996 | Wadia | |
| 5,762,034 A | 6/1998 | Foss | |
| 5,876,182 A | 3/1999 | Schulte | |
| 6,109,868 A | 8/2000 | Burlman | |
| 6,302,640 B1 | 10/2001 | McKelvey | |
| 6,574,965 B1 | 6/2003 | Feulner | |
| 6,585,479 B2 | 7/2003 | Torrance | |
| 6,663,346 B2 | 12/2003 | Munsell | |
| 7,097,414 B2 | 8/2006 | Stangeland | |

(Continued)

FOREIGN PATENT DOCUMENTS

DE     889 506     10/1953

(Continued)

OTHER PUBLICATIONS

German Search Report dated Aug. 3, 2004.

*Primary Examiner*—Edward K. Look
*Assistant Examiner*—Dwayne J White
(74) *Attorney, Agent, or Firm*—Timothy J. Klima

(57) ABSTRACT

A turbomachine with at least one rotor (6), no or at least one stator (7), and a casing (1), with the rotor (6) comprising several rotor blades (8) attached to a rotating shaft, and with the stator (7) being provided with stationary stator blades (9). The casing (1) is passed by a fluid flowing through rotor (6) and stator (7), and means for the supply of fluid are provided on at least one blade (8, 9) of a blade row of the rotor (6) and/or the stator (7) on aerodynamically critical locations on trailing edge and rim-near surfaces (HRO).

20 Claims, 46 Drawing Sheets

U.S. PATENT DOCUMENTS

| | | |
|---|---|---|
| 2003/0026695 A1 | 2/2003 | Schmuecker |
| 2004/0081552 A1 | 4/2004 | Gummer |
| 2005/0019152 A1 | 1/2005 | Seitz |
| 2005/0226717 A1 | 10/2005 | Xu |
| 2006/0104805 A1 | 5/2006 | Gummer |

FOREIGN PATENT DOCUMENTS

| | | |
|---|---|---|
| DE | 1 042 828 | 11/1958 |
| DE | 1428188 | 11/1968 |
| DE | 3407945 | 9/1985 |
| DE | 19632207 | 2/1998 |
| DE | 10135003 C1 | 10/2002 |
| DE | 102 33 032 | 1/2004 |
| DE | 10330084 A1 | 3/2004 |
| EP | 0497574 B1 | 9/1995 |
| EP | 0718469 B1 | 12/1995 |
| EP | 0719908 B1 | 3/2000 |
| EP | 1 013 937 | 6/2000 |
| EP | 1 286 022 | 2/2003 |
| GB | 619 722 | 3/1949 |
| GB | 987625 | 3/1965 |

Fluid supply device on HRO, type C (representation, part 3)
Exemplified for the case N = 3 (3 slots or substitutes)
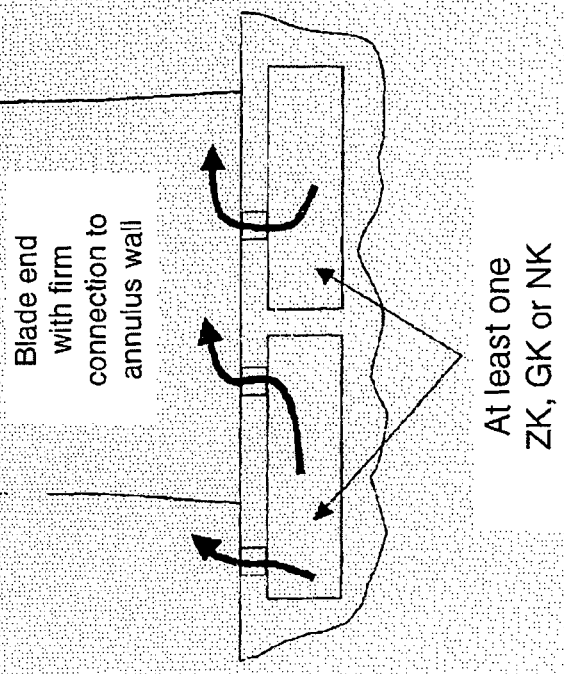
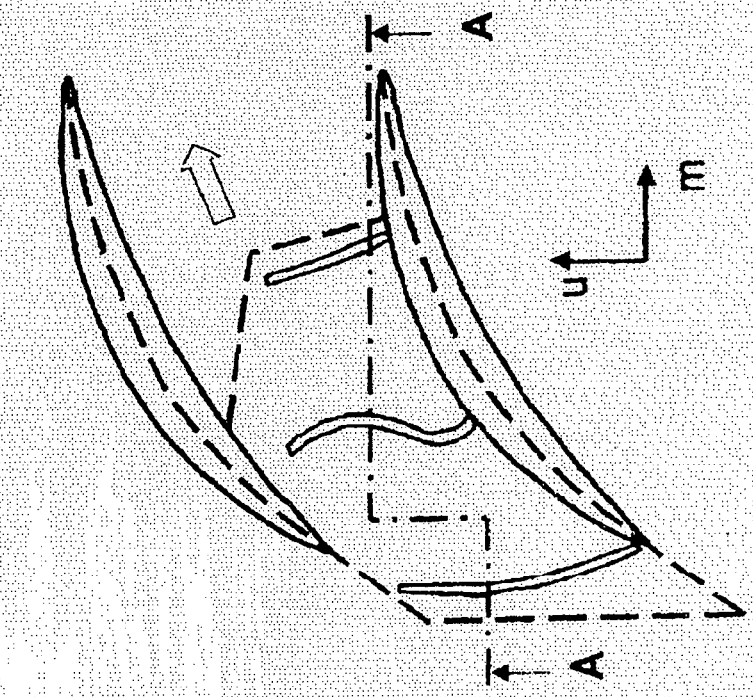
Fig. 25

Fig. 26 Fluid supply device on HRO, type C (representation, part 4)
Exemplified for the case N = 3 (3 slots or substitutes)

Fig. 32 Fluid supply device on HRO, type D (representation, part 2b)
Configuration with annulus setback and fluid supply via annular slots, N = 2

Fig. 33 Fluid supply device on HRO, type D (representation, part 2c)
Configuration with annulus setback and fluid supply via annular slots or substitutes Fig. 34 Fluid supply device on HRO, type D (representation, part 2d)
Configuration with annulus setback and fluid supply via annular slots or substitutes Fig.36 Fluid supply device on HRO, type E (representation, part 1b)
Exemplified for one individual slot (N = 1)

Section P - P $0° <= \gamma <= 120°$

Fig.37 Fluid supply device on HRO, type E (representation, part 1c)
Exemplified for a double slot arrangement (N = 2) or replacement of slot by short-slot row Fig. 41 Definition "Suction-side, intensity-variable fluid supply (SIFZ)"

Fig. 42 Definition "Suction-side, intensity-variable fluid supply (SIFZ)"

Fig. 43  Examples of devices for "SIFZ"

TURBOMACHINE WITH FLUID SUPPLY

This application claims priority to German Patent Application DE10355241.3 filed Nov. 26, 2003, the entirety of which is incorporated by reference herein.

BACKGROUND OF THE INVENTION

The present invention relates to turbomachines, such as blowers, compressors, pumps and fans of the axial, semi-axial and radial type. The working medium may be gaseous or liquid.

More particularly, this invention relates to a turbomachine with at least one rotor, with the rotor comprising several rotor blades attached to a rotating shaft. At least one stator can exist, with the stator being provided with stationary stator blades. A casing can exist which confines the passage of fluid through the rotor and the stator in the outward direction.

The aerodynamic loadability and the efficiency of turbomachines, for example blowers, compressors, pumps and fans, is limited by the growth and the separation of boundary layers on the blades as well as on the hub and casing walls.

The state of the art only partly provides solution to this fundamental problem. While various concepts for the fluid supply on turbine blades exist, these are not transferable to turbomachines since they primarily serve for surface cooling, not for boundary layer energization. Concepts are known from compressor cascade experiments in which air is blown out from a pressurized chamber inside the blade to the blade suction side to energize the two-dimensional profile boundary layer. Related alternative solutions provide for direct passage of the fluid from the blade pressure side to the blade suction side. Additionally, for rotors, a concept exists for the supply of air on hub and casing via axially symmetrical slots to influence the wall boundary layers there. Finally, publications of research institutes exist showing concepts in which rotors are blown at by individual nozzles near the casing to favorably influence the radial gap flow there. Accordingly, the general concept of influencing the boundary layer by blowing in or supplying fluid is provided in the state of the start, but the known solutions are trivial and only partly effective.

FIG. 1 schematically shows the solutions known from the state of the art. The figure schematically shows a hub 11 and a casing 1 between which a fluid flow passes from the left-hand side, as indicated by the big arrow. Also shown is a blade 2, belonging either to a rotor 6 or a stator 5, with the visible area of this blade being the suction side. As indicated by the arrows, drafts exist for a local air supply at different points of the turbomachine. In the case of rotor and stator blading, as well as plane experimental blade cascades, it is known to blow in fluid on the blade suction side between the leading edge and approximately 60 percent of the profile depth via slots 4 to influence the two-dimensional profile boundary layer. Here, the necessary fluid enters the main flow path from a pressurized cavity inside the blade 2. In alternative solutions, the blade profile is divided to enable fluid to be supplied by direct passage from the blade pressure side to the blade suction side.

In the case of a rotor, it is known to supply fluid on the hub 11 and/or the casing 1 before or within the area of the forward 50 percent of the profile depth via an axially symmetrical slot 3 to influence the boundary layer on the wall. Additionally, for rotors with radial gap of the casing, concepts exist according to which fluid is locally blown in on the casing via a number of nozzles 3 protruding into the flow path to influence the gap flow of the rotor at discrete locations on the circumference.

Only one solution, which is not described herein, provides for removal on the blade suction side and reflow on another location of the same blade, viz. the blade tip.

Accordingly, the state of the art describes the following methods of fluid supply:

1.) by straight slots in the forward and middle area of the blade suction side on rotors and stators,
2.) by axially symmetrical, areally flush slots in hub and/or casing far before the blade trailing edge on rotors with radial gap of the casing,
3.) by a number of circumferentially distributed, protruding individual nozzles on the casing before rotors with radial gap of the casing.

Most of these concepts either are only partially geared to aerodynamically particularly problematic zones within the blade passage or are simply orientated to a two-dimensional profile envelopment, without considering the complex, three-dimensional aerodynamic processes in the side wall area (near the hub and the casing). Others are only of limited effectiveness, although they are geared to locally critical flow zones.

Usually, in the state of the art, auxiliary air with higher pressure is externally supplied. Only one Patent Specification provides for air supply via slots on a further downstream location of the turbomachine.

The above described state of the art is documented in writing in the following publications:

U.S. Pat. No. 5,690,473 (Turbine blade having transpiration strip cooling and method of manufacture)

U.S. Pat. No. 6,334,753 (Streamlined bodies with counter-flow fluid injection)

U.S. Pat. No. 2,870,957 (Compressors)

U.S. Pat. No. 2,933,238 (Axial flow compressors incorporating boundary layer control)

U.S. Pat. No. 5,480,284 (Self bleeding rotor blade)

In the state of the art, it is disadvantageous that the existing solutions are not highly effective and, in particular, are unfavorable with regard to the efficiency of the turbomachinery. Rather, the existing blow-in concepts are relatively primitive and provide for blowing-in fluid either on the blade suction side only or in combination with blowing-in fluid before or within the blade row via axially symmetric annular slots on the hub and/or the casing. Apparently, there is a lack of concepts for specifically influencing the flow in the rim-near area and for influencing the airfoil boundary layers in a radially variable way (in the direction of the blade height). A non-axially symmetrical fluid supply on the side walls before or within the bladed region or also on blade tips in the running gap is not taken into consideration, although it is particularly advisable to have influence on the side wall boundary layers at the problem origin. Specifically influencing the three-dimensional flow processes in the area of the blade ends (and the associated flow exchange in the direction of the blade height) is not taken into account in the existing concepts.

BRIEF SUMMARY OF THE INVENTION

A broad aspect of the present invention is to provide a turbomachine of the type specified above which, while avoiding the disadvantages of the state of the art, is characterized by exercising a highly effective influence on the boundary layer due to controlled fluid supply and by high efficiency.

It is a particular object of the present invention to provide solution to the above problems by a combination of the characteristics described below. Further advantageous embodiments of the present invention will be apparent from the present description.

The turbomachine according to the present invention can comprise one or more stages, each with one rotor and one stator; in isolated cases, the stage may also consist of a rotor only.

According to the present invention, the rotor includes a number of blades which are connected to the rotating shaft of the turbomachine and impart energy to the working medium. The rotor can be shrouded or shroudless at the outer blade end. According to the present invention, the stator includes a number of stationary blades with fixed or free blade ends on the casing side and on the hub side.

The rotor drum and the blading according to the present invention are usually enclosed by a casing, in other cases, such as aircraft or ship propellers, no such casing exists.

According to the present invention, the turbomachine may also be provided with a stator upstream of the first rotor, a so-called inlet guide vane assembly.

In accordance with the present invention, at least one stator or inlet guide vane assembly, instead of being fixed, can be variable to change the angle of attack. A spindle accessible from the outside of the annulus can, for example, accomplish such a variation.

The turbomachine may, in a special form, also be provided with at least one row of variable rotors.

In an alternative configuration of the turbomachine according to the present invention, multi-stage types of said turbomachine may have two counter-rotating shafts, with the direction of rotation of the rotor blade rows alternating between stages. Here, no stators exist between subsequent rotors.

In accordance with the present invention, the turbomachine may alternatively also have a bypass configuration, with the single-flow annulus dividing into two concentric annuli behind a certain blade row, with each of these annuli housing at least one further blade row.

Specifically, according to the present invention, a turbomachine has been provided which comprises means for the supply of fluid on at least one blade of a blade row of the rotor and/or the stator on aerodynamically critical locations on trailing edge and rim-near surfaces (HRO). Here, the required openings on the wetted surfaces of the machine are axially symmetrical, provided that they are outside the limits of the bladed zone given in the meridional view and are located in places which protrude from the plain annulus wall into the main flow path. The required openings are non-axially symmetrical, provided that they are outside the limits of the bladed zone given in the meridional view and flush with the plain annulus wall.

Alternatively, or in addition to the fluid supply devices on trailing edge and rim-near surfaces (HRO), the turbomachine, in accordance with the present invention, is provided with means for fluid supply on at least one blade of a rotor or stator row, these means being distributed over a defined area in meridional flow direction, not pointwise, on the blade suction side, with the meridional extension in meridional flow line-orthogonal direction decreasing towards at least one of the annulus walls (hub or casing) (suction-side, intensity-variable fluid supply—SIFZ).

BRIEF DESCRIPTION OF THE DRAWINGS

The present invention is more fully described in the light of the accompanying drawings showing preferred embodiments. In the drawings, FIGS. 23 to 26 show variants of a fluid supply device in accordance with the present invention on trailing edge and rim-near surfaces (HRO) of the type C.

DETAILED DESCRIPTION OF THE INVENTION

Figure 1:
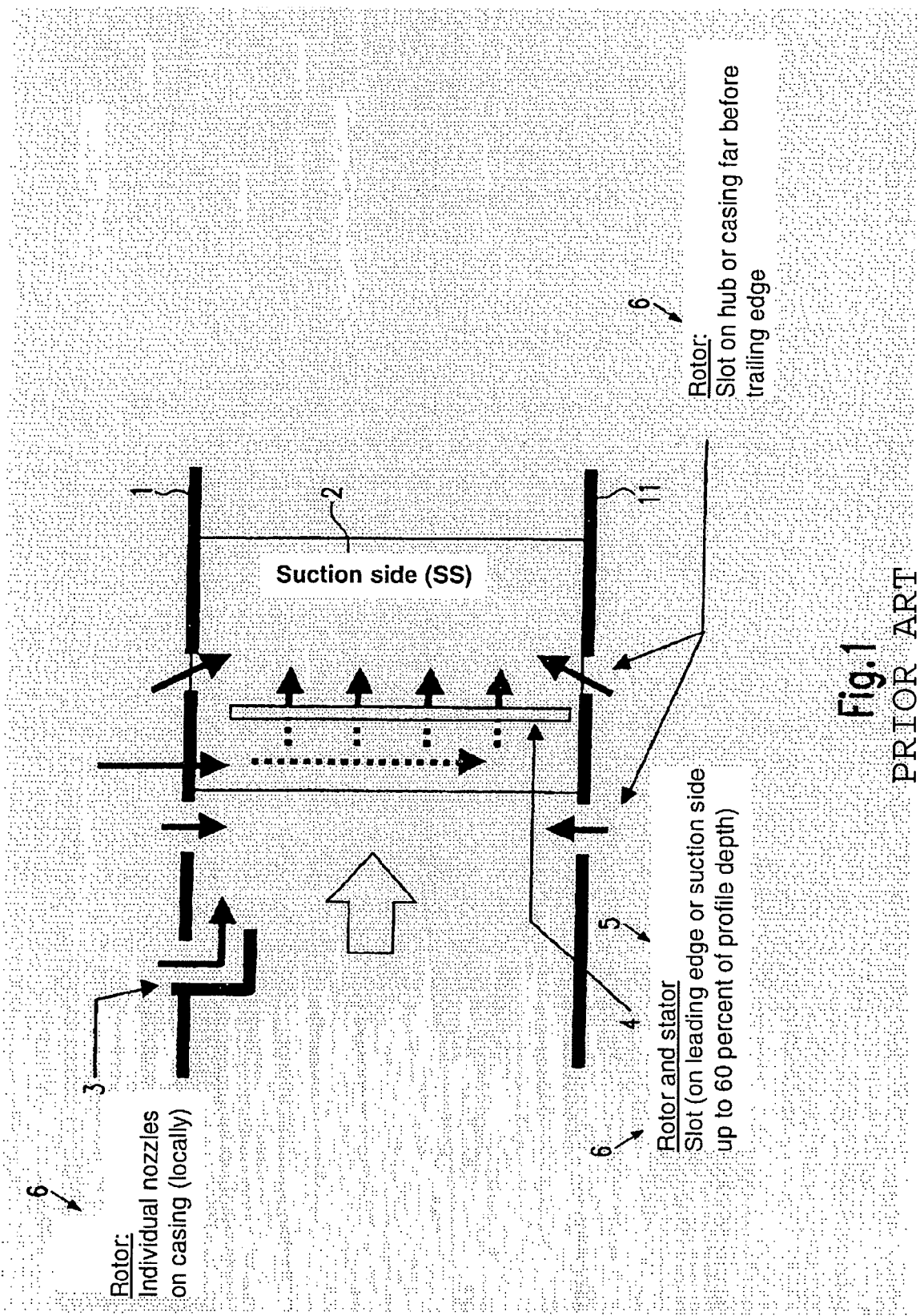
FIG. 1 is a schematic representation of the state of the art.
Figure 2:
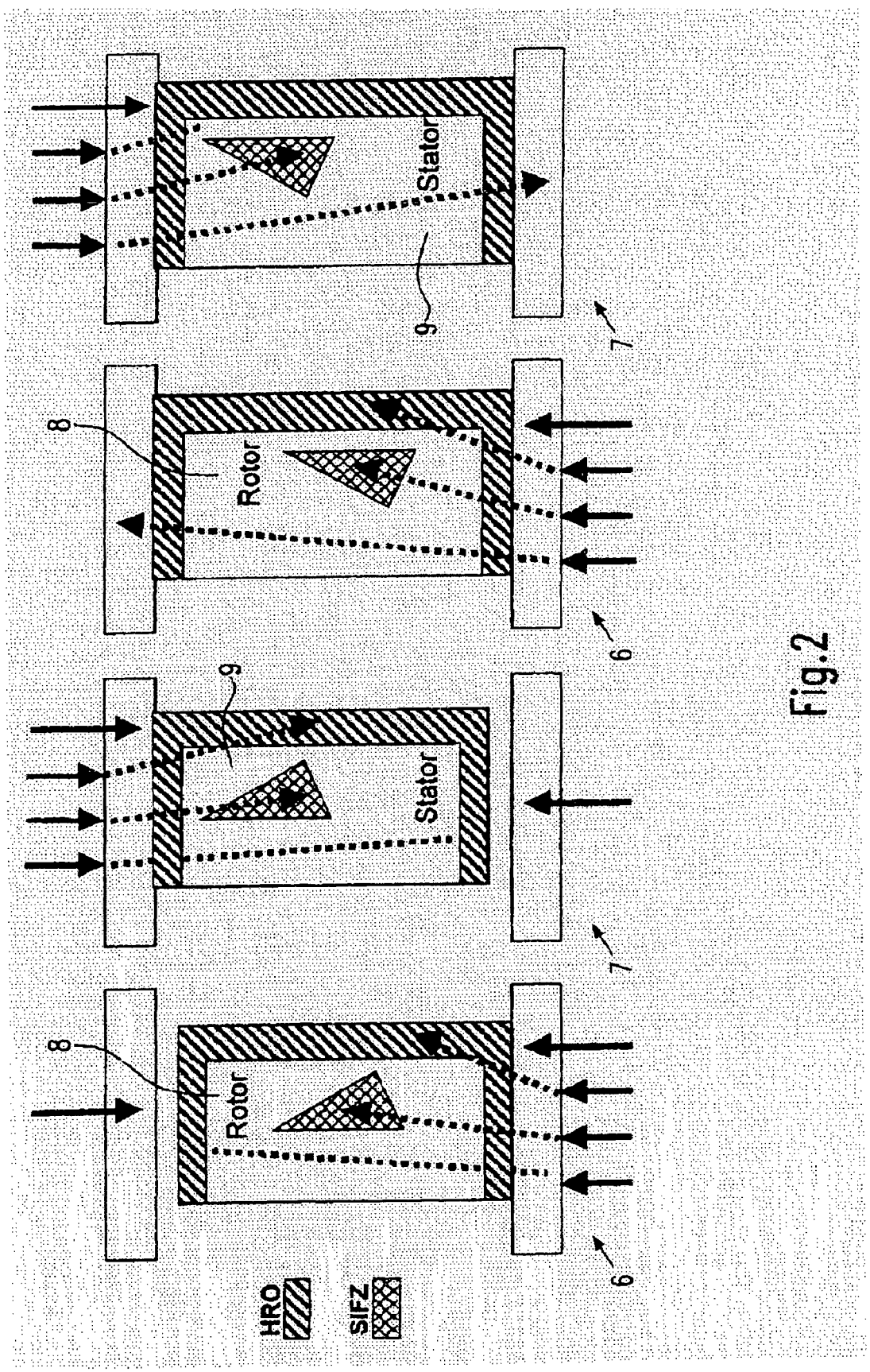
FIG. 2 is a schematic representation of variants of the basic concept in accordance with the present invention.

FIG. 2 shows, in highly simplified representation, the solution according to the present invention on four differently configured blade rows, each comprising a rotor 6 or a stator 7, respectively, which are provided with rotor blades 8 or stator blades 9, respectively. Reference numeral 1 shows, in highly simplified representation, a casing or an outer shroud. Reference numeral 11 designates a rotor drum or an inner shroud. The selected view of the blade may represent both, the suction side and the pressure side of the respective blade. On rotors and stators, a zone for suction-side, intensity-variable fluid supply (SIFZ) is provided.

Figure 3:
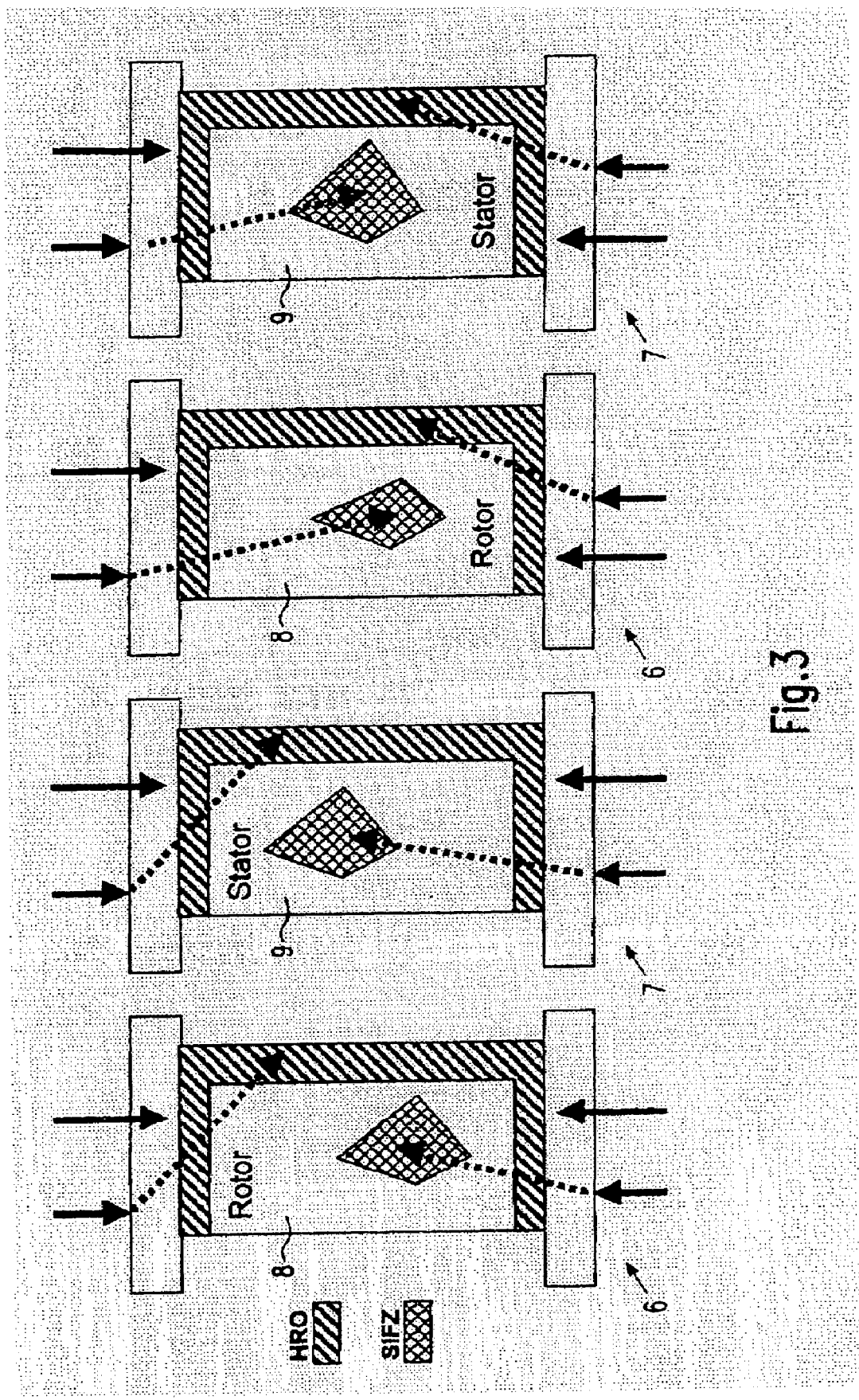
FIG. 3 is a further schematic representation of variants of the basic concept in accordance with the present invention.
Figure 4A:
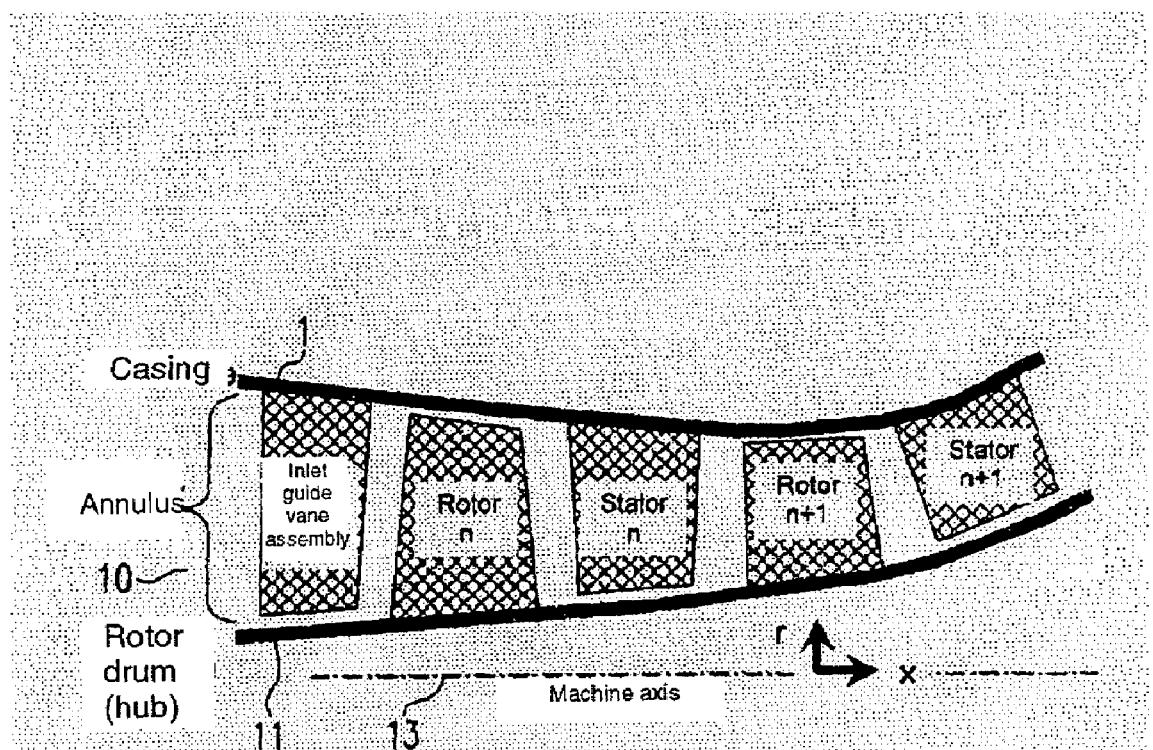
FIG. 4 shows different variants and configurations of the turbomachine in accordance with the present invention.
Figure 4B:
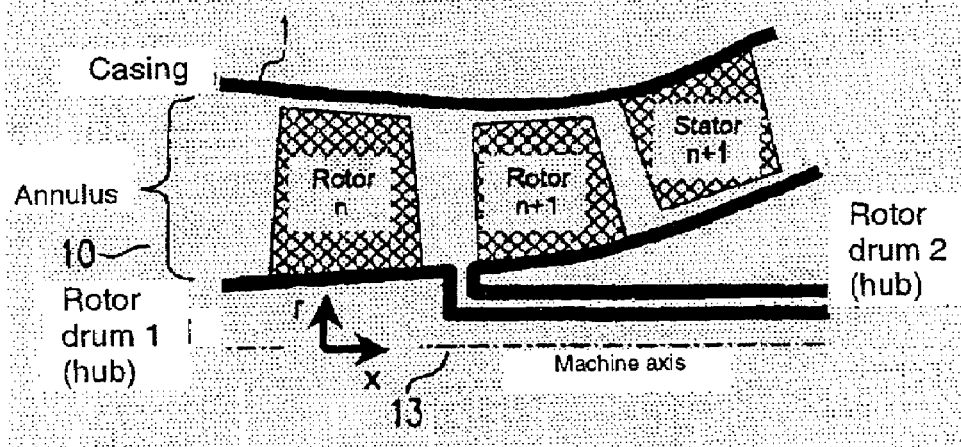
Figure 4C:
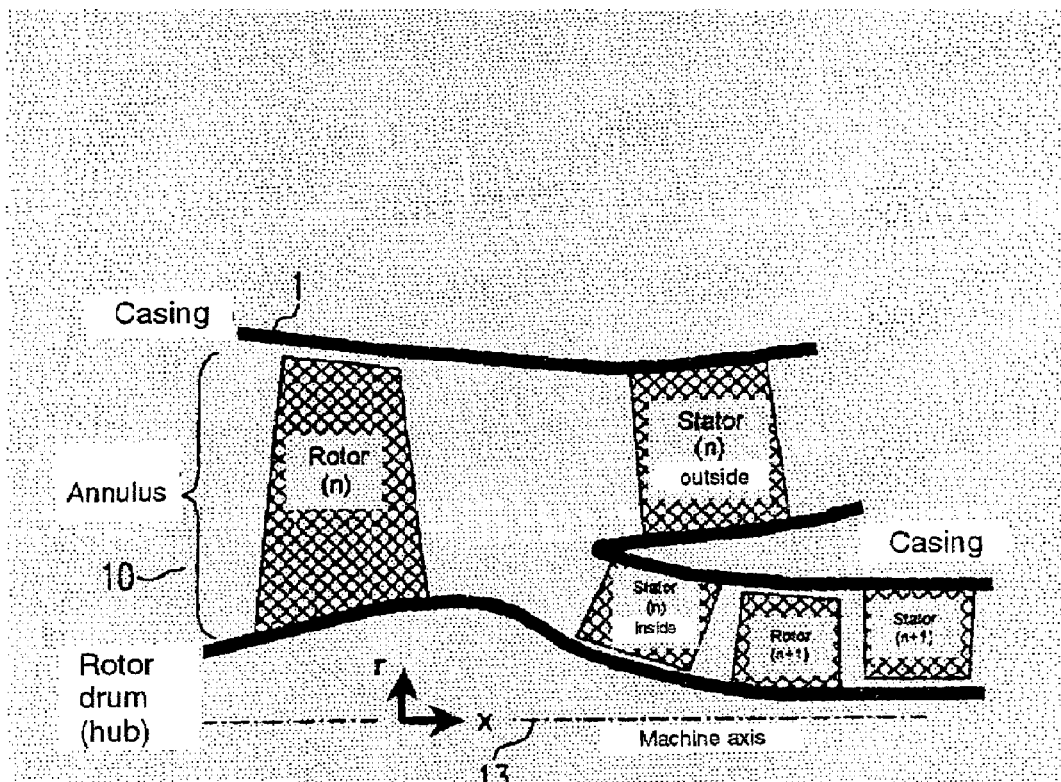
Figure 4D:
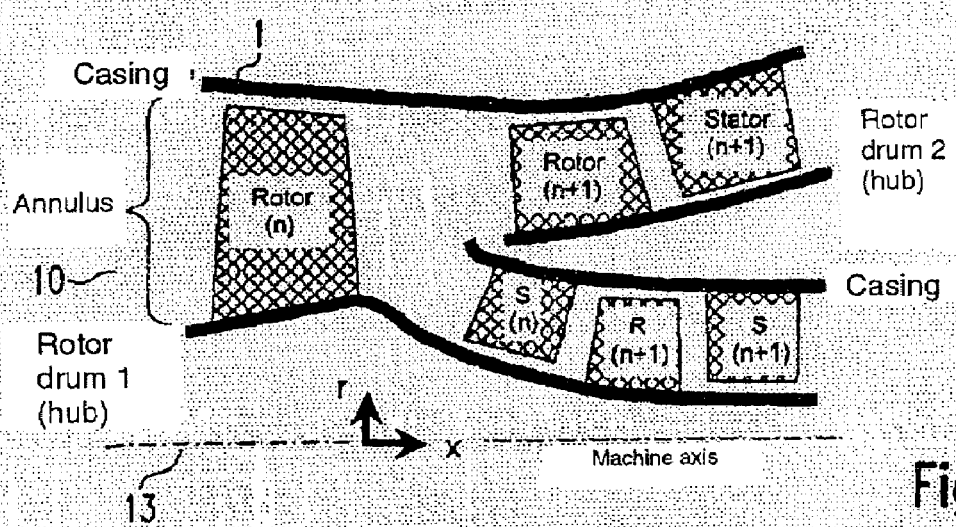

FIG. 3 analogically shows the basic concept according to the present invention.

FIG. 4 shows four different configurations of the turbomachine according to the present invention. Here, reference numeral 10 indicates an annulus through which fluid will pass from the left-hand to the right-hand side, reference numeral 13 indicates the machine axis around which a rotor drum (hub) 11 rotates. In the examples shown in FIGS. 5B and 5D, a further rotor drum (hub) is provided. The rotors, stators and the inlet guide vane assembly are identified in FIG. 5, with one blade being schematically shown in each case.

Figure 5:
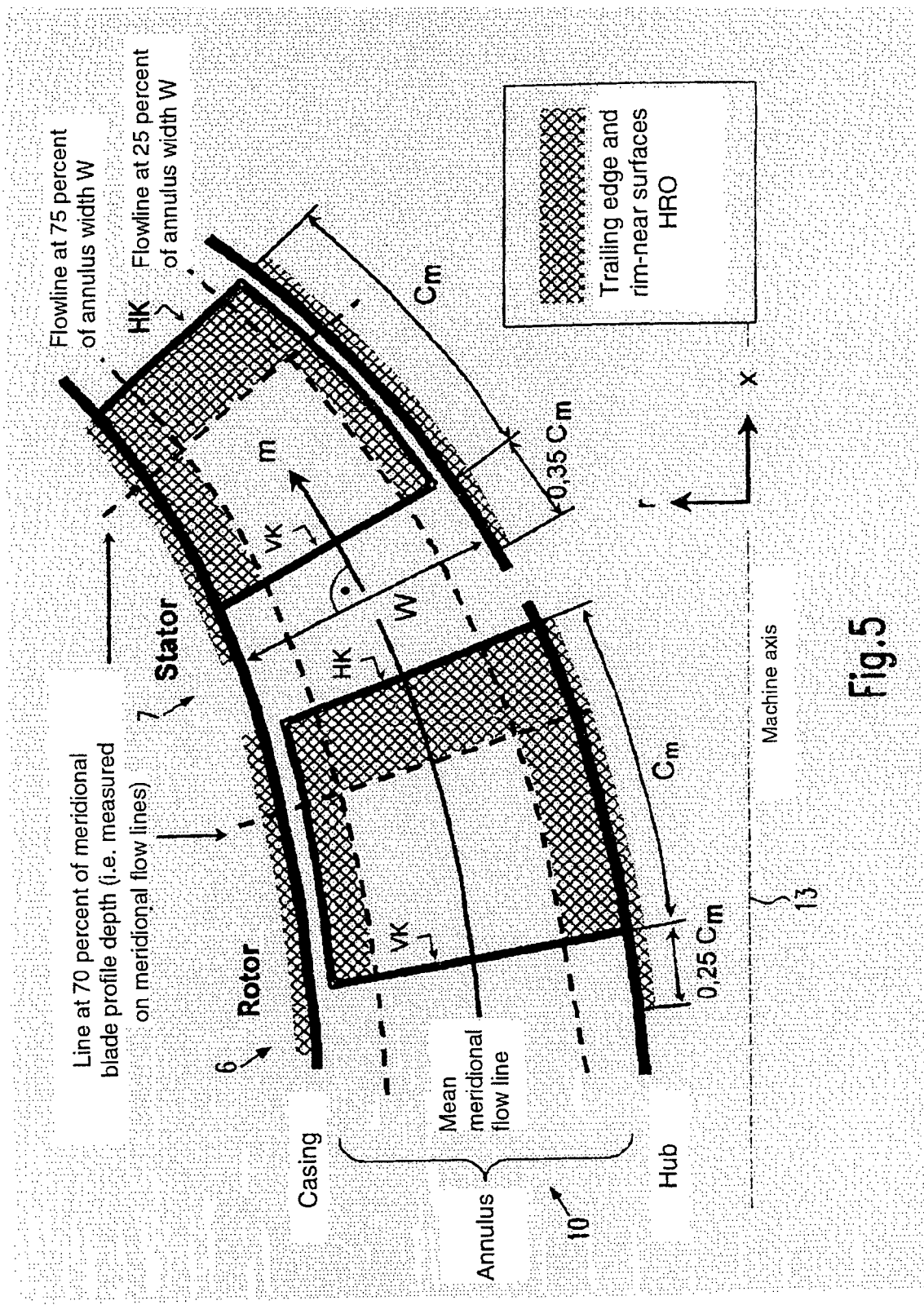
FIG. 5 is a representation regarding the definition of the term HRO in accordance with the present invention.

FIG. 5 shows the definition of the trailing edge and rim-near surfaces (HRO) according to the present invention. Again in simplified representation, a rotor 6 and a stator 7 are shown, these being arranged in the annulus 10 between a casing 1 and a hub (rotor drum) 11.

Figure 6:
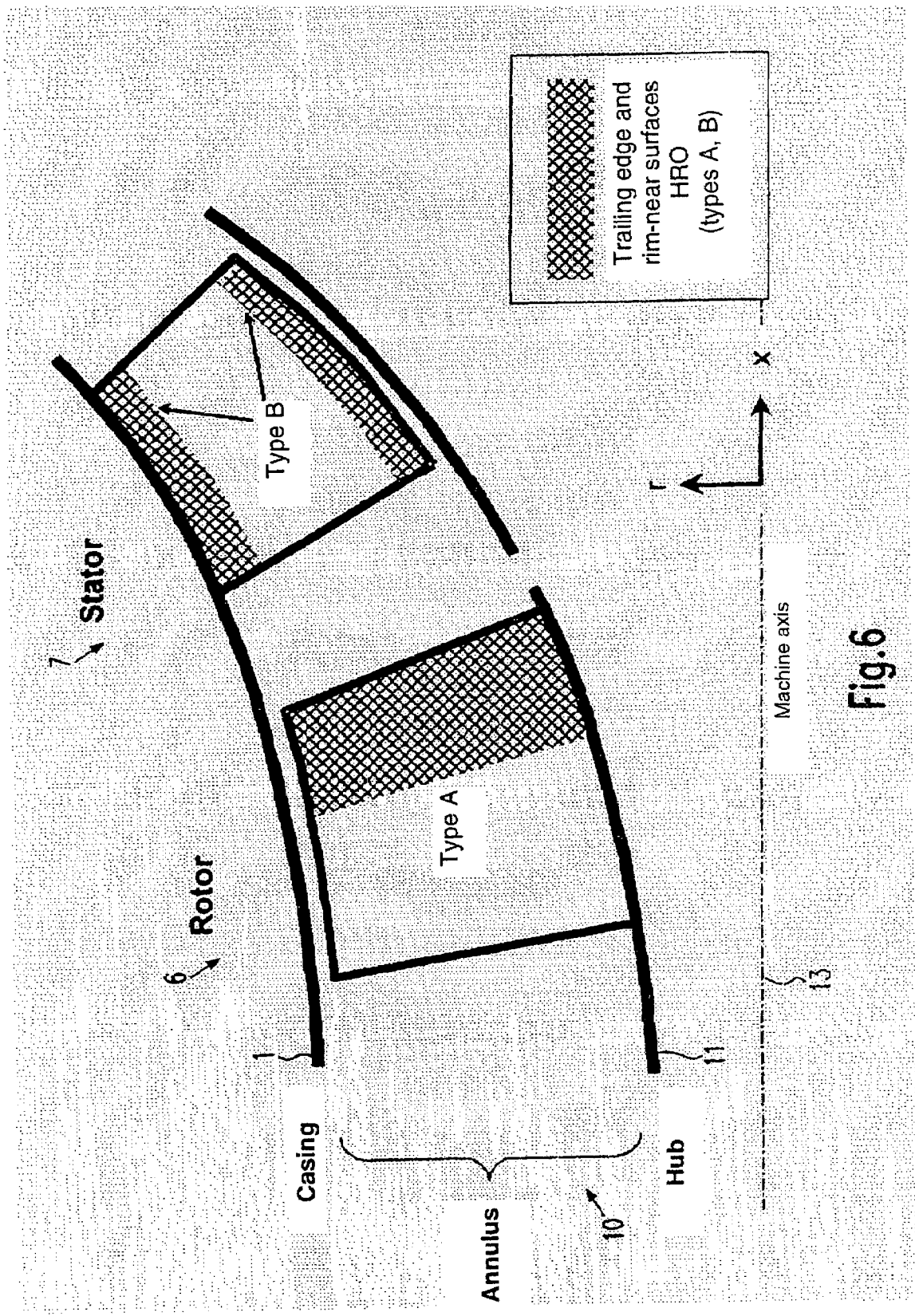
FIG. 6 is a representation regarding the definition of the term HRO, types A and B in accordance with the present invention.
Figure 7:
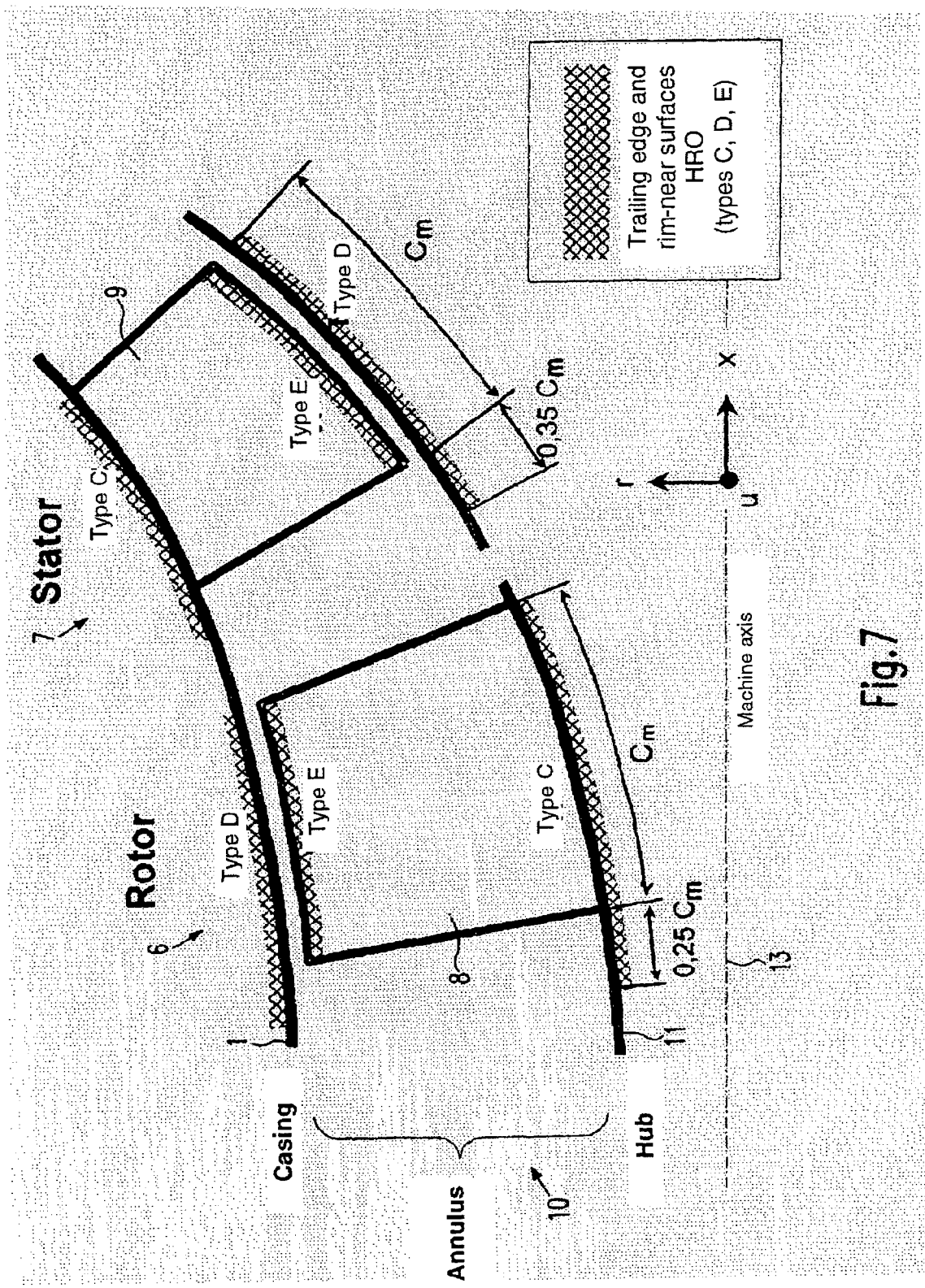
FIG. 7 is a representation regarding the definition of the term HRO, types C, D and E in accordance with the present invention.

As shown in the representations of FIGS. 6 and 7, there are five HRO types according to the present invention:

HRO, Type A: The surfaces are arranged on the blade suction or pressure side of a rotor or stator, actually between 70 and 100 percent of the meridional blade chord length Cm. Here, surface sectors in the central area of the trailing edge whose surface normal forms an angle of less than 60 degrees to the mean outlet flow direction are excluded.

HRO, Type B: The surfaces are arranged on the blade suction side, the blade pressure side, the leading edge or the trailing edge of a rotor or a stator, actually on the hub between 0 and 25 percent of the local annulus width W and on the casing between 75 and 100 percent of the local annulus width W.

HRO, Type C: The surfaces are arranged on the hub or the casing contour of the annulus with firm connection to the blade, as in the case of platforms, shrouds, blisk and bling configurations, actually between the trailing edge plane HK and a plane situated 25 percent of the meridional chord length of the blade Cm before the leading edge VK.

HRO, Type D: The surfaces are arranged on the hub and the casing contour of the annulus (10) in the area of free blade ends (above shroudless rotors or below shroudless stators) between the trailing edge plane HK and a plane situated 35 percent of the meridional chord length of the blade Cm before the leading edge VK.

HRO, Type E: The surfaces are arranged on blades at their free ends facing the hub or the casing contour of the annulus 10 (tip end faces of the blade).

Figure 8:
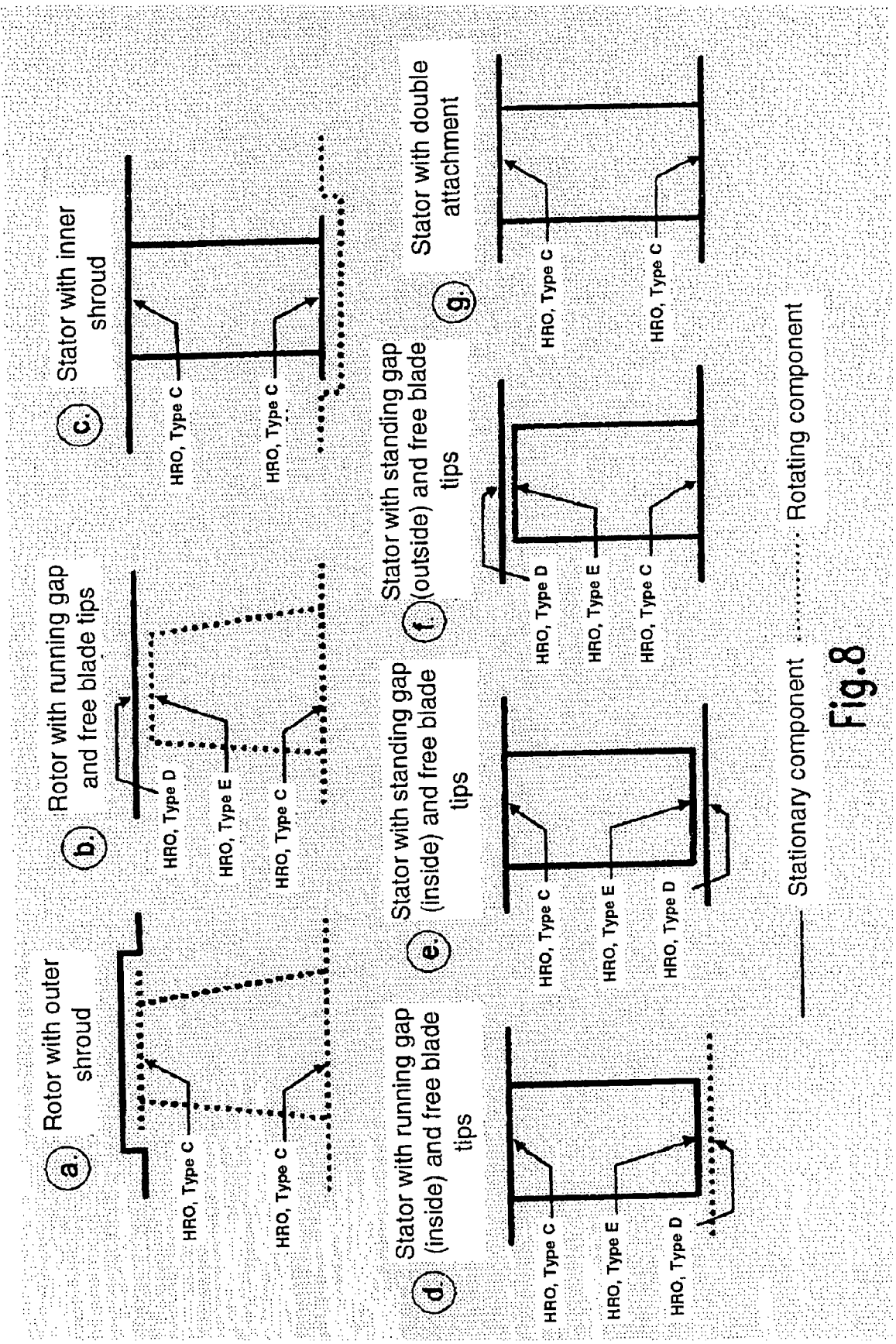
FIG. 8 is a further representation regarding the definition of the term HRO, types C, D and E in accordance with the present invention.

FIG. 8 shows various forms of blade rows of the turbomachine according to the present invention, with identification of the recurrent elements HRO, Type C, Type D, Type E. Specifically, the examples show the following:

FIG. 8a shows an assembly, comprising a rotor drum with several rotor blades co-rotating with the drum, a shroud enclosing the rotor blades at the outer periphery and co-rotating with them, and a stationary casing enclosing the rotary components.

FIG. 8b shows a variant with an assembly, comprising a rotor drum, several rotor blades with free outer ends co-rotating with the drum, and a stationary casing enclosing the rotary components.

FIG. 8c shows an assembly, comprising a stationary outer casing, several stator blades connected to the outer casing, a shroud carried by the stator blades on the inner periphery, and a rotor drum rotating within the stationary components.

FIG. 8d shows an assembly, comprising a stationary outer casing, several stator blades with free inner ends connected to the outer casing and a rotor drum rotating within the stationary components.

FIG. 8e shows an assembly, comprising a stationary outer casing, several stator blades with free inner ends connected to the outer casing, and a stationary inner casing within the stator blade row.

FIG. 8f shows an assembly, comprising a stationary inner casing, several stator blades with free outer ends connected to the inner casing, and an outer casing enclosing the stator blade row.

FIG. 8g illustrates an assembly comprising a stationary inner and outer casing and several stator blades connected to the inner and outer casing.

In accordance with the present invention, the fluid to be supplied is routed via flow paths on the periphery of the annulus 10 or within the blades 8, 9 and their surrounding components. According to the present invention, the fluid is supplied to the annulus in the area of, the respective blade row either in free flow or by means of at least one restrictor element 12, which can be fixed or variable, situated in the flow path. The fluid is either supplied by a foreign source, or returned from locations of the turbomachine or the overall system, including the turbomachine.

In accordance with the present invention, the required elements of the flow path can have the form of a simple cavity, an annulus, a tube, duct, nozzle or diffuser of any cross-sectional shape and are, in accordance with the present invention, hereinafter summarized under the term "chamber".

Figure 9:
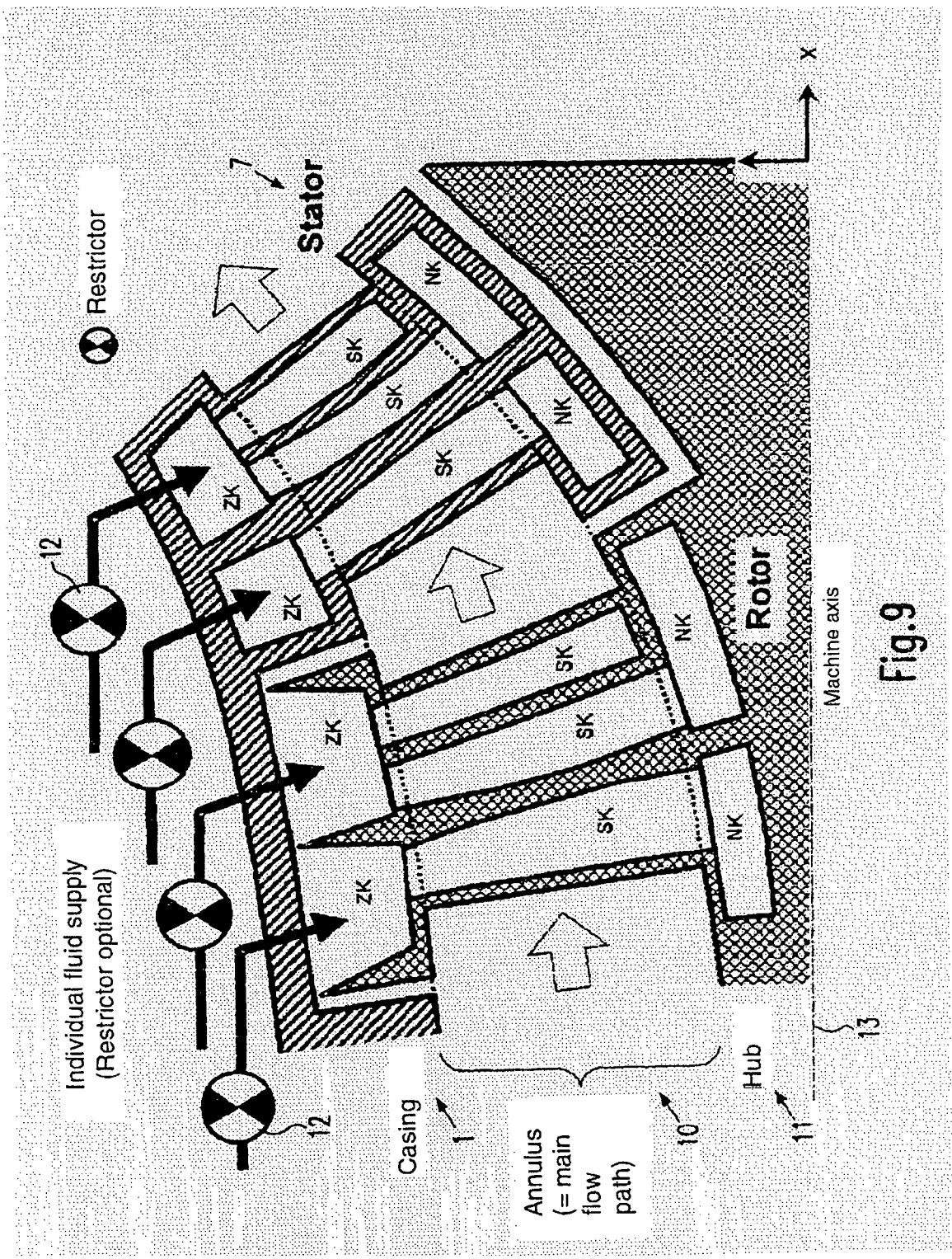
FIGS. 9 to 11 show different embodiments of chambers for fluid supply, especially from the casing.
Figure 10:
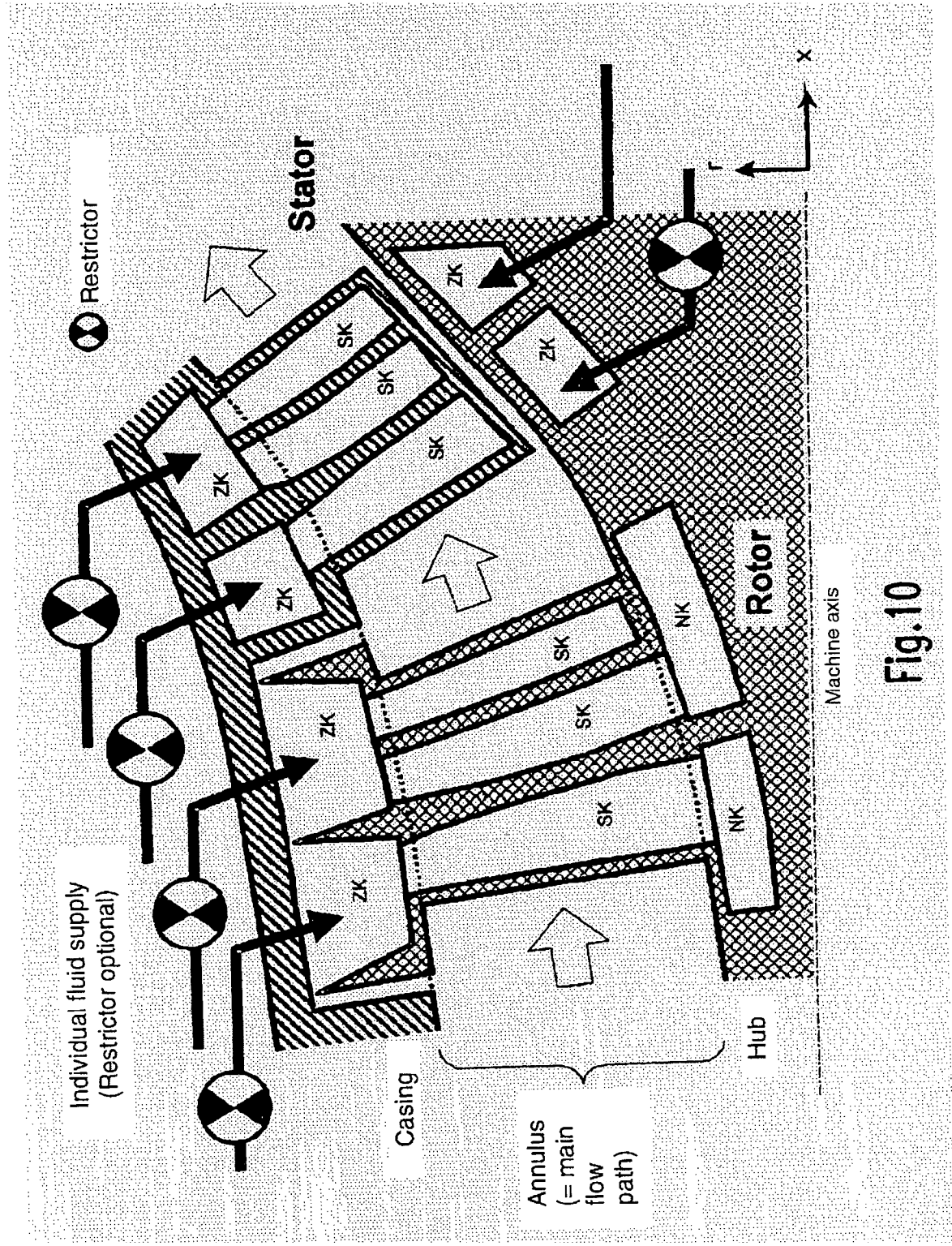
Figure 11:
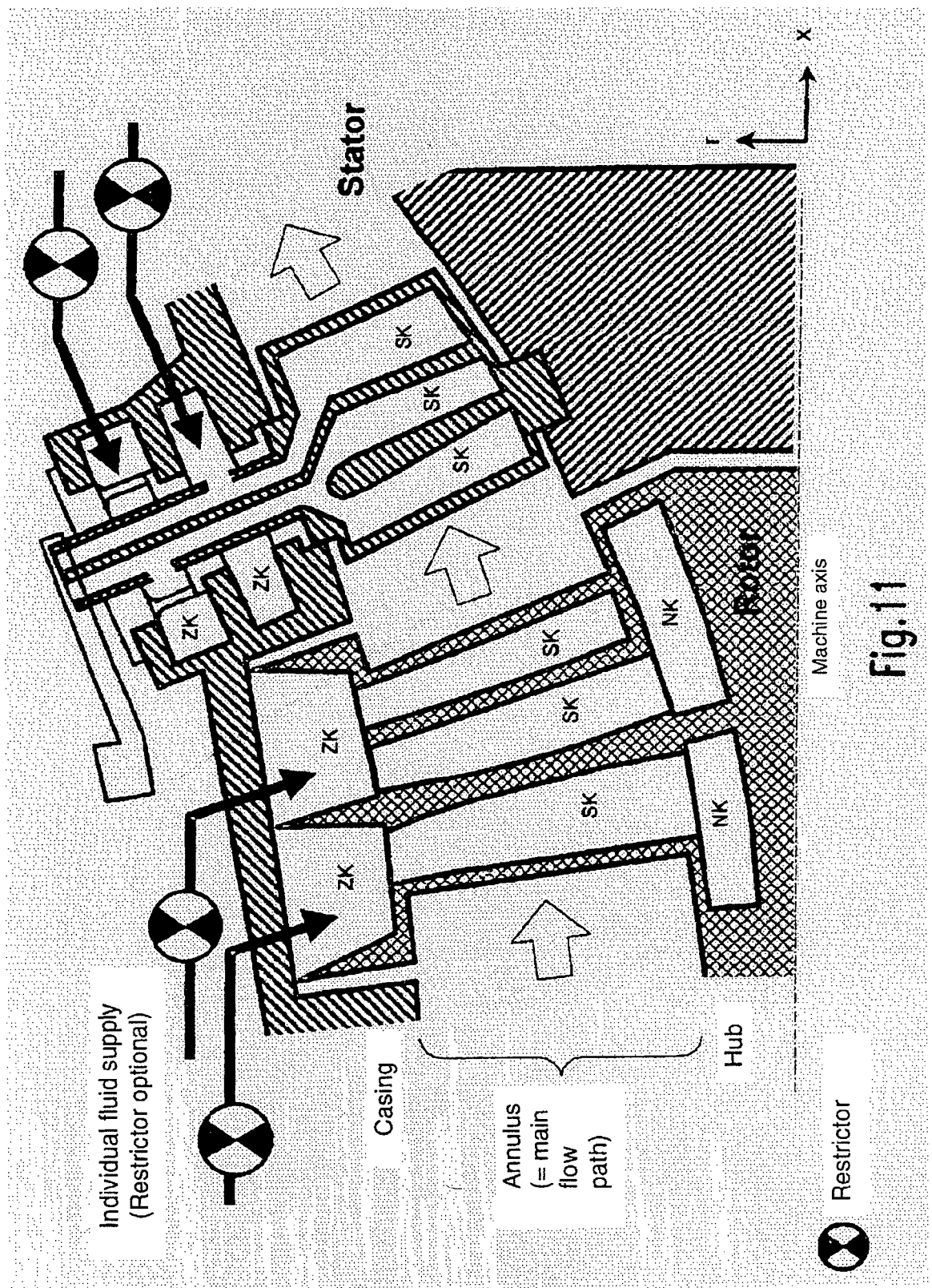

FIGS. 9 to 11 show various design variants of the present invention with configurations providing supply chambers (ZK), blade inner chambers (SK) and hub chambers (NK).

More particularly, FIGS. 9 to 11 show design variants in which at least one chamber on or in the casing is related to each of the individual blade rows by way of which fluid is supplied to the blade row (supply chamber ZK). If at least one further chamber exists in the interior of at least one blade which extends totally or only partly over the blade height (blade inner chamber SK), each supply chamber ZK can be connected to at least one blade inner chamber SK to supply fluid to the latter. If the blade is firmly connected to the inner annulus contour, at least one chamber, which is the last chamber element of the total flow path designed for fluid supply, can exist on or in the hub outside the annulus (hub chamber NK), this chamber being connected to and receiving fluid from at least one blade inner chamber SK.

If the blade has a free end with radial gap on the hub or if the blade has no blade inner chamber extending over the entire blade height, at least one supply chamber ZK can exist on or in the hub outside the annulus for the supply of fluid on the hub.

Supply chambers and hub chambers extend over the entirety or only parts of the machine circumference. The supply chambers ZK serve for the supply of fluid to the respective blade row, while the blade inner chambers SK and the hub chambers are means to provide access to the relevant trailing edge and rim-near surfaces (HRO) of the respective blade row.

Figure 12:
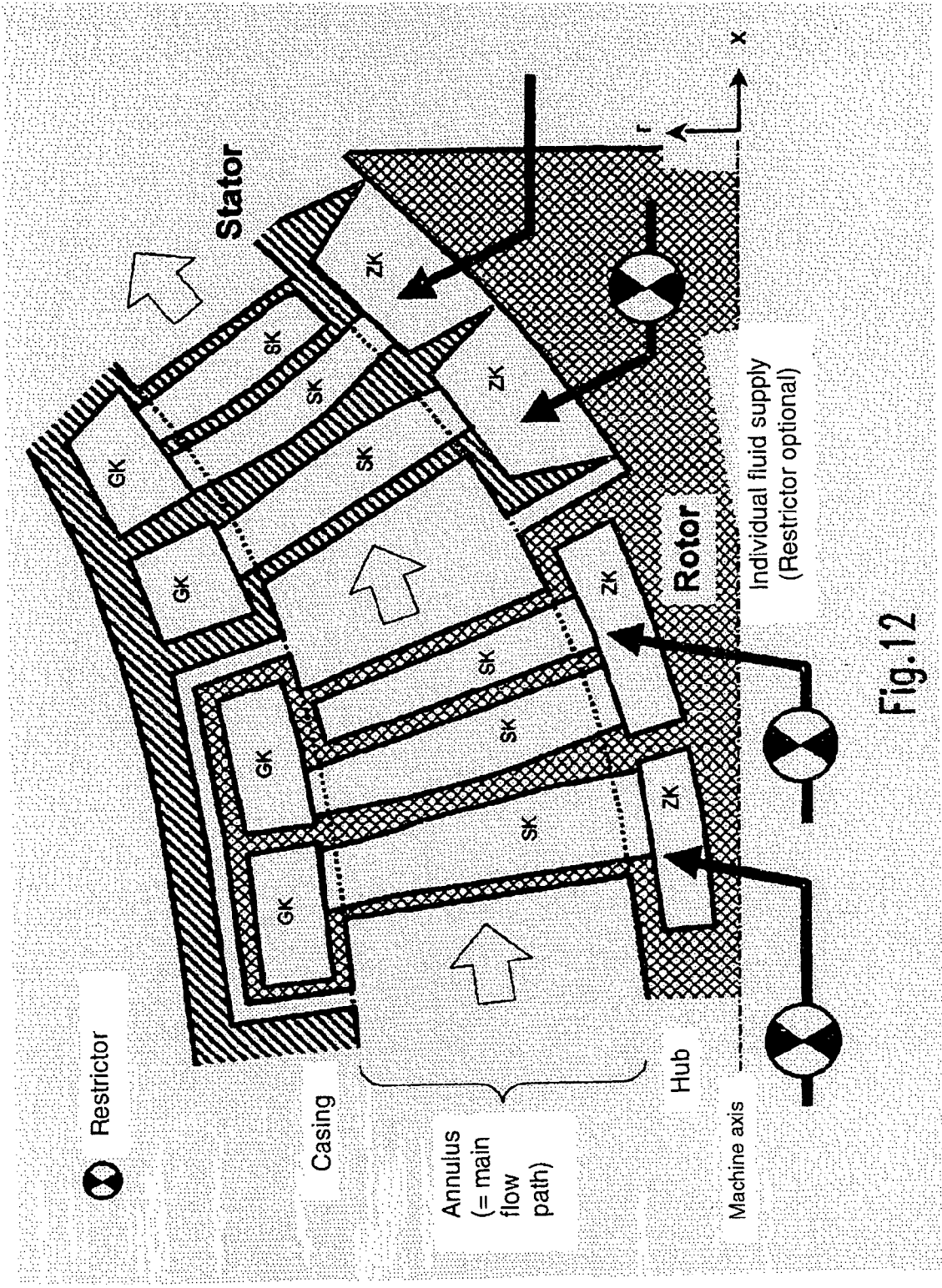
FIGS. 12 to 14 show variants analogically to FIGS. 9 to 11 with chambers for fluid supply, especially from the hub.
Figure 13:
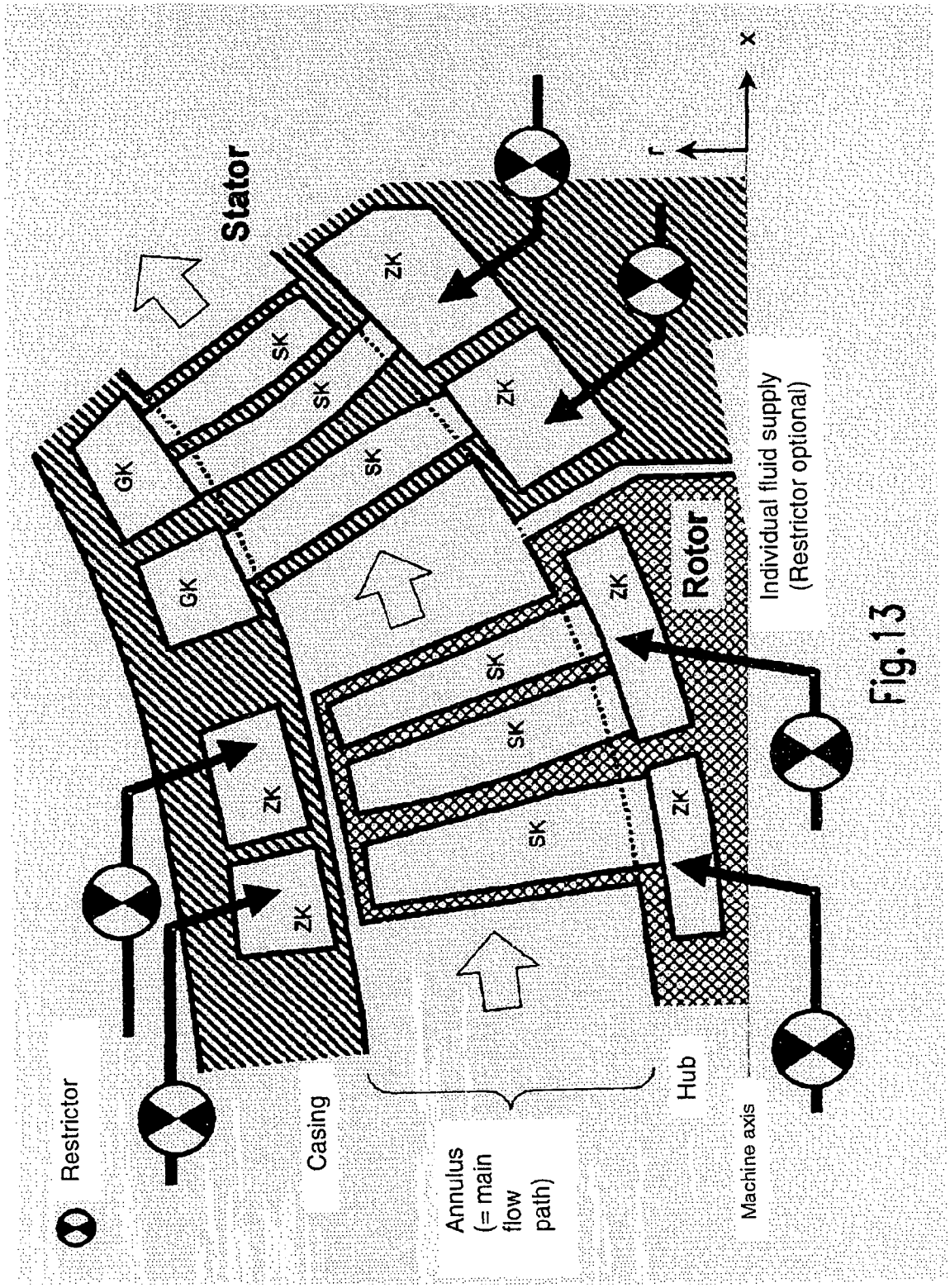
Figure 14:
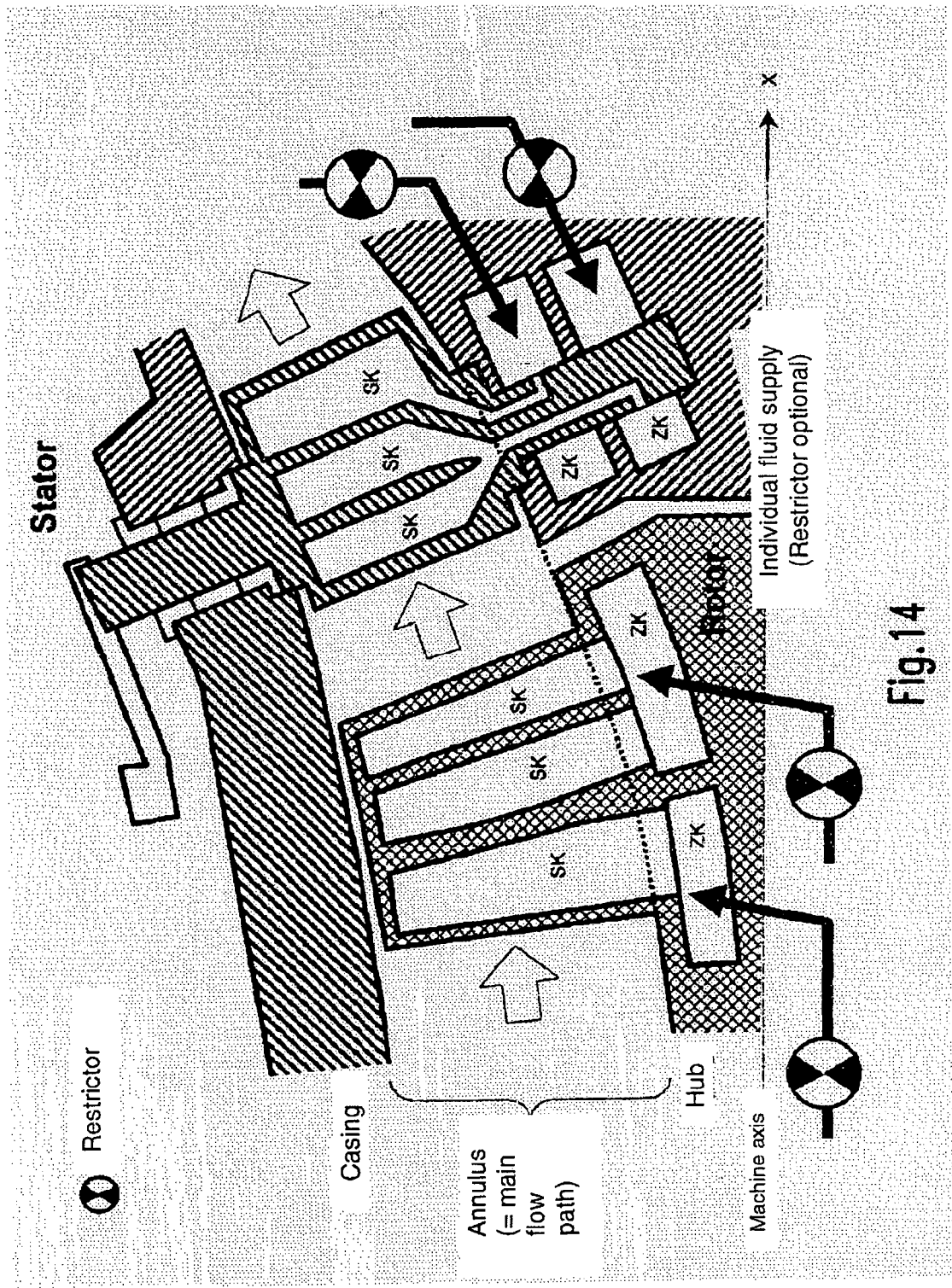

While FIGS. 9 to 11 show design variants in which at least one supply chamber ZK is arranged on or in the casing, FIGS. 12 to 14 present design variants in which at least one chamber is arranged on or in the hub by way of which fluid is supplied to the blade row (supply chamber ZK). In case at least one further chamber exists in the interior of at least one blade which extends totally or only partly over the blade height (blade inner chamber SK), each supply chamber ZK can be connected to at least one blade inner chamber SK and supply fluid to the latter. If the blade is firmly connected to the outer annulus contour, at least one chamber, as the last chamber element of the total flow path designed for fluid supply can exist on or in the casing (casing chamber GK), this chamber being connected to and receiving fluid from at least one blade inner chamber SK.

If the blade has a free end with radial gap on the casing or if the blade has no blade inner chamber extending over the entire blade height, also at least one supply chamber can exist on or in the casing outside the annulus for the supply of fluid on the casing.

Supply chambers and casing chambers extend over the entirety or only parts of the turbomachine circumference. The supply chambers serve for the supply of fluid to the respective blade row, while the blade inner chambers and the casing chambers are means to provide access to the relevant trailing edge and rim-near surfaces (HRO) in the area of the respective blade row.

According to the present invention, at least one fluid supply device is provided on at least one trailing edge and rim-near surface (HRO), on at least one blade of a blade row described in connection with FIGS. 9 to 11 or 12 to 14, respectively, and/or on at least one of its annulus-limiting components, this fluid supply device connecting the trailing edge and rim-near surfaces (HRO) with a supply chamber ZK, a blade inner chamber SK, a hub chamber NK or a casing chamber GK. The fluid supply device is technically realized by mechanical, chemical or thermal methods of material removal on the component forming the trailing edge and rim-near surface (HRO).

In an alternative form of the present invention, the confines of the fluid supply device are provided by a combination of at least two pre-prepared components which are loosely or firmly joined.

FIGS. 15 to 19 show inventive embodiments of the fluid supply device on trailing edge and rim-near surfaces (HRO) of the type A. The figures show configurations of slots or functionally similar substitutes on a confined trailing edge-near section of the blade surface, applicable to both, the suction side and the pressure side of the blade. Individual slots or substitutes, respectively, can be allocated to different blade inner chambers.

Figure 15:
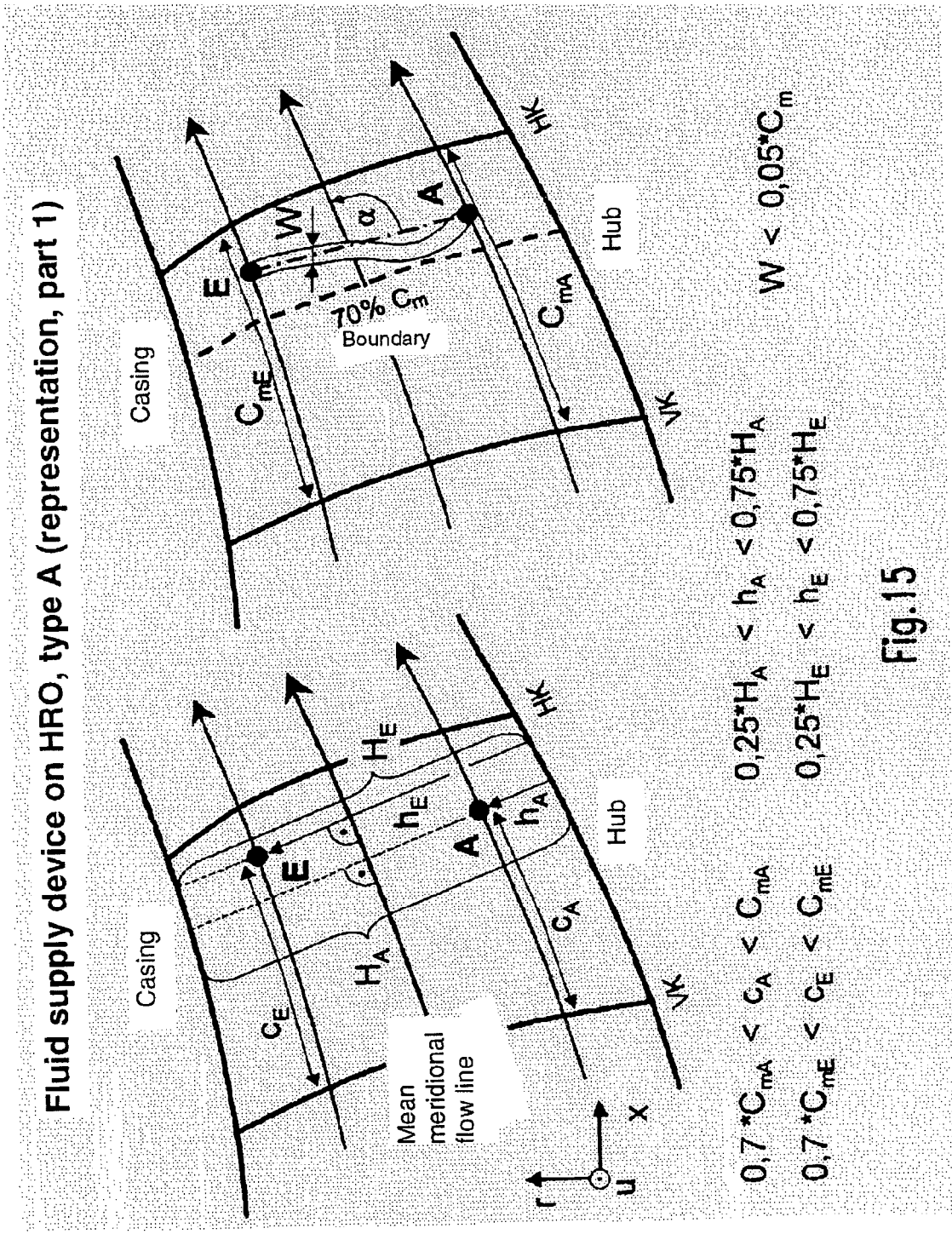
FIGS. 15 to 19 show variants of a fluid supply device in accordance with the present invention on trailing edge and rim-near surfaces (HRO) of the type A.
Figure 16:
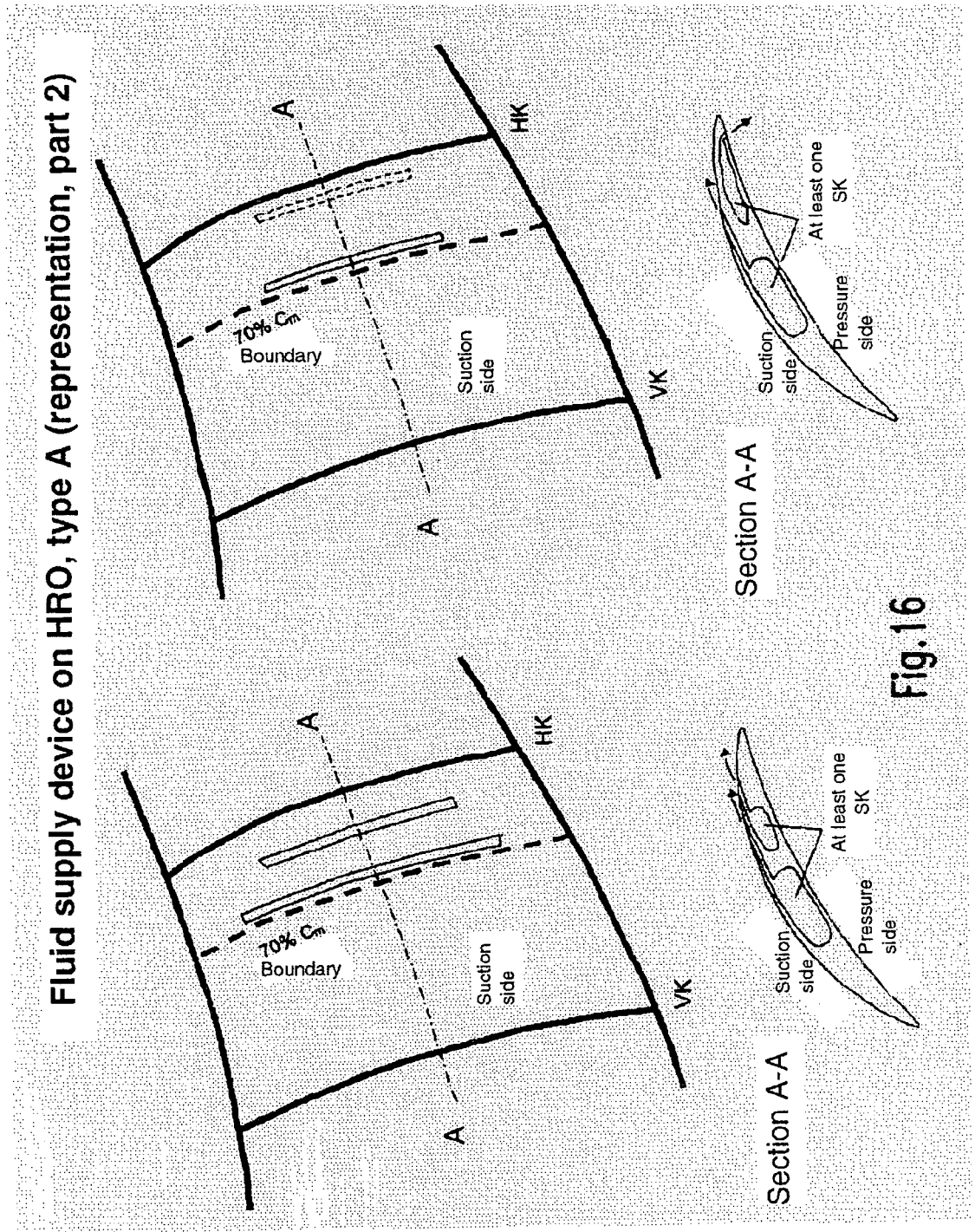
Figure 17:
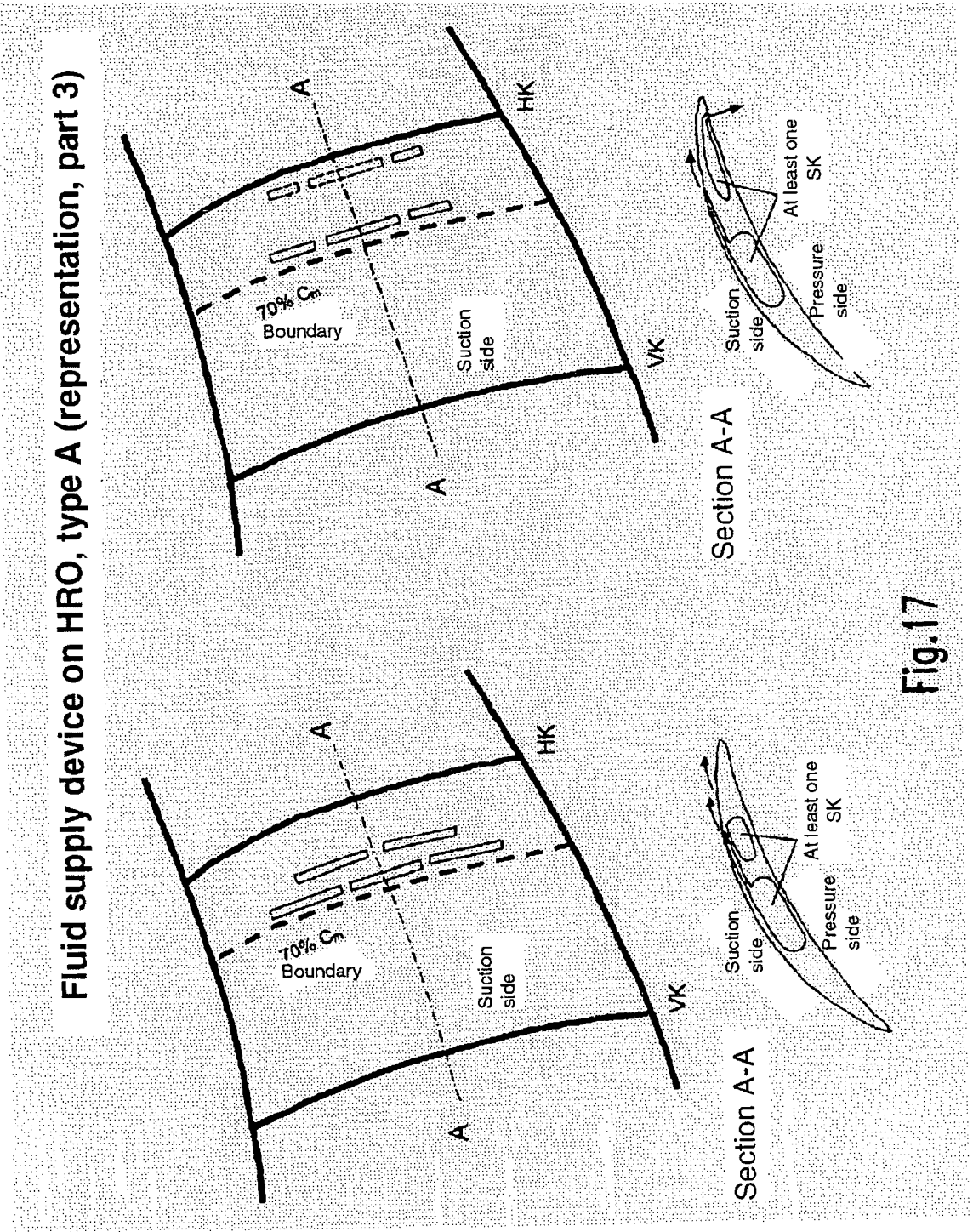
Figure 18:
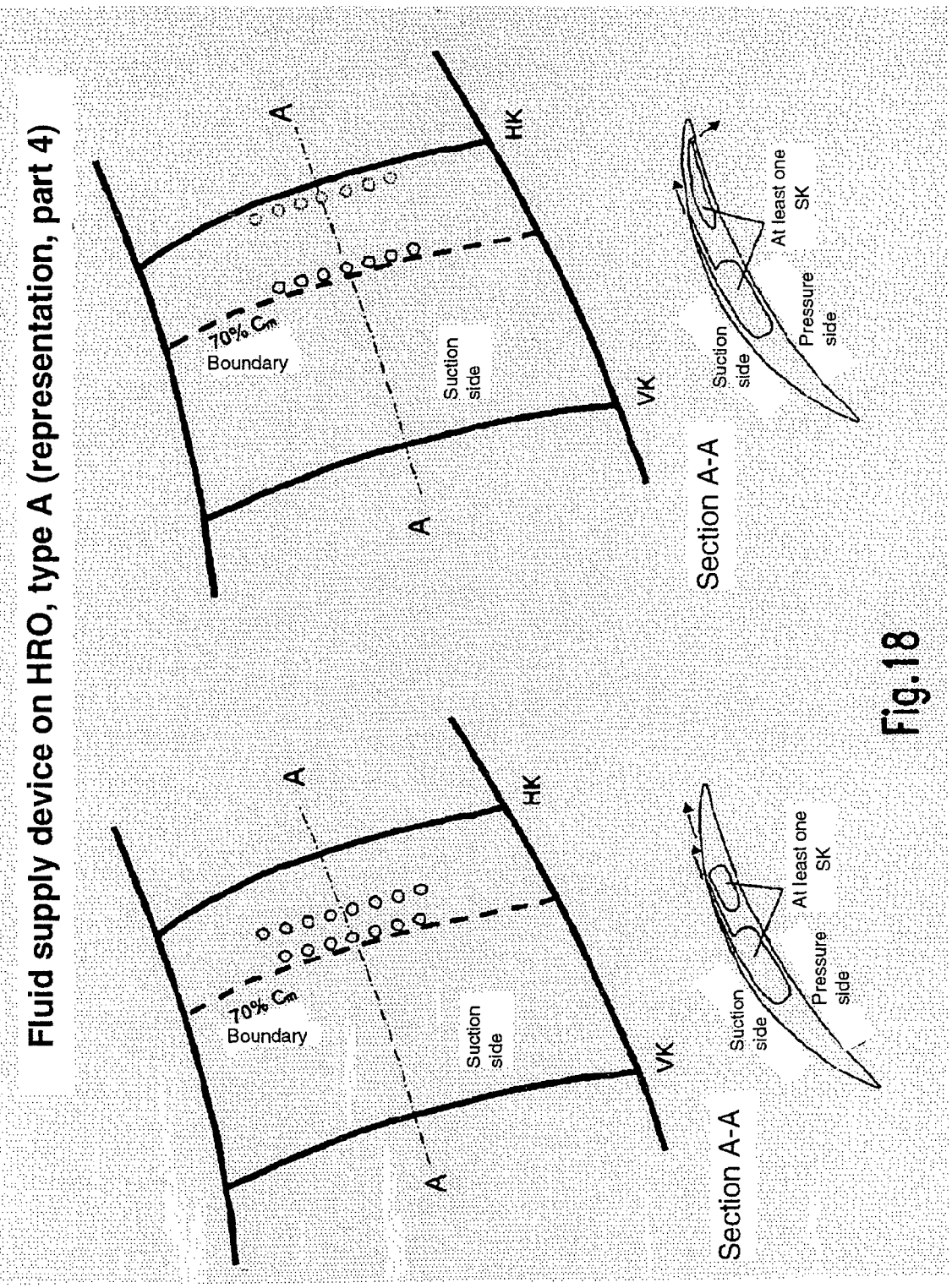

Looking at the blade surface in the coordinate system (x, r) established by axial direction and radial direction, see FIG. 15, a set of meridional flow lines results from an equidistant division of the orthogonal based on the mean meridional flow line. The meridional run lengths cA and cE to the leading edge (VK) as well as the meridional chords CmA and CmE between leading edge (VK) and trailing edge (HK) are defined along the meridional flow lines through start point A and end point E. Situated within the particularly relevant, narrow zone between the boundary line located at 70 percent of the meridional chord length and the trailing edge line is a configuration of one or more slots which may have different extension orthogonally to the meridional direction. This is exemplified in FIG. 15 for the case of a single slot and in FIG. 16 for the case of two slots. A start point and an end point, whose position is defined in the following, define each slot:

$0.7*CmA<cA<CmA$ $0.7*CmE<cE<CmE$ $0.25*HA<hA<0.75\% HA$ $0.25*HE<hE<0.75\% HE$

The annulus heights HA and HE, as well as the hub distances hA and hE, are measured in a direction which is normal to the mean meridional flow line.

The extension of each slot can be straight or curved between the start and the end point. They have a constant width W or a longitudinally variable width W which, however, is always less than 5 percent of the meridional chord length Cm ($W<0.05*Cm$). They have square, chamfered or rounded surface edges. They are square or have a round (oblong-hole style) termination at the start and at the end point. The slots extend vertically or obliquely to the blade surface, through the wall material, into the same blade inner chamber or into different blade inner chambers.

In accordance with the present invention, an aerodynamically particularly favorable solution is obtained if slots are arranged on the blade suction side within a narrow corridor limited as follows:

$0.7*CmA<cA<0.85*CmA$ $0.7*CmE<cE<0.85*CmE$ and the connecting line between start point A and end point E of each slot and the meridional flow direction include an angle of 80° to 110° ($80<=alpha<=110$).

In accordance with the present invention, it is also particularly favorable to arrange slots on the blade pressure side within a narrow corridor limited as follows:

$0.9*CmA<cA<CmA$ $0.9*CmE<cE<CmE.$ and the connecting line between start point A and end point E of each slot and the meridional flow direction includes an angle of 80° to 110° ($80<=alpha<=110$).

In accordance with the present invention, the blade envelopment can be influenced in a particularly favorable way if slots are arranged on both the blade suction side and the blade pressure side. A representation of a configuration of two slots is exemplified on the right-hand side in FIG. 16.

In a modified form—with the same provisions applying to the positioning and the extension on the blade surface as well as the condition of the surface edges and the orientation in the blade—at least one slot extending between the points A and E is replaced by a row of several, short slots with gaps or webs between them. Here, it is particularly favorable if, in the case of more than one row on the same blade side (pressure or suction side), short slots and webs are arranged in alternation, as viewed along a meridional flow line, see the representations in FIG. 17.

In another modified form—with the same provisions applying to the positioning and the extension on the blade surface as well as the condition of the surface edges and the orientation in the blade—at least one slot extending between the points A and E is replaced by a row of several holes. Here, it is particularly favorable if, in the case of more than one row on the same blade side (pressure or suction side) holes and hole interspaces are arranged in alternation, as viewed along a meridional flow line, see the representations in FIG. 18.

Figure 19:
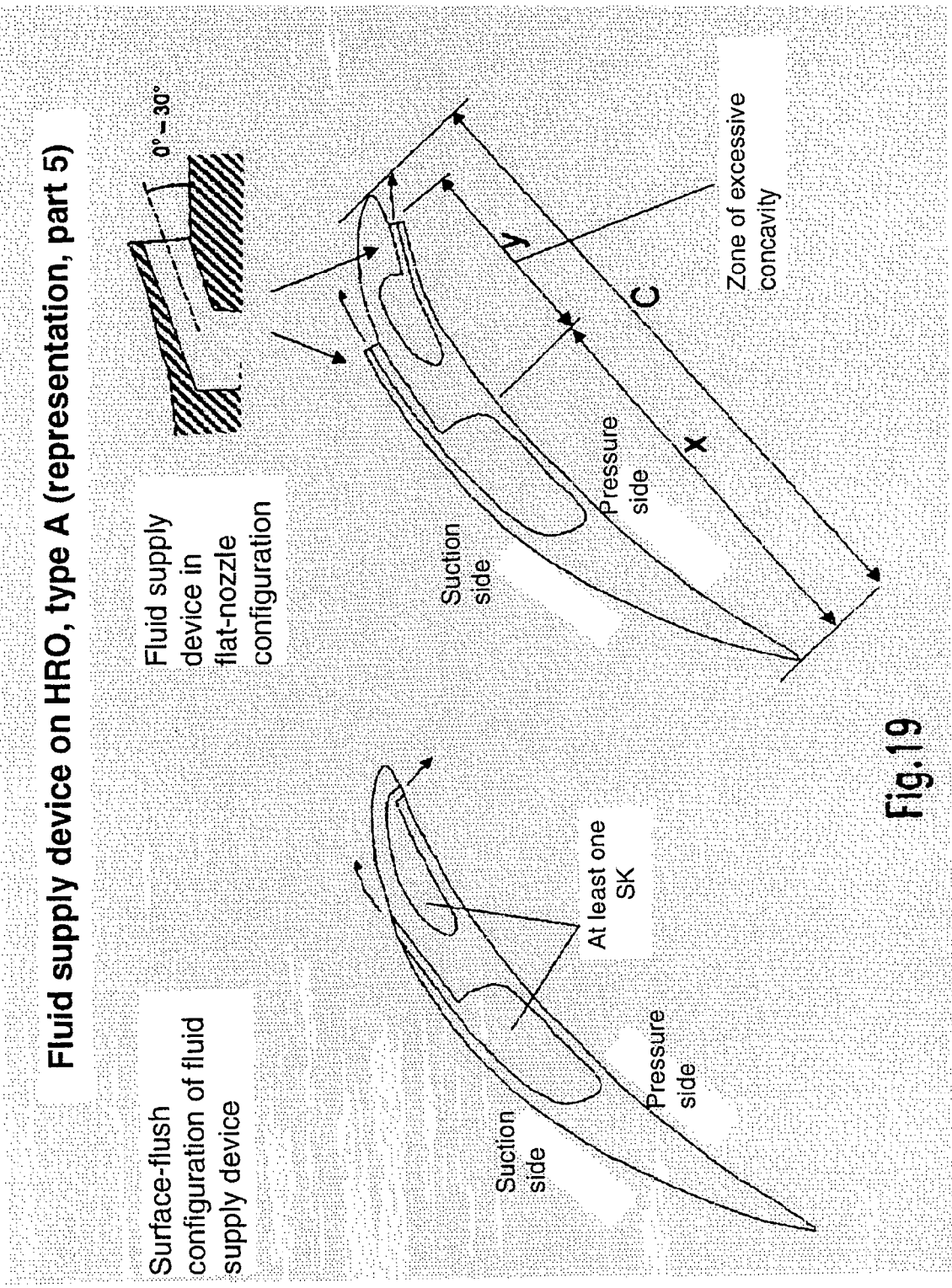

In another modified form—with the same provisions applying to the positioning and the extension on the blade surface as well as the condition of the surface edges—at least one fluid supply device (slot, short-slot row or hole row) has the style of a flat nozzle, characterized in that the fluid is supplied at a maximum angle of 30° to the blade surface and that the blade surface has a corresponding step, as shown in FIG. 19.

A particularly favorable form according to the present invention is obtained if the following features, which are also shown in FIG. 19, occur simultaneously:

1.) A flat nozzle for fluid supply is arranged on a location of the blade pressure side between 85 percent of the profile chord length C and the trailing edge [$0.85<(x+y)/C<1$].

2.) The portions x and y of the chord length have a ratio of at least x/y=1.5.

3.) The directional angle change of the tangent to the pressure side surface obtained over the distance x is less than the directional angle change of the tangent to the pressure side surface obtained over the distance y.

Figure 20:
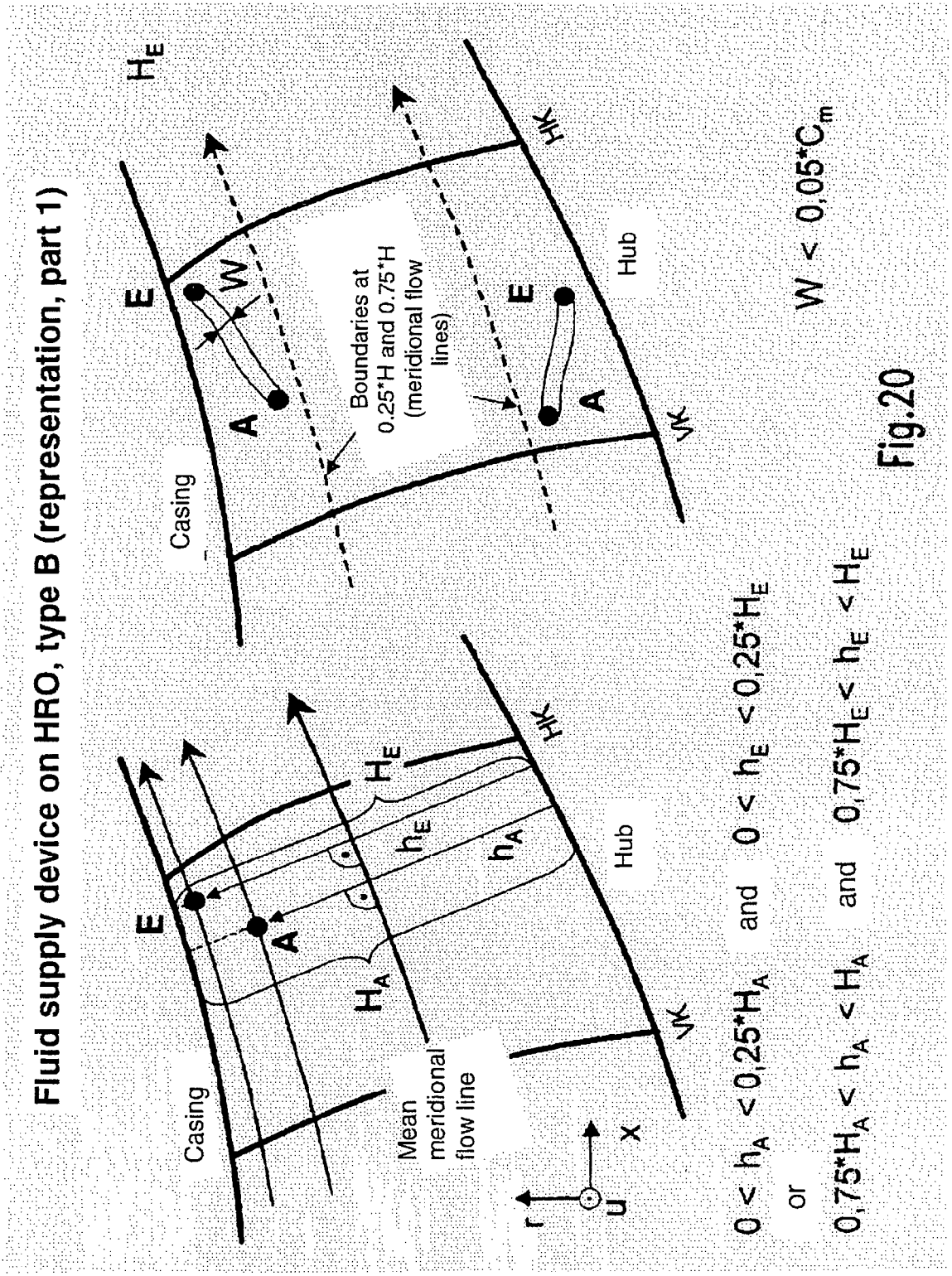
FIGS. 20 to 22 show variants of a fluid supply device in accordance with the present invention on trailing edge and rim-near surfaces (HRO) of the type B.
Figure 21:
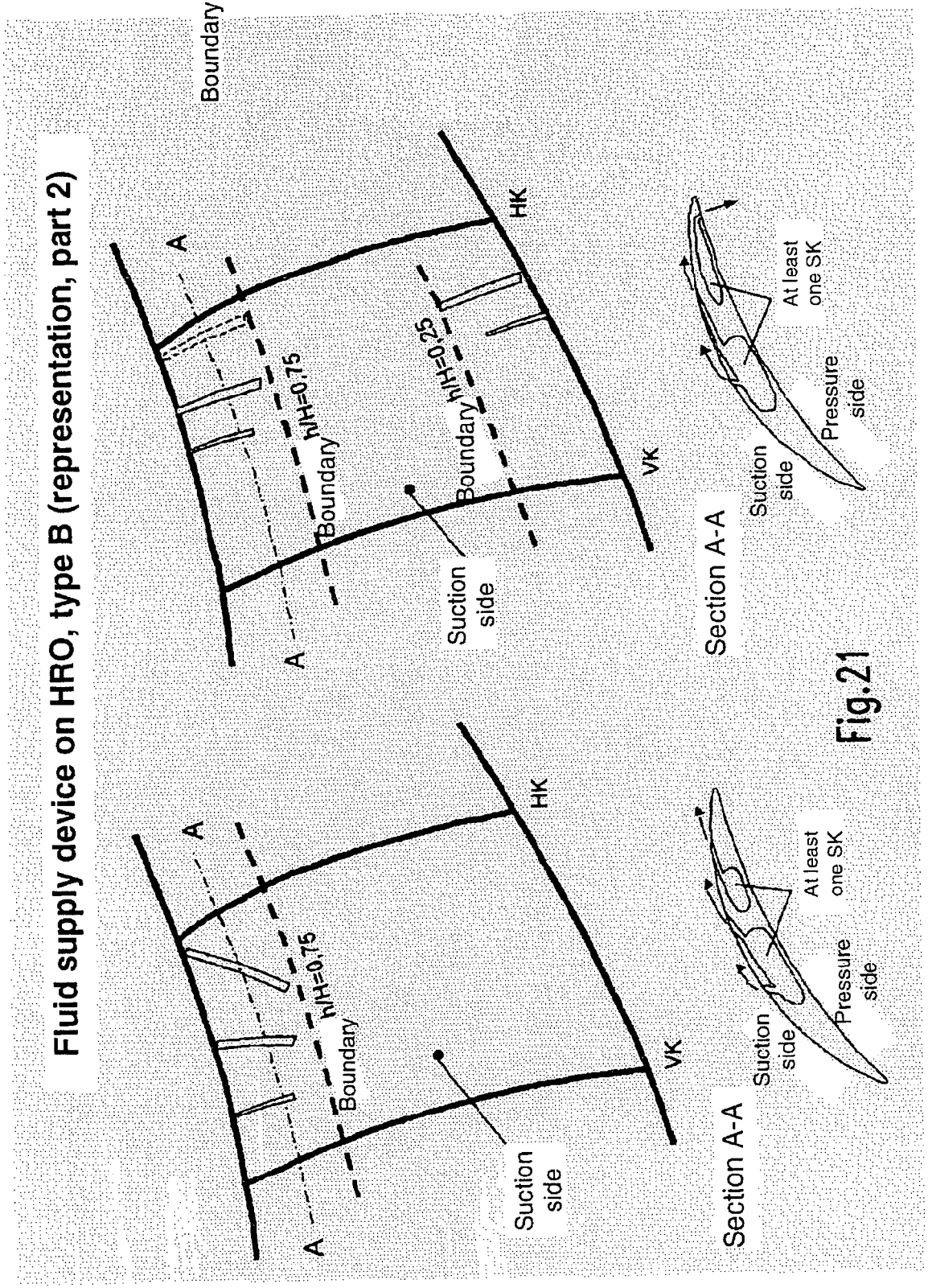
Figure 22:
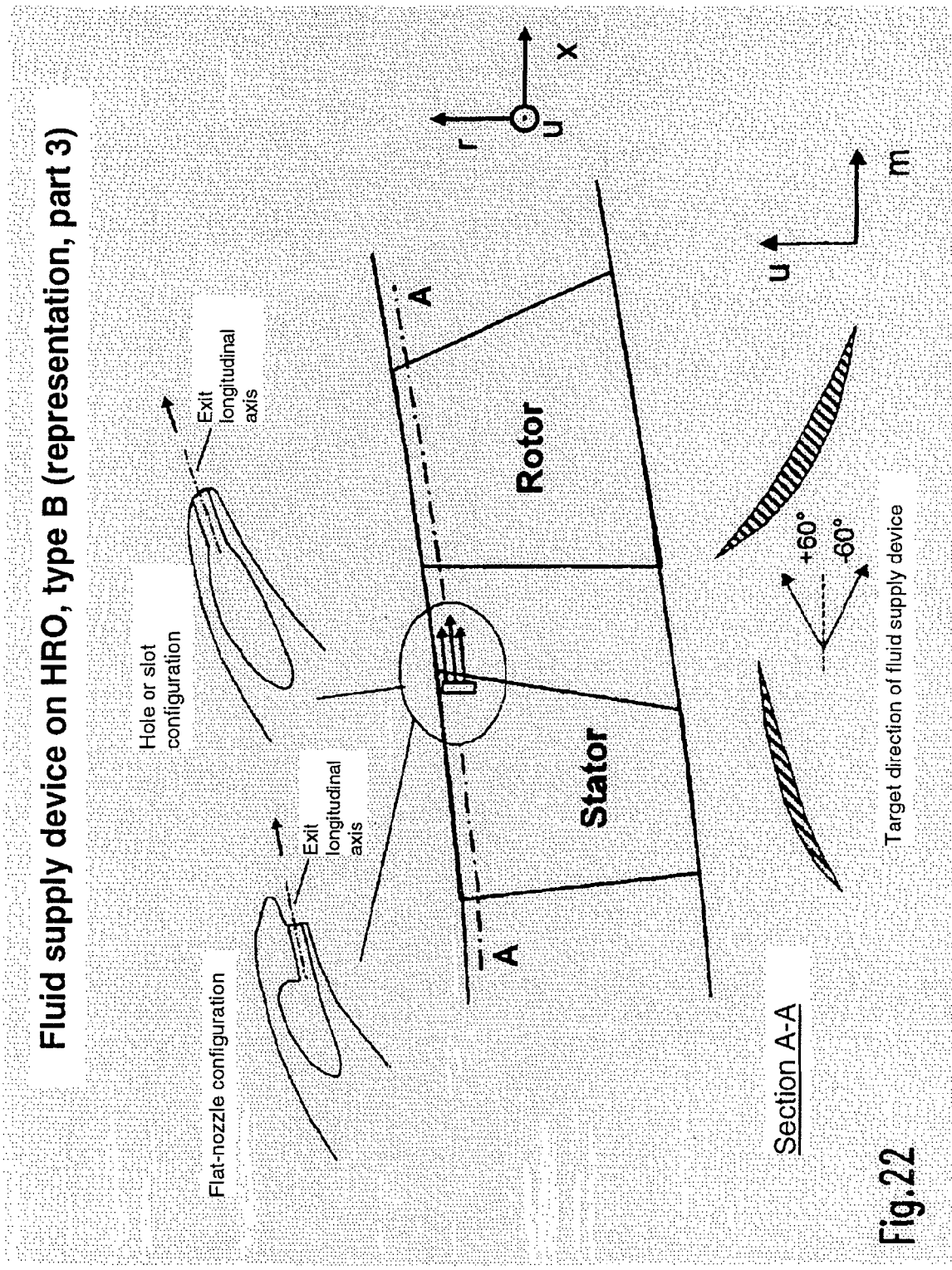
Figure 23:
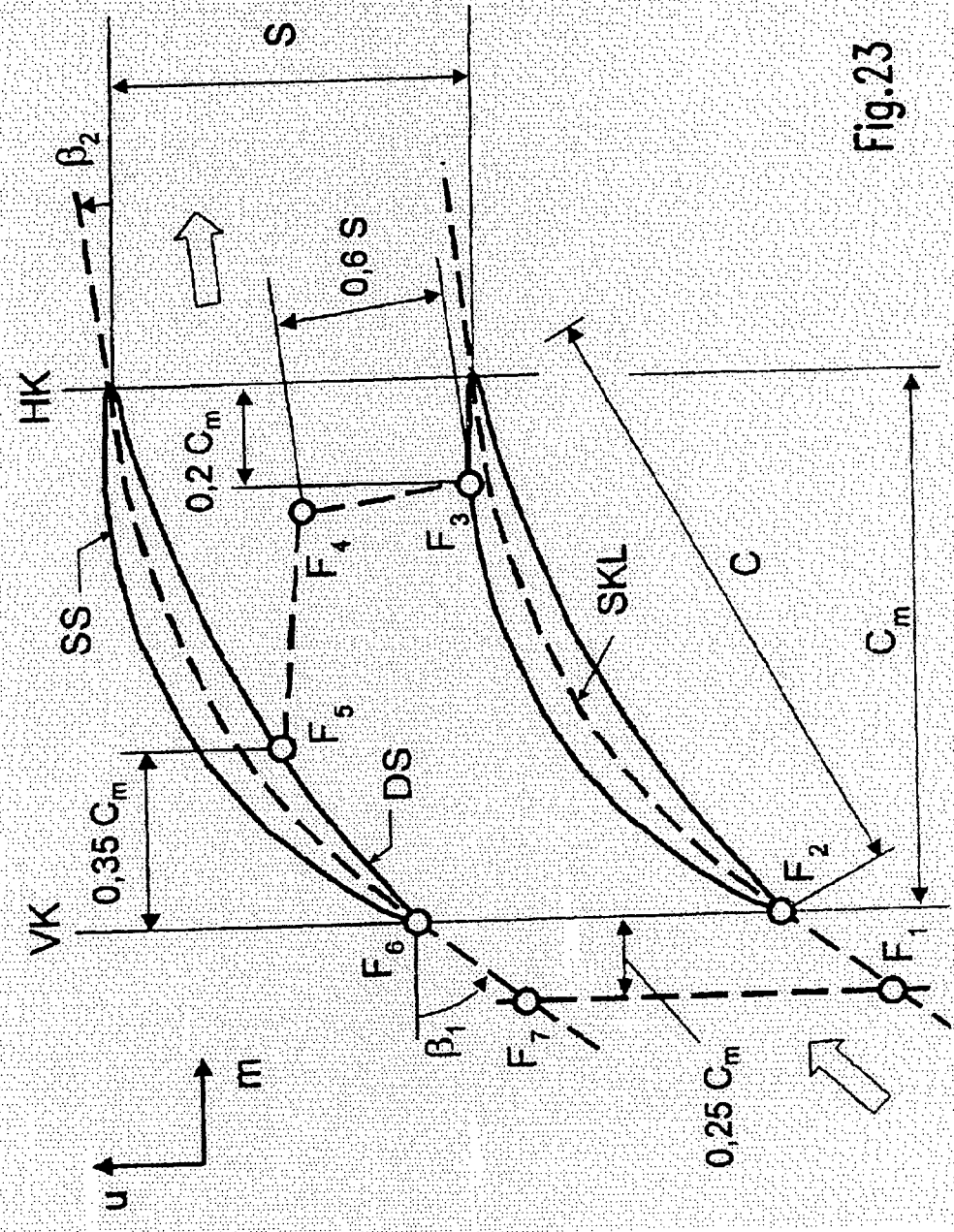
Figure 24:
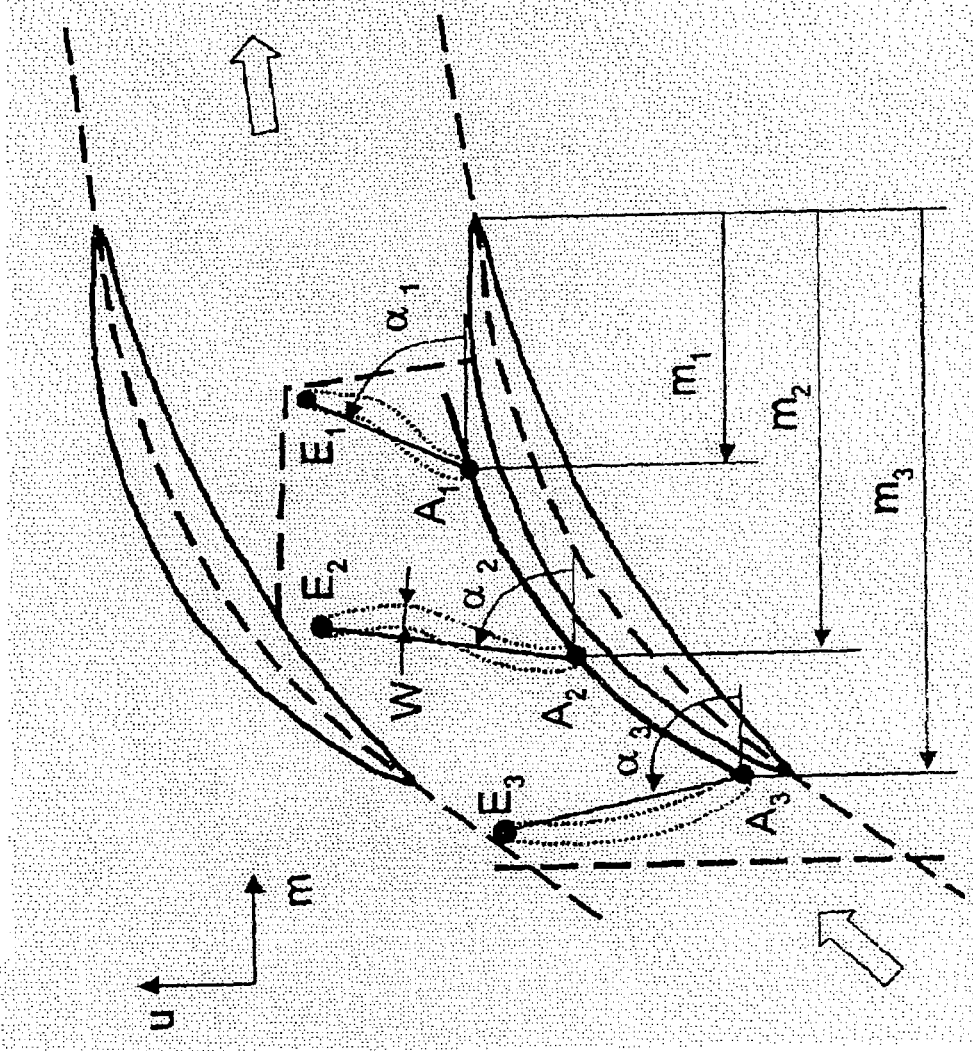

FIGS. 20 to 22 show inventive embodiments of the fluid supply device on trailing edge and rim-near surfaces (HRO) of the type B. The figures show configurations of slots or functionally similar substitutes on the two rim-near sections of the blade surface, applicable to both, the suction side and the pressure side of the blade. Individual slots or substitutes, respectively, can be allocated to different blade inner chambers.

Looking at the blade surface in the coordinate system (x, r) established by axial direction and radial direction, see FIG. 20, a set of meridional flow lines results from an equidistant division of the orthogonal based on the mean meridional flow line. The meridional flow lines at the two annulus heights h/H=0.25 and h/H=0.75 confine the surface zones provided for HRO, Type B extending closely along the annulus walls. For the fluid supply device, zones are provided between the hub and the limiting meridional flow line at h/H=0.25 or between the limiting meridional flow line at h/H=0.75 and the casing, respectively. Each slot of the fluid supply device extends between a start point A and an end point E. The position of the points A and E is confined in the meridional direction by the leading and the trailing edge of the blade. Situated within these particularly relevant, narrow rim-near areas is a configuration of one or more slots which may have different extension orthogonally to the meridional direction. This is exemplified in FIG. 20 for the case of a single slot and in FIG. 21 for the case of three slots. A start point and an end point, whose position is defined in the following, define each slot:

Near the hub by $0<hA<0.25*HA$ and $0<hE<0.25*HE$ and/or near the casing by $0.75*HA<hA<HA$ and $0.75*HA<hA<HA$.

The annulus heights HA and HE, as well as the hub distances hA and hE, are measured in a direction which is normal to the mean meridional flow line.

The extension of each slot can be straight or curved between the start and the end point. They have a constant width W or a longitudinally variable width W which, however, is always less than 5 percent of the meridional chord length Cm ($W<0.05*Cm$). They have square, chamfered or rounded surface edges. They are square or have a round (oblong-hole style) termination at the start and at the end point. The slots extend vertically or obliquely at an angle of at least 5° to the blade surface, through the wall material, into the same blade inner chamber or into different blade inner chambers.

In accordance with the present invention, an aerodynamically particularly favourable solution is obtained if slots are arranged on the blade suction side within a narrow section limited as follows:

$0.5*CmA<cA<0.85*CmA$ $0.5*CmE<cE<0.85*CmE$ and the connecting line between start point A and end point E of each slot and the meridional flow direction includes an angle of 80° to 110° (80<=alpha<=110).

In accordance with the present invention it is also particularly favorable, to arrange the slots on the blade pressure side within a narrow corridor limited as follows:

$0.9*CmA<cA<CmA$ $0.9*CmE<cE<Cm$ and the connecting line between start point A and end point E of each slot and the meridional flow direction includes an angle of 80° to 110° (80<=alpha<=110).

In accordance with the present invention, the blade envelopment can be influenced in a particularly favorable way if slots are arranged on both the blade suction side and the blade pressure side. A representation of a configuration of three slots each in the hub and casing area is exemplified in FIG. 21.

In a modified form—with the same provisions applying to the positioning and the extension on the blade surface as well as the condition of the surface edges and the orientation in the blade—at least one slot extending between the points A and E is replaced by a row of several, short slots with gaps or webs between them. Here, it is particularly favorable if, in the case of more than one row on the same blade side (pressure or suction side), short slots and webs are arranged in alternation, as viewed along a meridional flow line.

In another modified form—with the same provisions applying to the positioning and the extension on the blade surface as well as the condition of the surface edges and the orientation in the blade—at least one slot extending between the points A and E is replaced by a row of several holes. Here, it is particularly favorable if, in the case of more than one row on the same blade side (pressure or suction side), holes and hole interspaces are arranged in alternation, as viewed along a meridional flow line.

In another modified form—with the same provisions applying to the positioning and the extension on the blade surface as well as the condition of the surface edges—at least one fluid supply device (slot, short-slot row or hole row) has the style of a flat nozzle, characterized in that the fluid is supplied at a maximum angle of 30° to the blade surface and that the blade surface has a corresponding step (analogically to FIG. 19).

A particularly favorable form according to the present invention is obtained if the following features, which are also shown in FIG. 19, occur simultaneously:

1.) A flat nozzle for fluid supply is arranged on a location of the blade pressure side between 85 percent of the profile chord length C and the trailing edge [$0.85<(x+y)/C<1$].

2.) The portions x and y of the chord length have a ratio of at least x/y=1.5.

3.) The directional angle change of the tangent to the pressure side surface obtained over the distance x is less than the directional angle change of the tangent to the pressure side surface obtained over the distance y.

Finally, in the case of a stator blade, the fluid supply device in accordance with the present invention can be such that the fluid jet introduced enables the casing-near flow in the subsequent rotor to be influenced, see FIG. 22. For this, the fluid supply device (hole, slot or flat nozzle) is arranged in close vicinity of both the outer annulus wall (of the casing) and the blade trailing edge. For the blade height range, the limitation $0.9<h/H<1.0$ and for the extension in meridional direction, the limitation $0.9<c/Cm<1.0$ applies. As is shown in FIG. 22, the target direction of the fluid supply device, which is given by the orientation of the longitudinal axis of the fluid supply path in the blade wall at the exit point, and the meridional direction m include an angle of −60° to 60°.

Figure 26:
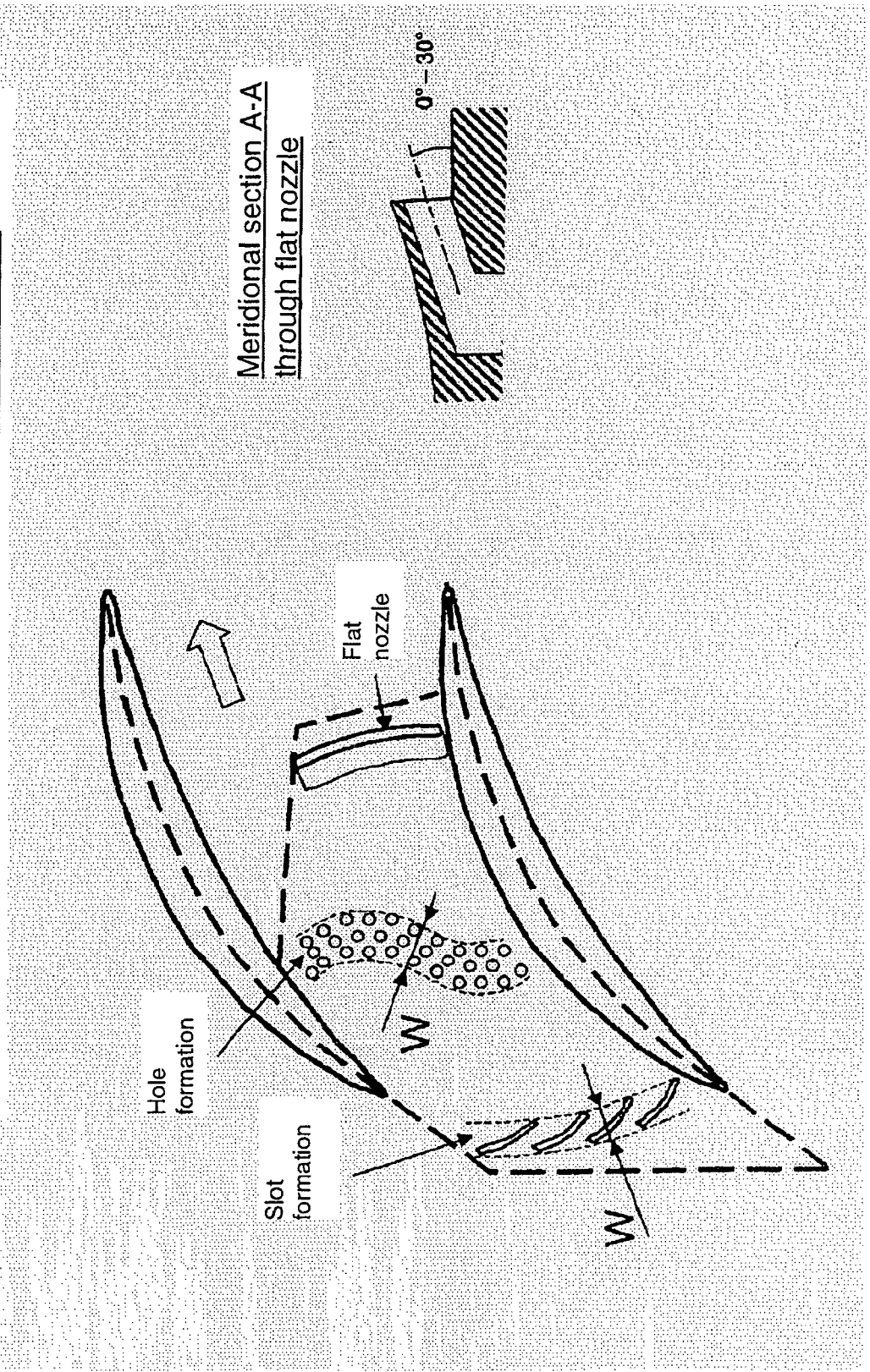

FIGS. 23 to 26 show inventive embodiments of the fluid supply device on trailing edge and rim-near surfaces (HRO) of the type C (FIG. 23), exemplified for the case N=3 (FIG. 24) and for the case N=3 (3 slots or substitutes), cf. FIGS. 25 and 26. The figures show configurations of slots or functionally similar substitutes, respectively, in the front part of the blade passage. Individual slots or substitutes, respectively, can be allocated to different blade inner chambers.

Regarding the annulus surface in the coordinate system (m, u) established by meridional flow line direction and circumferential direction, a configuration of slots is situated in a zone of the annulus wall which is enclosed by the curve trace F1-F2-F3-F4-F5-F6-F7-F1.

Chord F1-F2, as well as chord F6-F7, is a tangential extension of the profile skeleton line SKL against the flow direction. Chord F1-F7 lies 25 percent of the meridional profile chord length (0.25*Cm) before the leading edge plane. Chord F2-F3 is defined by the suction-side contour SS between leading edge VK and a point which is 20 percent of the meridional chord length (0.2*Cm) before the trailing edge HK. Chord F3-F4 runs vertically to the tangential extension of the profile skeleton line at the trailing edge and extends, on the suction-side, by an amount of 60 percent of the exit-side blade pitch (0.6*S) in the direction of the pressure side of the adjacent profile. Chord F4-F5 joins a point of the pressure side of the opposite profile which is located at 35 percent of the meridional profile chord length (0.35*Cm) in the blade passage. Chord F5-F6 extends along the pressure side to the leading edge VK.

A number of at least 2 slots (number N>1) establishes a special arrangement that is orientated approximately orthogonally to the expected direction of the boundary layer flow of the wall. The concept is based on a slot near the trailing edge-side boundary of the zone F1-F2-F3-F4-F5-F6-F7-F1 provided for fluid supply. The closer the further slots are located to the entry of the blade passage, the more they are inclined against the meridional flow direction m. A start point, an end point and an angle notation for the auxiliary straight line from the start to the end point define all slots. The start points lie on a baseline which is defined by either the suction-side contour itself or a line orientated to the suction-side contour which, however, at no point is spaced from it by more than 20 percent of the exit-side blade pitch (0.2*S) in the circumferential direction u. The baseline and a meridional distance to the trailing edge plane define the position of all start points.

The meridional trailing edge distance m(i) of a start point A (i) of the slot with the number (i) is m (i)=0.3*Cm+0, 7*Cm*(i−1)/(N−1).

For m (i), a tolerance of +/−0.1*Cm applies. The angle of inclination of the auxiliary straight line between the start point A(i) and the end point E(i) of a slot with the number (i) is alpha($i$)=alpha2+90°+($i$−1)*(alpha1−alpha2)/($N$−1).

For alpha (i), a tolerance of +/−20° applies.

The extension of each slot is supported by the respective auxiliary straight line, but must agree with it only at the start and at the end point. All slots end within the boundaries of the annulus wall segment enclosed by the curve trace F1-F2-F3-F4-F5-F6-F7-F1.

They extend straight, simply or multiply curved between the start and the end point. They have a constant width W or a longitudinally variable width W which, however, is always less than 10 percent of the exit-side blade pitch (W<0.1*S). They have square, chamfered or rounded surface edges. They are square or have a round (oblong-hole style) termination at the start and at the end point. The slots extend vertically or obliquely to the annulus surface, through the wall material, into a supply chamber ZK, a hub chamber NK or a casing chamber GK.

In a modified form—with the same provisions applying to the positioning and the extension on the annulus surface as well as the condition of the surface edges and the orientation in the annulus wall—at least one slot is replaced by a formation of several, straight or curved slots with a maximum width W of the slot configuration of 15 percent of the exit-side blade pitch (W<0.15*S).

In another modified form—with the same provisions applying to the positioning and the extension on the annulus surface as well as the condition of the surface edges and the orientation in the annulus wall—at least one slot is replaced by a formation of single or multiple-row holes with a maximum width W of the hole configuration of 15 percent of the exit-side blade pitch (W<0.15*S).

In another modified form—with the same provisions applying to the positioning and the extension on the annulus surface—at least one slot is designed as flat nozzle, characterized in that fluid is supplied to the annulus surface at an angle of max. 30° and the annulus surface has a corresponding step.

In still another modified form—with the same provisions applying to the positioning and the extension on the annulus surface as well as the condition of the surface edges and the orientation in the annulus wall—at least one of the N elements (slot, slot formation, hole formation or flat nozzle) is omitted.

FIGS. 27 to 30 show embodiments of the fluid supply device on trailing edge and rim-near surfaces (HRO) of the type D, on which a configuration of slots or functionally similar substitutes, respectively, is provided upstream or within the bladed area of a blade row with free blade ends. Individual slots (or substitutes) of the configuration can be allocated to different supply chambers. The form of the fluid supply device according to the present invention specified herein shall, however, not be confused with the forms of casing structuring or casing treatment described elsewhere since, in accordance with the present invention, the relevant point is the local supply of fluid, not a pulsating exchange of fluid between the slot space and the annulus space.

Figure 27:
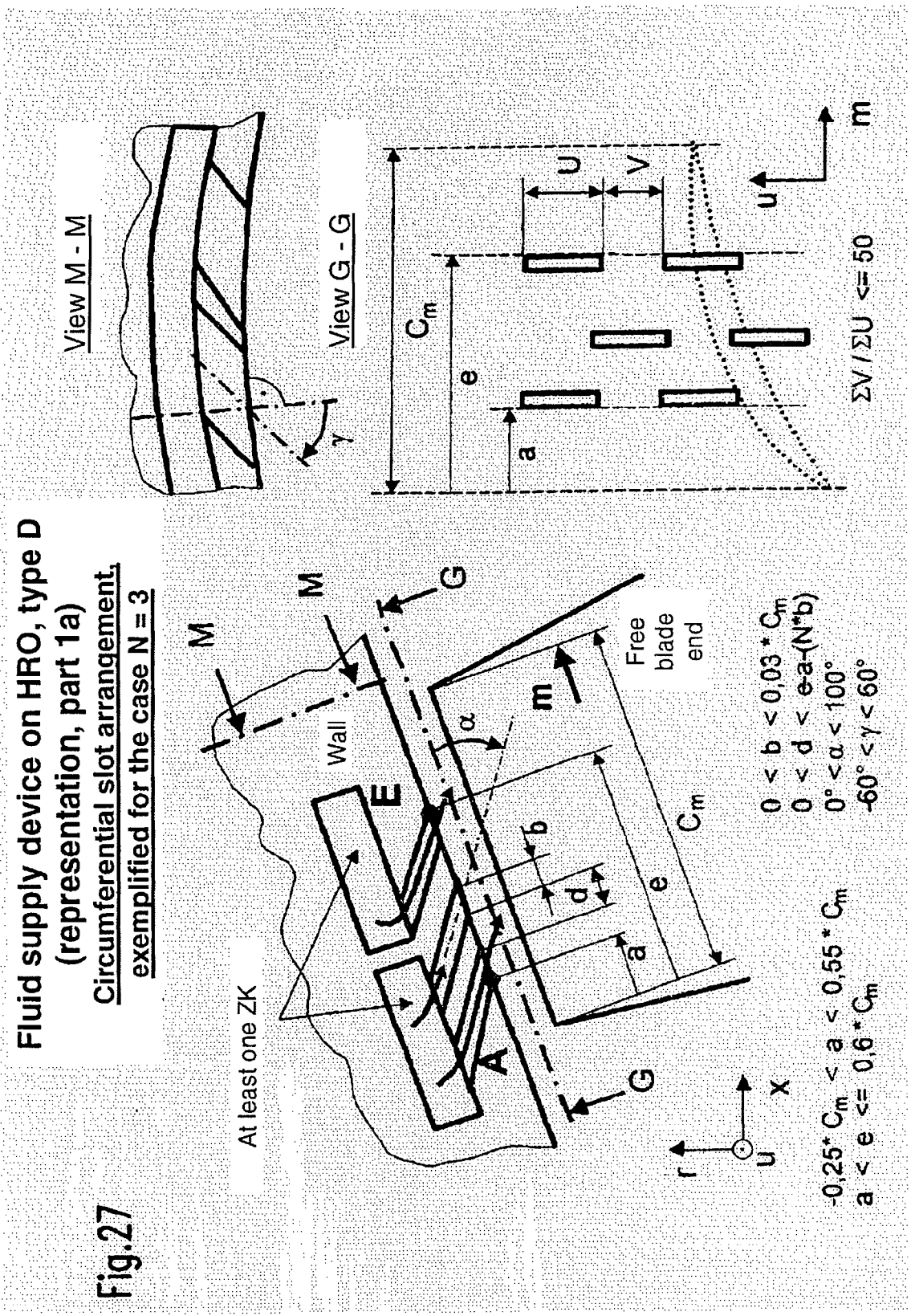
FIGS. 27 to 34 show variants of a fluid supply device in accordance with the present invention on trailing edge and rim-near surfaces (HRO) of the type D.
Figure 28:
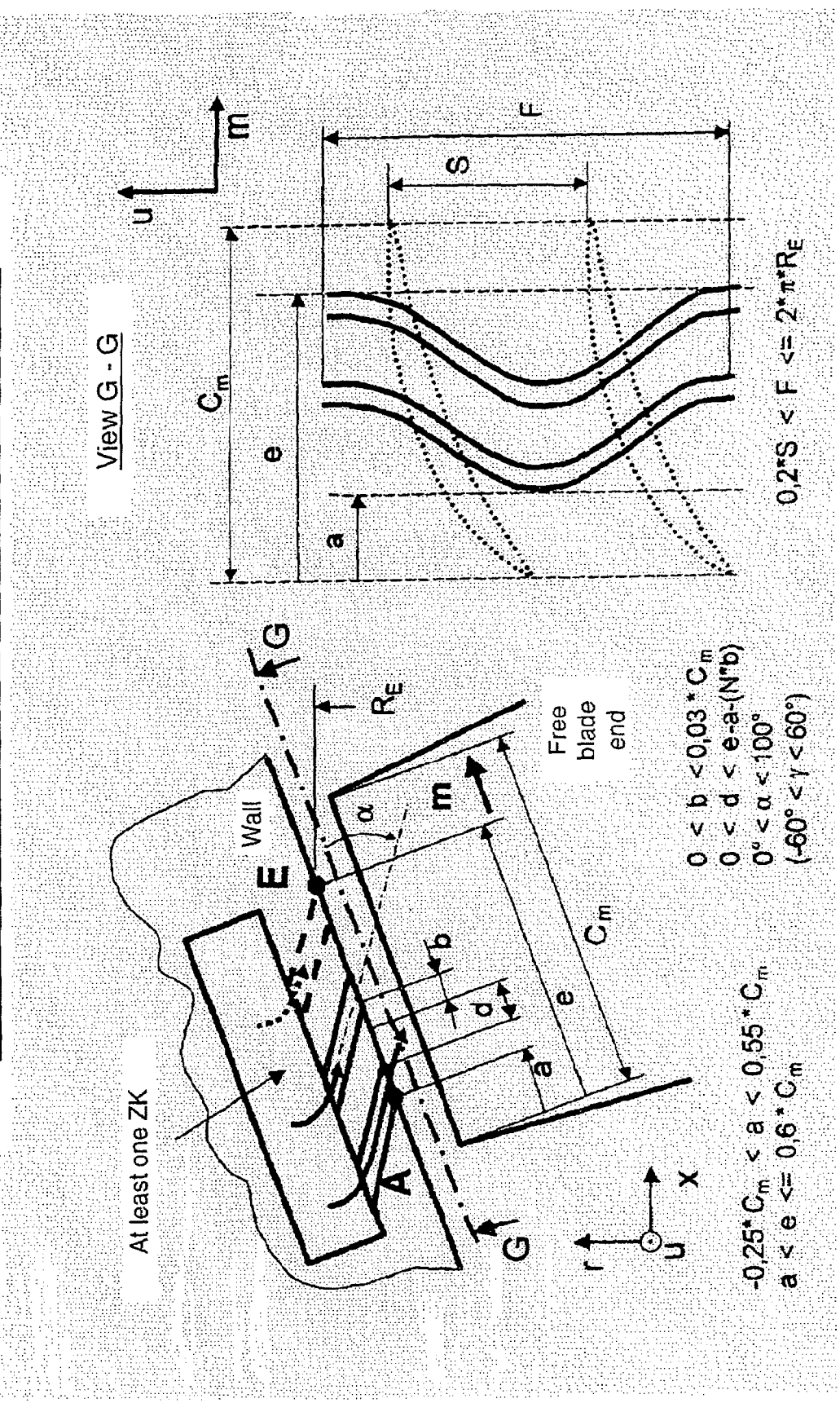
Figure 29:
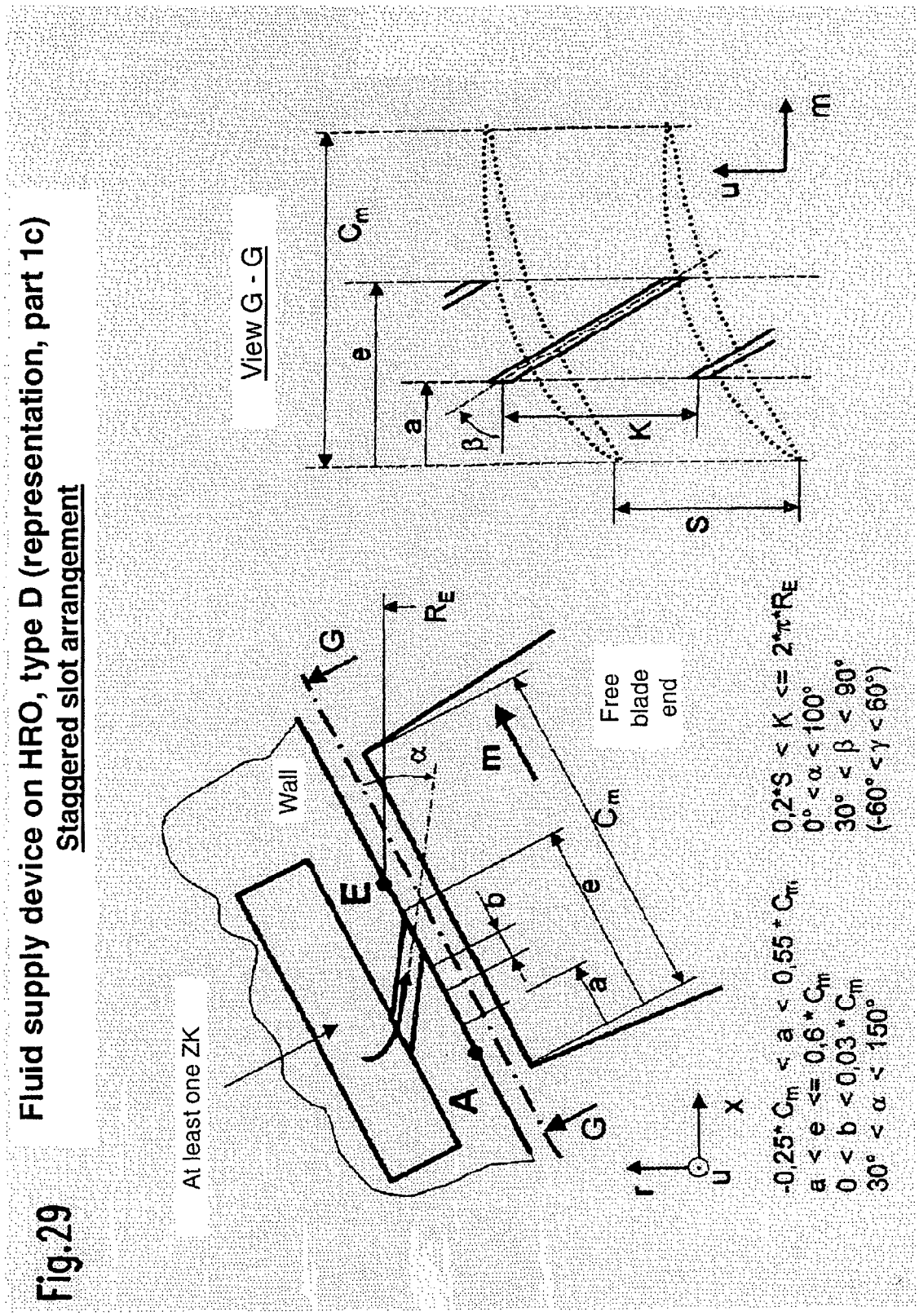
Figure 30:
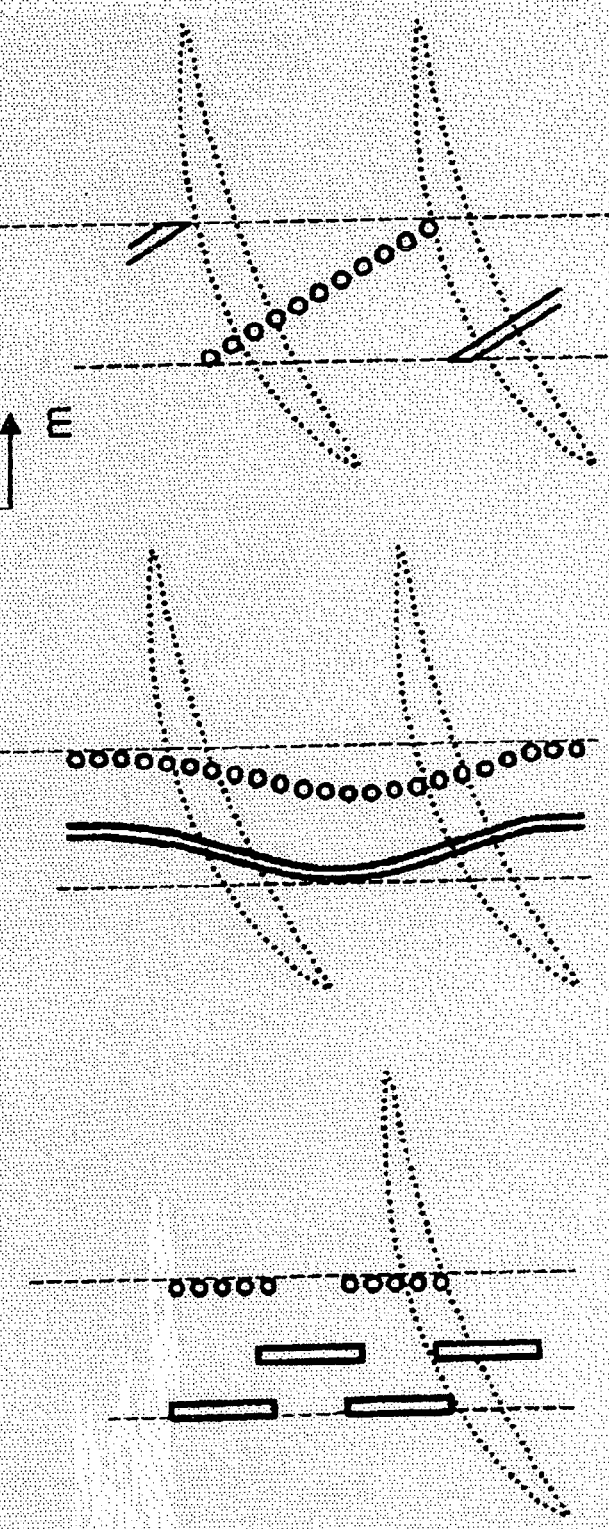

FIG. 27 shows a fluid supply device on trailing edge and rim-near surfaces (HRO) of the type D with circumferential slot arrangement, exemplified for the case N=3. FIG. 28 illustrates a fluid supply device of the type D with curvilinear slot arrangement, exemplified for the case N=2. FIG. 29 shows a fluid supply device of the type D with staggered slot arrangement, while FIG. 30 illustrates a variant of a fluid supply device of the type D in which a slot is replaced by hole rows.

Specifically, FIGS. 27 to 30 show the following details of the inventive solution:

Considering the blade row in the coordinate system (x, r) established by axial direction and radial direction, a configuration of N slots (N>=1) is located in a section of the annulus wall that is confined by the start point A and the end point E in the meridional direction. Start point A lies at a meridional distance a from the blade leading edge considered at the blade end. The distance a can extend over max. 25 percent of the meridional chord length Cm before the leading edge and over max. 55 percent of the meridional chord length Cm behind of the leading edge (−0.25*Cm<=a<=0.55*Cm). The end point E is located at a meridional distance e from the blade leading edge considered at the blade end. Distance e is larger than distance a and may extend behind the leading edge over max. 60 percent of the meridional chord length Cm (a<e<=0.6*Cm).

The slots have the width b, which may vary between 0 and 3 percent of the meridional chord length Cm. The following applies for the distance d by which the slots are separated from each other:

0<d<e−a−(N*b).

The extension of a slot may be interrupted in the circumferential direction u by a certain amount. This applies to slots that extend purely circumferentially and to slots that extend obliquely (i.e. with a meridional direction component). The circumferential length V of individual interruptions and the circumferential length U of individual, remaining slot sections can vary along the extension of the slot, but the sums of the remaining slot lengths and of the interruption lengths must have a relation of less than 50 (total U/total V<50). The slots have square, chamfered or rounded surface edges. They are square or have a round (oblong-hole style) termination at their ends. The slots extend vertically or obliquely to the annulus surface, through the wall material, into a supply chamber ZK, during which they take a straight or curved course. Looking at the meridional plane (x, r), the slots are inclined against the meridional flow direction m by 0 to 100° (0°<alpha<100°). In the circumferential direction the slots are inclined against the radial direction r by −60° to 60° during their total course (−60°<gamma<60°). FIG. 27 shows the case of N=3 interrupted slots with purely circumferential orientation.

In a special form, cf. FIG. 28, the location of the slots in meridional flow direction changes periodically along the circumference. The distance F between two adjacent positions, at which the slot (including any interruption sections according to the above specification) has the same meridional coordinate, is here defined by the blade pitch S measured at the blade end and the circumferential length established with the circular constant PI and the end point radius RE (0.2*S<F<=2*PI*RE). This includes, in particular, a slot configuration in which the extension (circumferential and meridional coordinate) of individual slots, including their interruption sections, is defined by an oblique conic section through the casing or hub contour, respectively. The slots extend vertically or obliquely to the annulus surface, through the wall material, into a supply chamber ZK, during which they take a straight or curved course. Looking at the meridional plane (x, r), the slots, also in this case, are inclined against the meridional flow direction m by 0 to 100° (0°<alpha<100°). If interruption sections exist, the slots in the circumferential direction are inclined against the radial direction r by −60° to 60° during their total course (−60°<gamma<60°). FIG. 28 shows the case of N=2 non-interrupted slots of the curvilinear type.

In another special form, cf. FIG. 29, the extension of the slot is interrupted periodically and the slot sections are staggered. In the plane established by the meridional and the circumferential directions, the slot sections are inclined against the meridional flow direction by the angle beta, which may range between 30° and 90° (30°<beta<90°). Here, the slot section need not be straight, but can be simply or multiply curved. The pitch K between two slot sections is defined by the blade pitch S measured at the blade end and the circumferential length calculated from the circular constant PI and the end point radius RE (0.2*S<K<=2*PI*RE). Looking at the meridional plane (x, r), the slots, also in this case, are inclined against the meridional flow direction m by 0 to 100° (0°<alpha<100°). In the circumferential direction the slots are inclined against the radial direction r by −60° to 60° during their total course (−60°<gamma<60°). Under specific conditions, a distinct torsioning of the slots may exist, as a result of which the ranges of alpha and gamma are partly or fully exhausted already along a section of the slot.

Alternatively, at least one slot section of the overall configuration may be replaced by a hole row, cf. FIG. 30. The hole diameter is subject to the same constraints as the slot width b.

Figure 31:
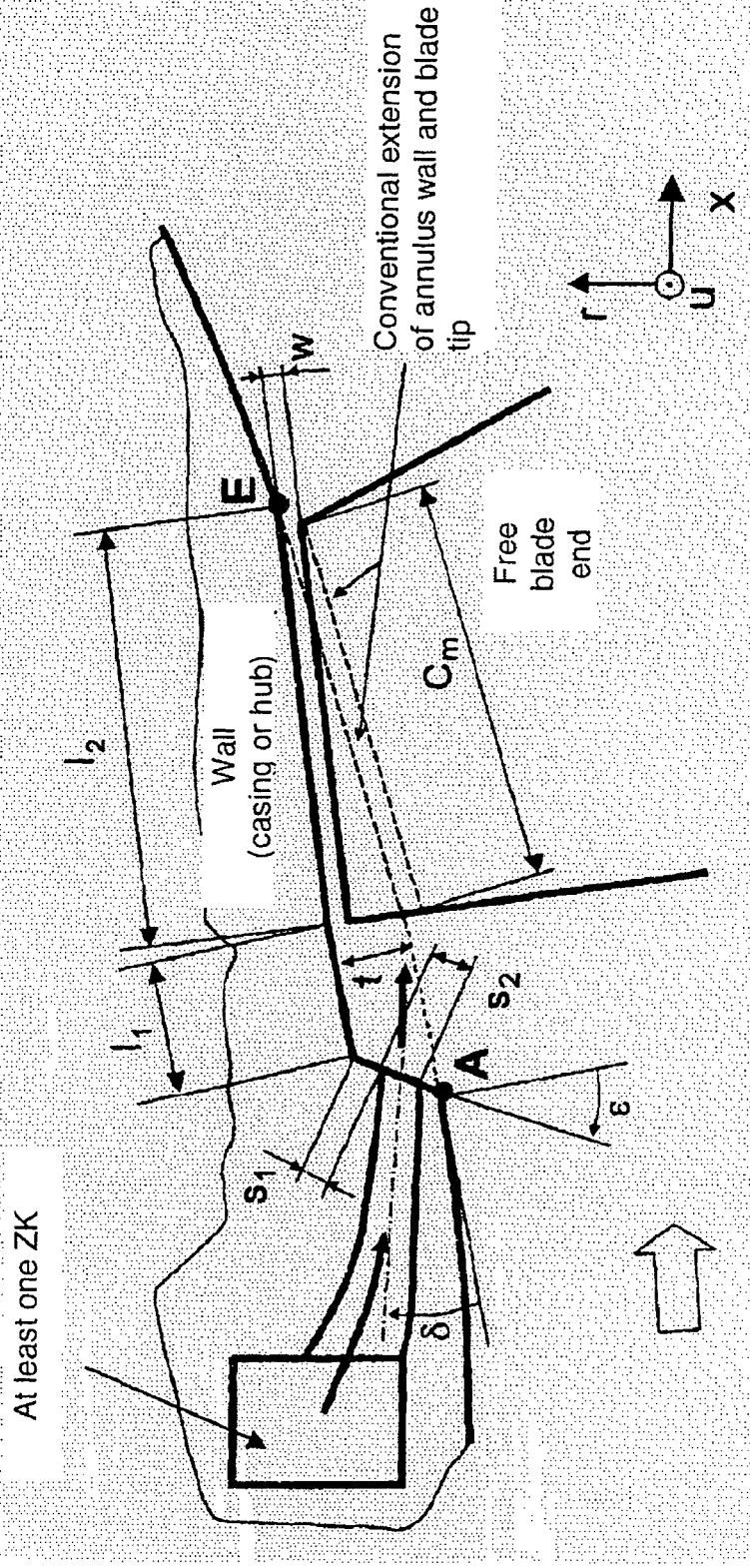
Figure 32:
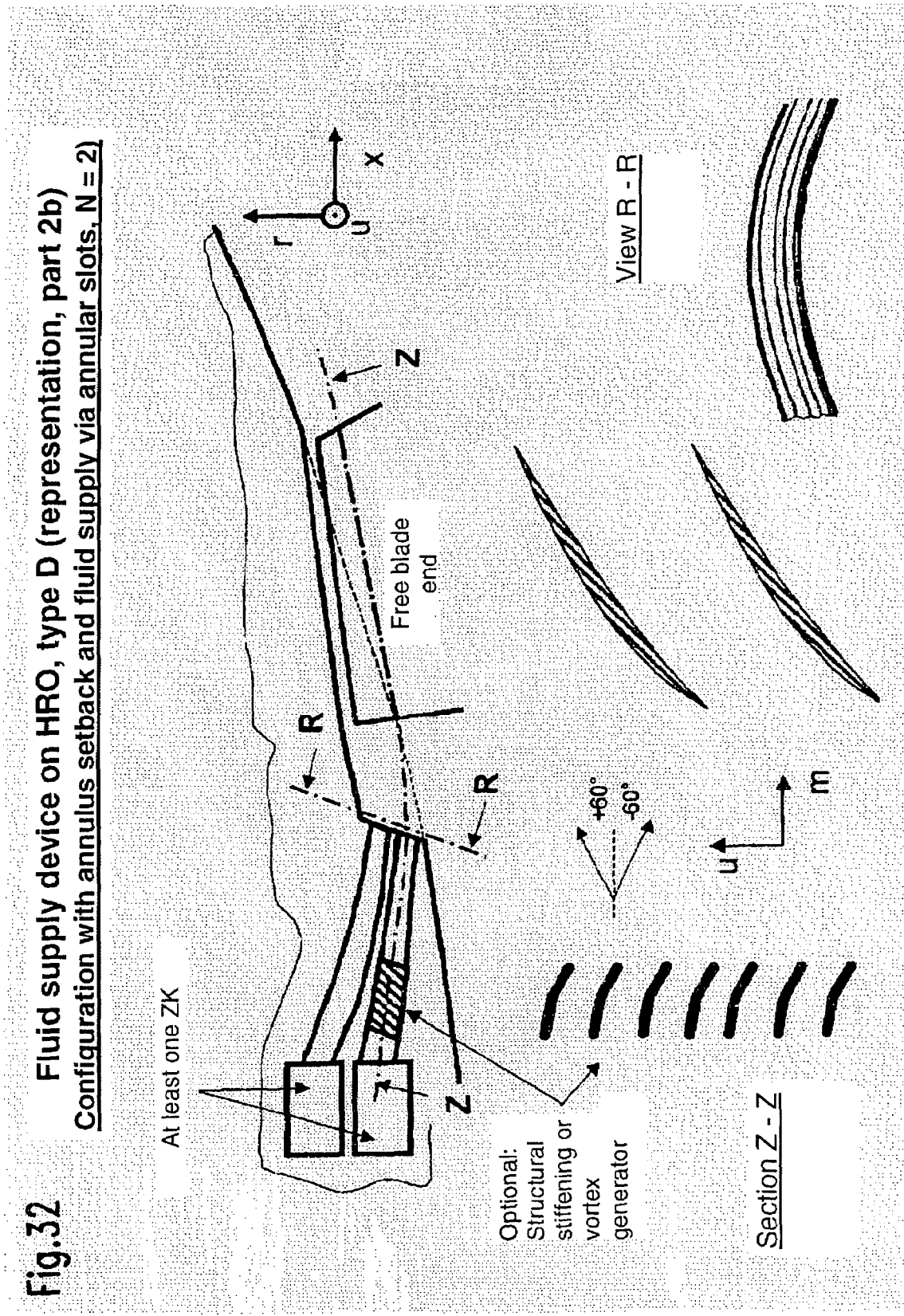
Figure 33:
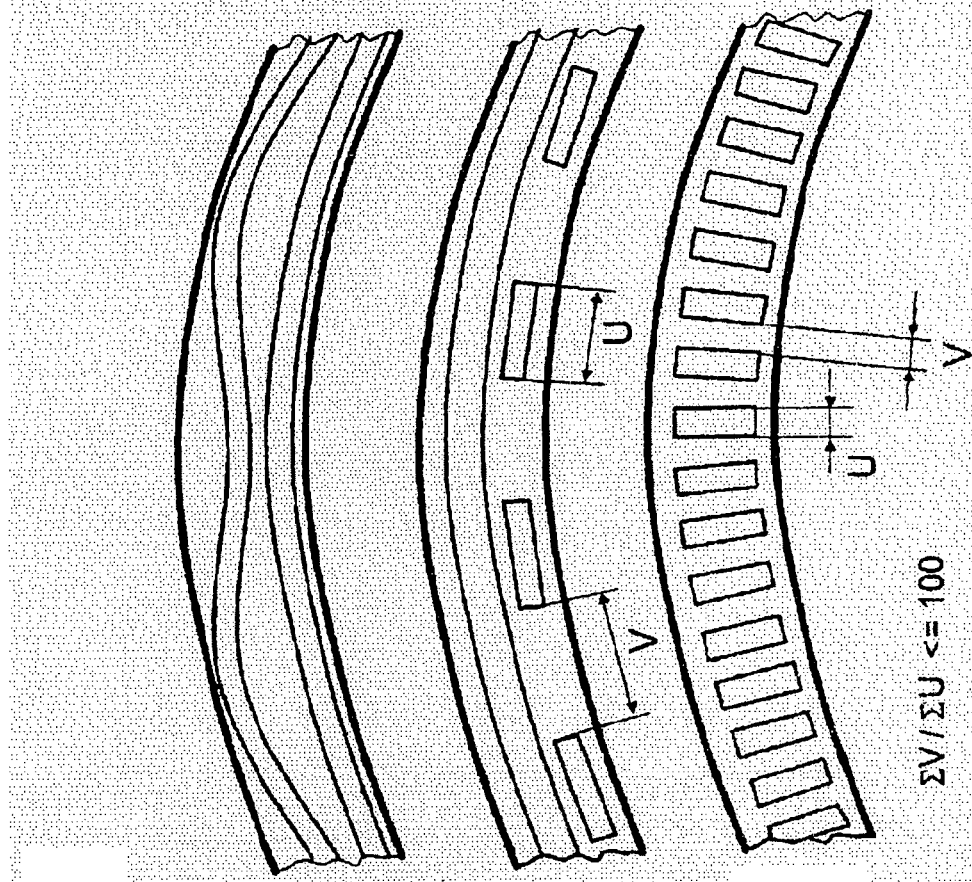
Figure 34:
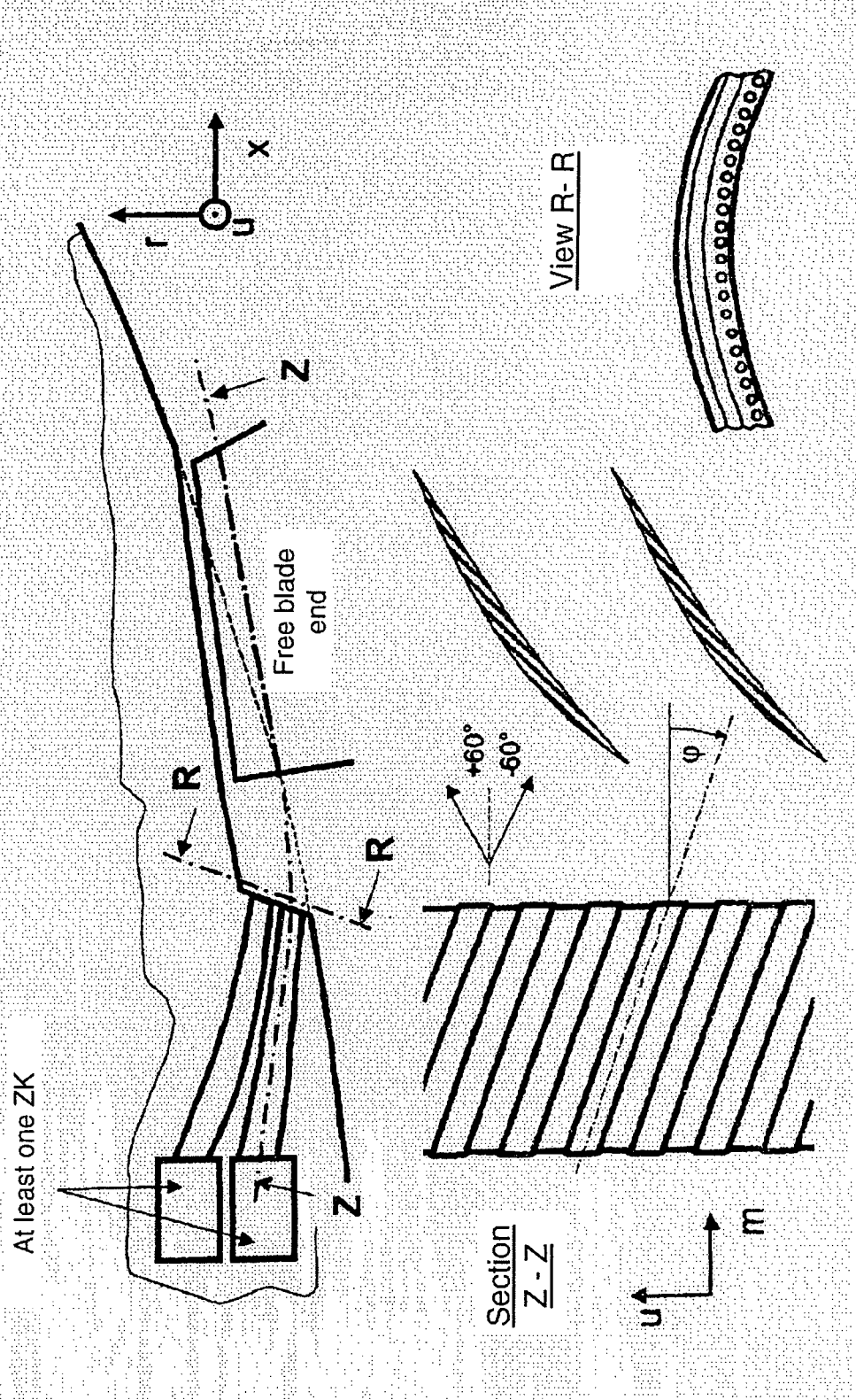

FIG. 31 shows a fluid supply device on trailing edge and rim-near surfaces (HRO) of the type D with a circumferential slot arrangement at the flank of an annulus setback, as exemplified for the case N=1. FIG. 32 illustrates a fluid supply device of the type D at the flank of an annulus setback for the case N=2 with a vortex generator provided in at least one of the existing annular slots. FIG. 33 shows the design variant of a fluid supply device of the type D at the flank of an annulus setback in which an annular slot is replaced by a curvilinear slot or different types of short-slot rows. FIG. 34 shows a fluid supply device of the type D at the flank of an annulus setback in which a slot is replaced by a hole row.

Specifically, FIGS. 31 to 34 show the following details of the inventive solution:

Considering the blade row in the coordinate system (x, r) established by axial direction and radial direction, see FIG. 31, a configuration of N slots (N>=1) is located, in accordance with the present invention, on the flank of an annulus setback outside the bladed area of a blade row with free blade ends. The setback starts upstream of the blade leading edge (point A) at max. 35 percent of the meridional chord length (0.35*Cm) measured at the blade tip and ends downstream of the leading edge (point E). The end of the setback is characterized by a transition into the conventional, plain annulus contour. The setback end (point E) can, as shown in FIG. 31, lie downstream of the trailing edge or (other than shown in FIG. 31) can also be situated in the area of the blade, possibly causing a bent in the meridional extension of the blade tip and the radial gap. In accordance with the present invention, the depth t of the setback increases continually from the end point E to a point between the leading edge and the start point A and reaches its maximum amount at this point. Here, the setback depth t must be at least 0.3 mm and shall not exceed 20 percent of the meridional blade tip chord length (0.3 mm<=t<=0.2*Cm). Within these constraints, the contour of the setback can be adapted to the specific situation. In accordance with the present invention, the setback contour made up of three straight-line lengths as shown in FIG. 31 would provide a particularly effective and economical variant. Here, the flank of the setback and the annulus wall normal include an angle epsilon at point A (−30°<=epsilon<=60°). Downstream of the flank, the setback depth t remains approximately constant over the length l1 which, at the most, reaches to the blade leading edge. At a point upstream of or at the leading edge, length l1 is followed by length l2 which extends up to point E or downstream of the trailing edge. An annular slot (slot in axially symmetrical arrangement) is provided on the flank from which fluid is supplied into the main flow path. The orientation of the annular slot and, thus, the discharge direction is inclined against the tangent to the annulus contour at start point A by the angle delta (−45°<=delta<=45°). Distance s1 between annular slot and contour length l1 is less than 3 radial gap widths (s1<3*w). For width s2 of the annular slot the following applies: s2<t-s1.

In an alternative form, at least one means for structural reinforcement and/or for the generation of a flow component in circumferential direction can be provided in at least one of the N annular slots, see FIG. 32. Particularly favorable are vortex generators that produce a peripheral flow angle in the range of −60° to 60° to the meridional direction at the slot exit to the main flow path.

In another alternative form, a curvilinear slot or a row of short slots can replace at least one annular slot. This is shown in FIG. 33 in the view R-R known from FIGS. 31 and 32. The extension of a slot (also a curvilinear slot) can be interrupted by a certain amount to produce a short-slot row. The circumferential length V of individual interruptions and the circumferential length U of individual, remaining slot sections can vary along the extension of the slot, as exemplified in FIG. 33 for two simple configurations of short slots, but the sums of the remaining slot lengths and of the interruption lengths must have a relation of less than 100 (total U/total V<100). For this, a minimum number of 2 interruptions has been provided. The slots have square, chamfered or rounded surface edges. They are square or have a round (oblong-hole style) termination at their ends. The slots extend vertically or obliquely to the annulus surface, through the wall material, into a supply chamber ZK, during which they take a straight or curved course.

Alternatively, at least one slot section of the overall configuration may be replaced by a hole row. This is shown in FIG. 34 for the case of the lower annular slot of a configuration with N=2 annular slots. The hole diameter is subject to the same constraints as the slot width s2.

FIGS. 35 to 40 show examples of the inventive fluid supply device on trailing edge and rim-near surfaces (HRO) of the type E on which slots, round openings or functionally similar substitutes are provided on the blade tip. Slots, round openings or substitutes can be allocated to different blade chambers.

Figure 35:
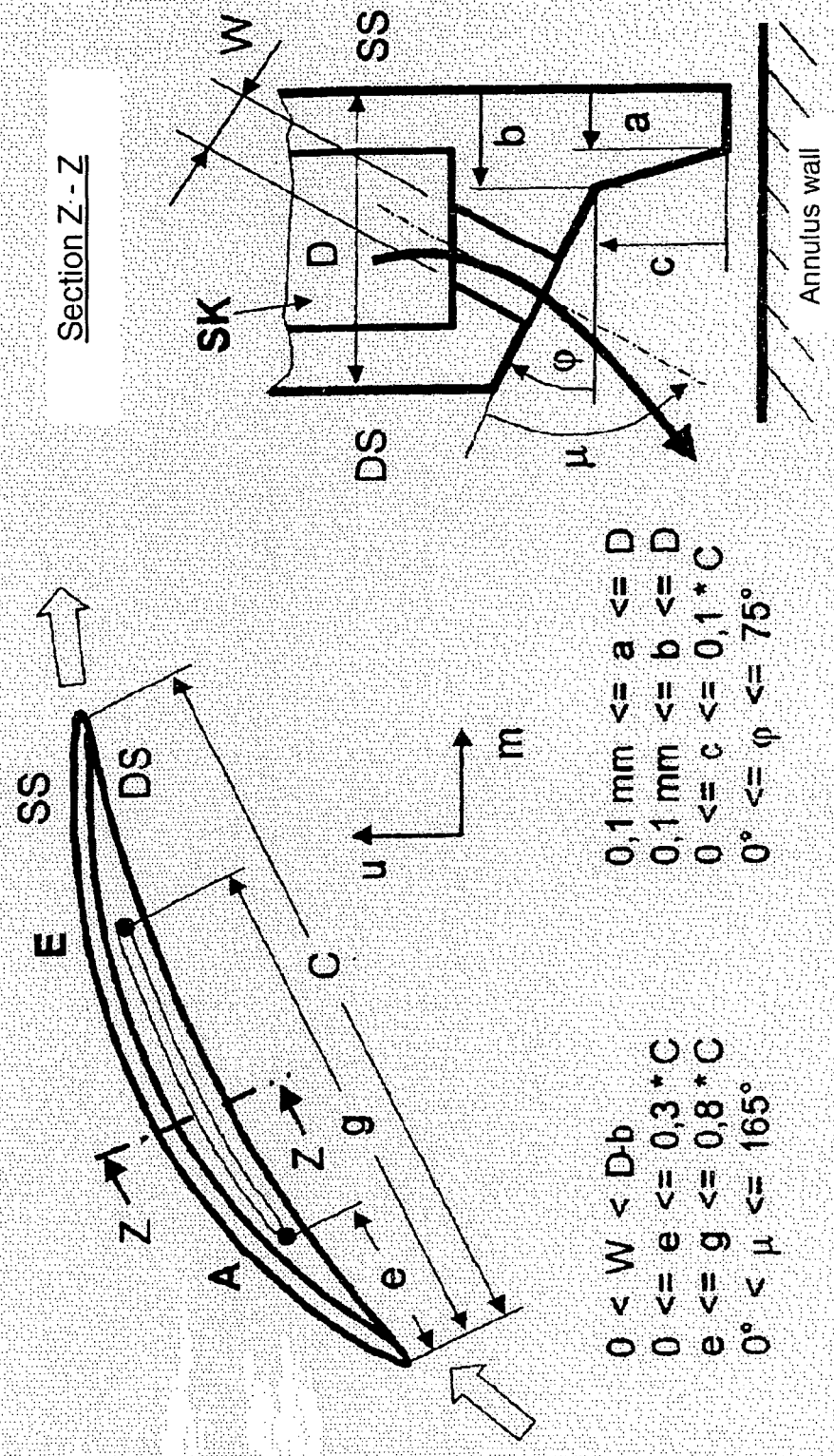
FIGS. 35 to 40 show variants of a fluid supply device in accordance with the present invention on trailing edge and rim-near surfaces (HRO) of the type E.
Figure 36:
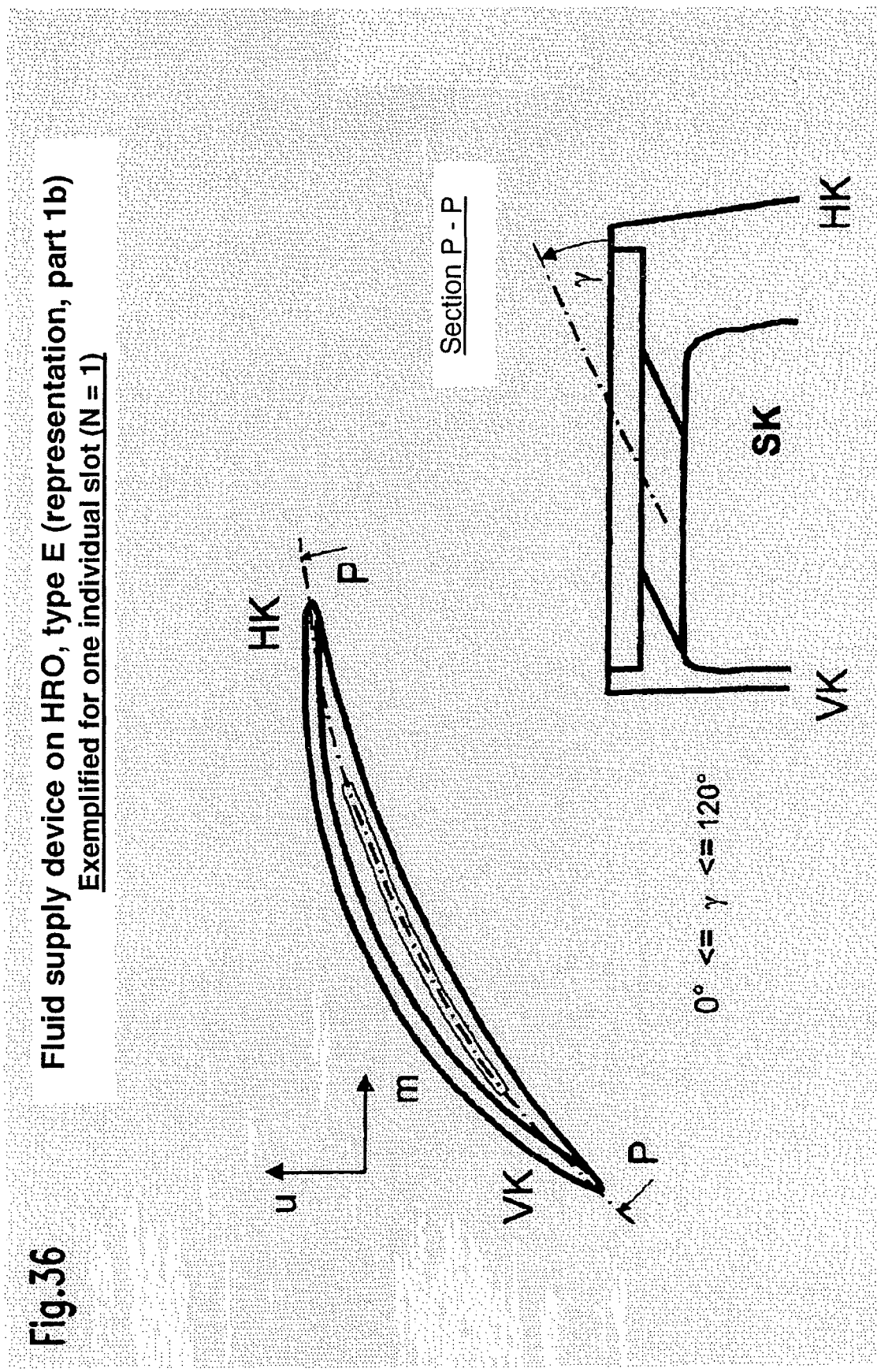
Figure 37:
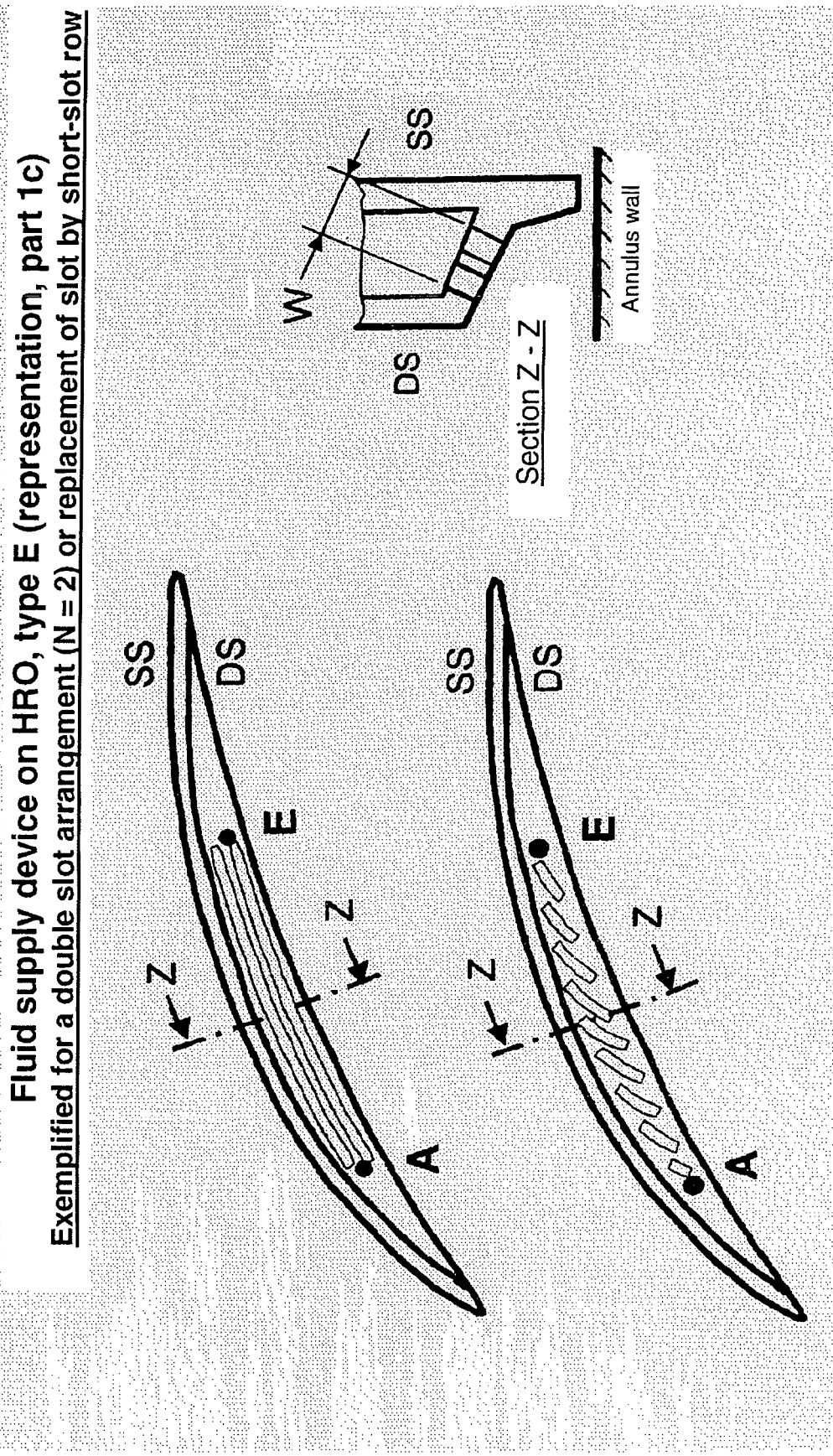
Figure 38:
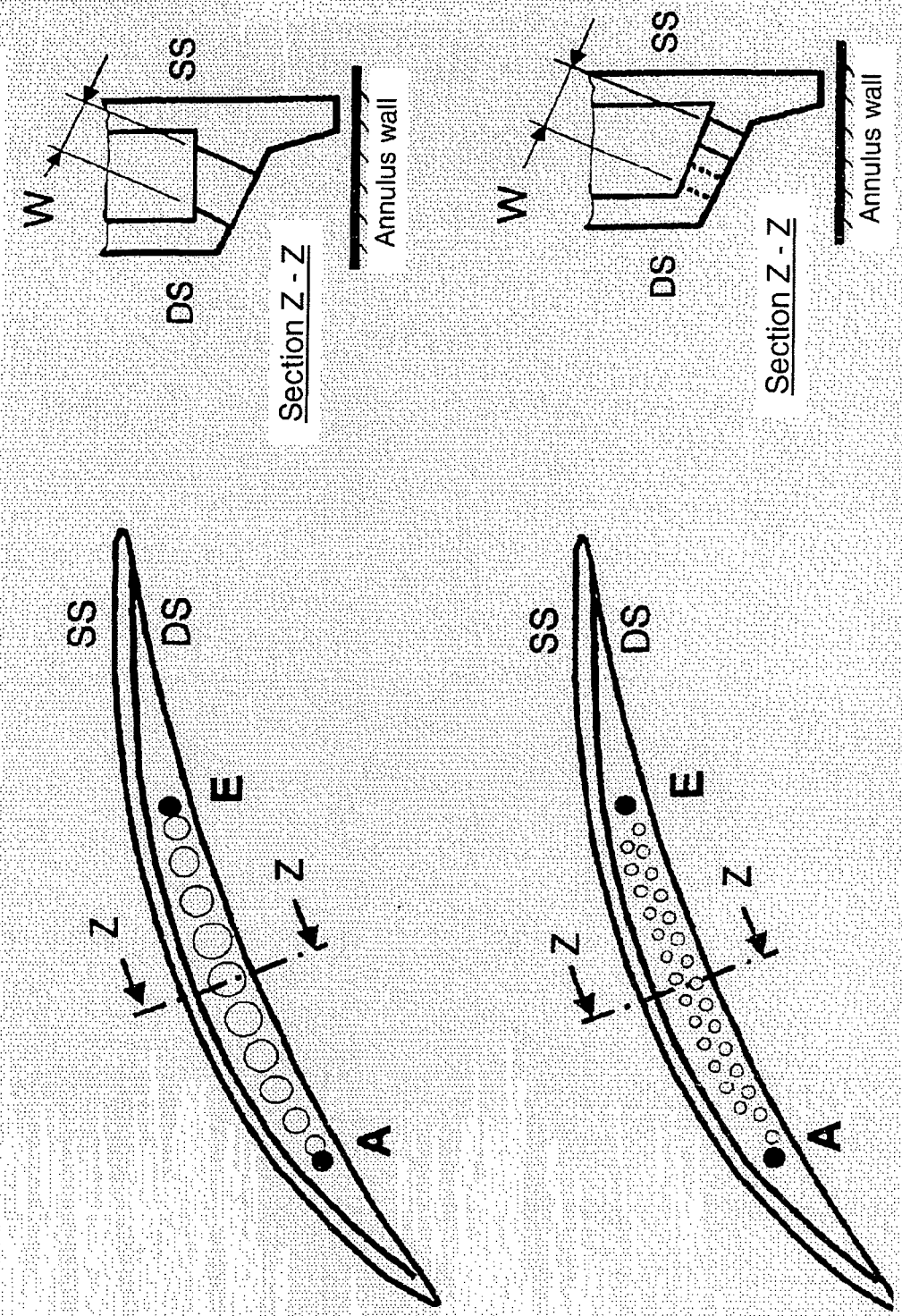

FIGS. 35 and 36 here show a fluid supply device on trailing edge and rim-near surfaces (HRO) of the type E with at least one slot or substitutes along the blade tip, as exemplified in this case for one slot (N=1). Further variants are illustrated in FIGS. 37 and 38.

Specifically, FIGS. 35 to 38 show the following details of the inventive solution:

Reference is made to the tip of a blade in the coordinate system (m, u) established by the meridional flow direction and the circumferential direction. The blade tip is designed either conventionally (approximately rectangular) or provided with a step whose specific form is defined by the quantities a, b, c and phi. The step frontal width a is at least one-tenth millimeter and not more than the size of the local profile thickness D (0.1 mm<=a<=D). The step bottom width b is at least one-tenth millimeter and not more than the size of the local profile thickness D (0.1 mm<=b<=D). The step depth c is up to 10 percent of the profile chord length (0<=c<=0.1*C). The step inclination angle phi, measured against the annulus wall, will range between 0° and 75° (0°<=phi<=75°). The quantities a, b, c and phi may change within the specified limits, depending on the profile depth considered.

On the front of the blade tip, N slots (N>=1) are provided which extend along the profile. The start point A lies between the leading edge VK and a profile depth of 30 percent of the chord length C. The end point E lies between the start point A and a profile depth of 80 percent of the profile chord length C. The width W of the slot arrangement is variable and assumes as max. value the profile thickness D reduced by the step bottom width b, as applicable for the respective profile depth (0<W<D−b). The slots have square, chamfered or rounded surface edges. They are square or have a round (oblong-hole style) termination at the start and at the end point. In a vertical view to the profile depth direction (section Z—Z) a slot extends vertically or obliquely at the angle my measured to the blade tip surface, through the wall material into a blade chamber SK (0°<=my<=165°).

In a longitudinal view to the profile depth direction (section P-P), a slot extends vertically or obliquely at the angle gamma measured to the blade tip surface, through the wall material into a blade chamber SK (0°<=gamma<=120°).

In a modified form—with the same provisions applying to the positioning and the extension on the blade tip as well as the condition of the surface edges and the orientation in the blade tip wall—the slot is replaced by a formation of several, straight or curved slots with a maximum width W of the slot configuration of 0<W<D−b.

In a modified form—with the same provisions applying to the positioning and the extension along the blade tip as well as the condition of the surface edges and the orientation in the blade tip wall—at least one slot is replaced by a formation of several holes.

Figure 39:
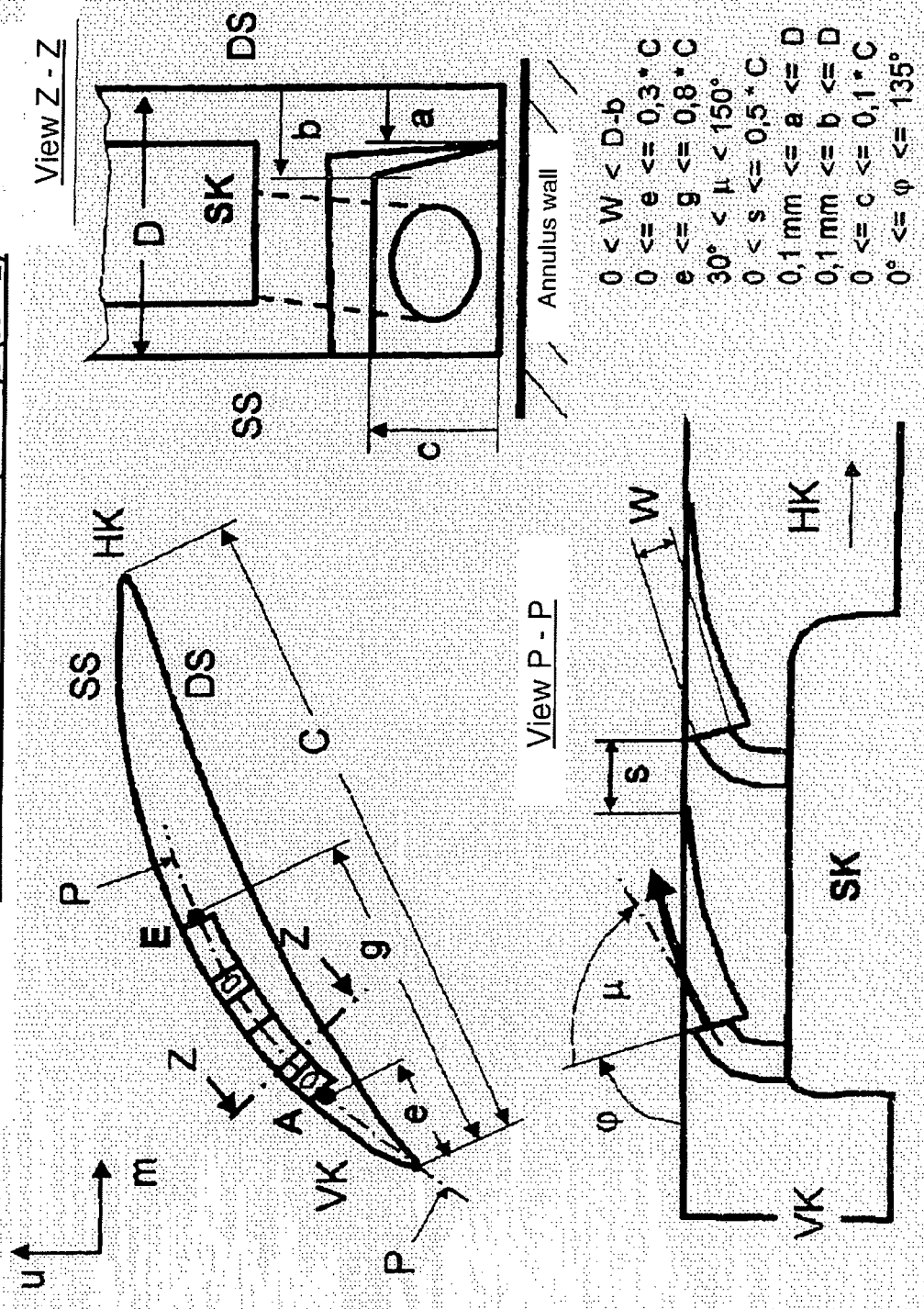

FIG. 39 shows a fluid supply device on trailing edge and rim-near surfaces (HRO) of the type E with at least one round opening provided in a recess, as exemplified here for the case of two round openings (N=2). Further variants with substitutes are shown in FIG. 40.

Figure 40:
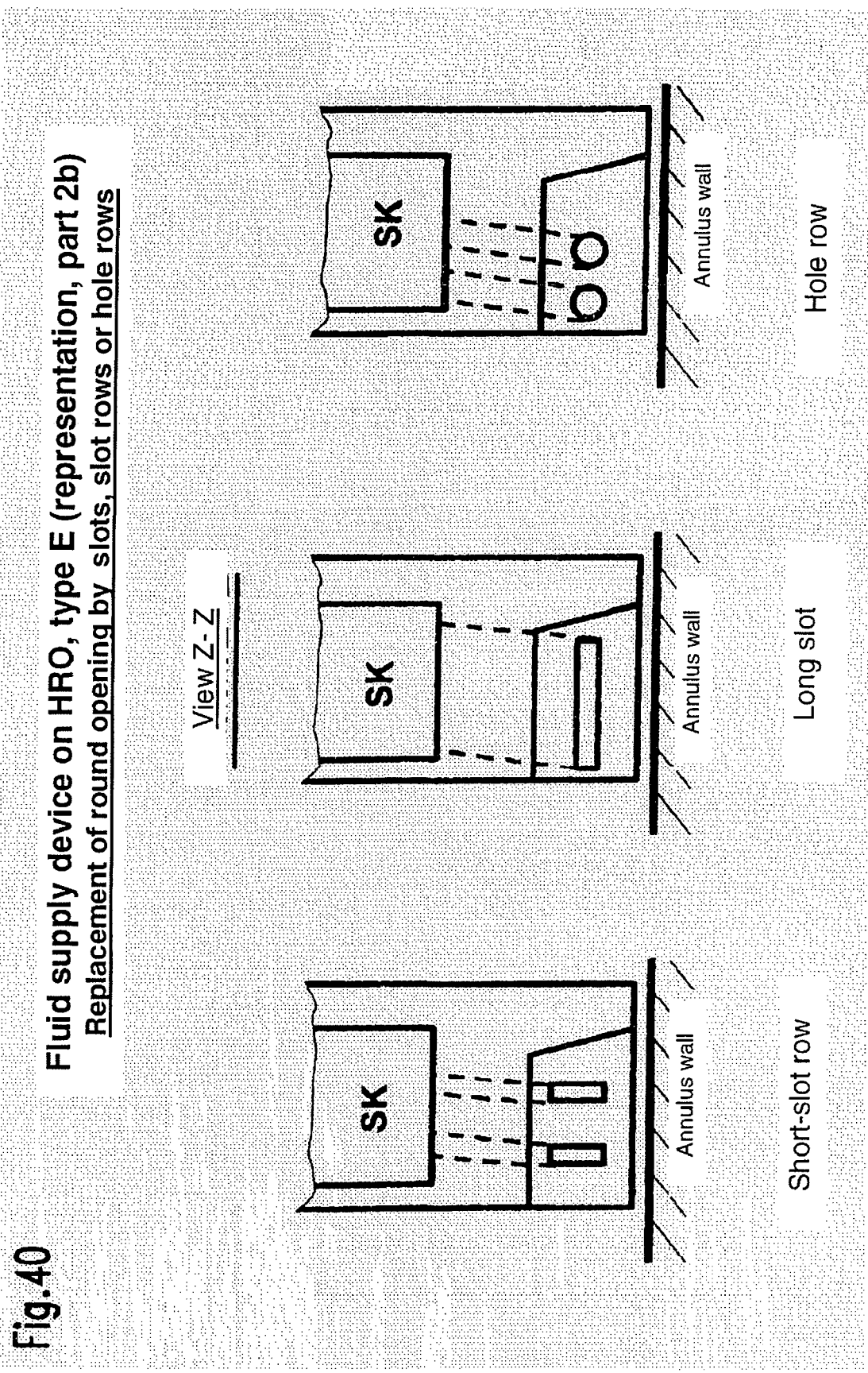

Specifically, FIGS. 39 and 40 show the following details of the inventive solution:

Reference is made to the tip of a blade in the coordinate system (m, u) established by the meridional flow direction and the circumferential direction. The blade tip is designed either conventionally (approximately rectangular) or provided locally with at least one step-type recess whose specific form is defined by the quantities a, b and c. The step frontal width a is at least one-tenth millimeter and not more than the size of the local profile thickness D (0.1 mm<=a<=D). The step bottom width b is at least one-tenth millimeter and not more than the size of the local profile thickness D (0.1 mm<=b<=D). The step depth c is up to 10 percent of the profile chord length (0<=c<=0.1*C). The quantities a, b and c may change within the specified limits, depending on the profile depth considered.

The recess is provided in the blade tip at the flank angle phi measured to the blade top edge (0°<=phi<=135°). From the deepest point, the recess extends with constantly decreasing depth in the direction of the profile depth to finally end at the blade tip surface. After a free distance s, a further recess can be provided (0<=s<=0.5*C). The entire configuration of recesses reaches from start point A to end point E. Start point A lies between the leading edge VK and a profile depth of 30 percent of the chord length C. End point E lies between the start point A and a profile depth of 80 percent of the profile chord length C.

A round opening is provided at the flank of the recess inclined at the flank angle phi, with the axis of the round opening being, in turn, inclined to the flank by the angle my at the exit cross-section in profile depth direction (30°<=my<=150°). Width W of the round opening is variable from position to position and assumes, as max. amount, the width of the recess (0<W<D−b). The round opening has square, chamfered or rounded surface edges.

In a modified form—with the same provisions applying to the positioning and the extension on the blade tip as well as the condition of the surface edges and the orientation in the blade tip wall—one round opening is replaced by a row of holes or at least a slot, whose start and end point may be square or have a round (oblong-hole style) termination.

Figure 41:
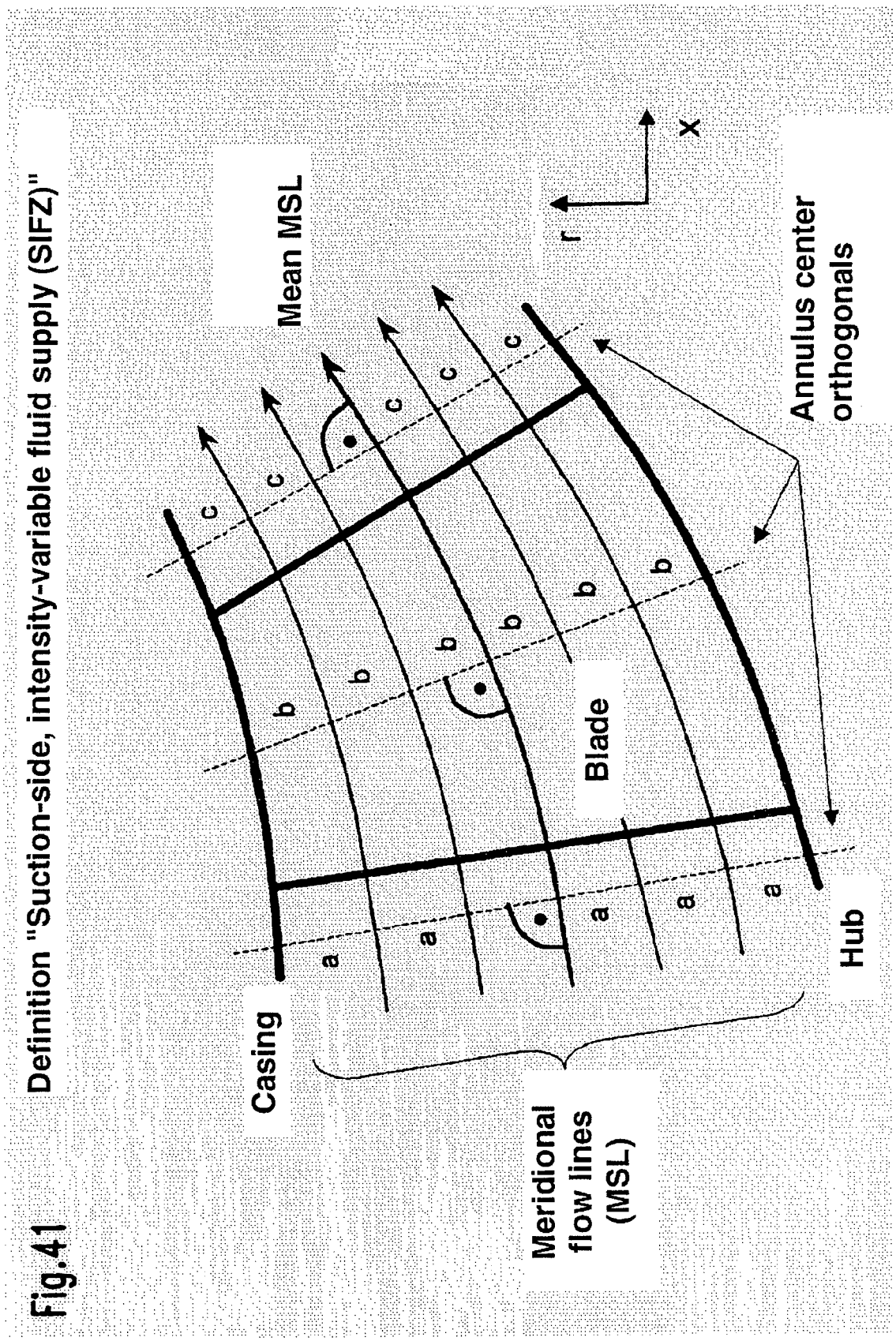
FIGS. 41 to 43 show devices for suction-side, intensity-variable fluid supply (SIFZ) in accordance with the present invention.
Figure 42:
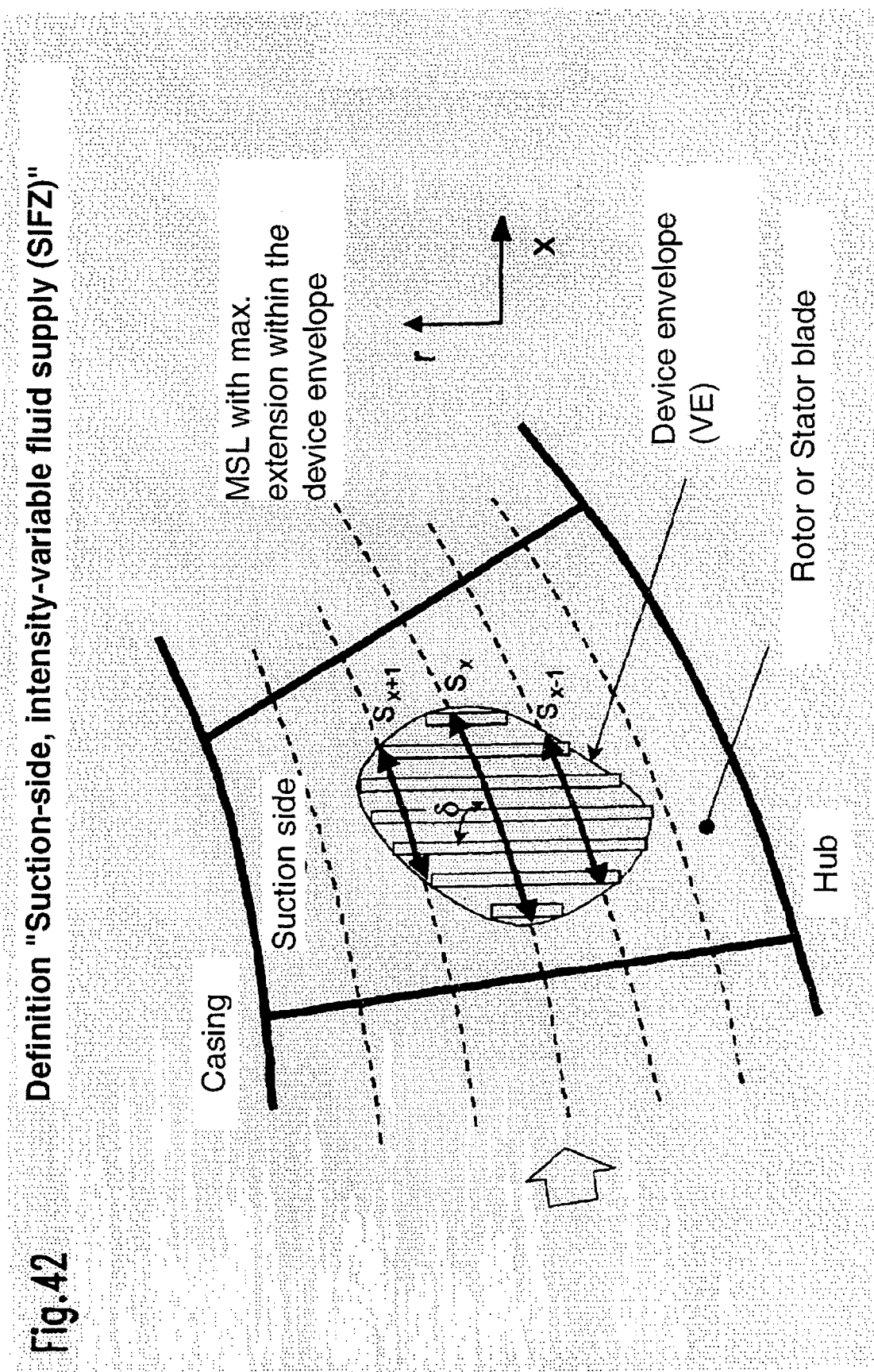
Figure 43:
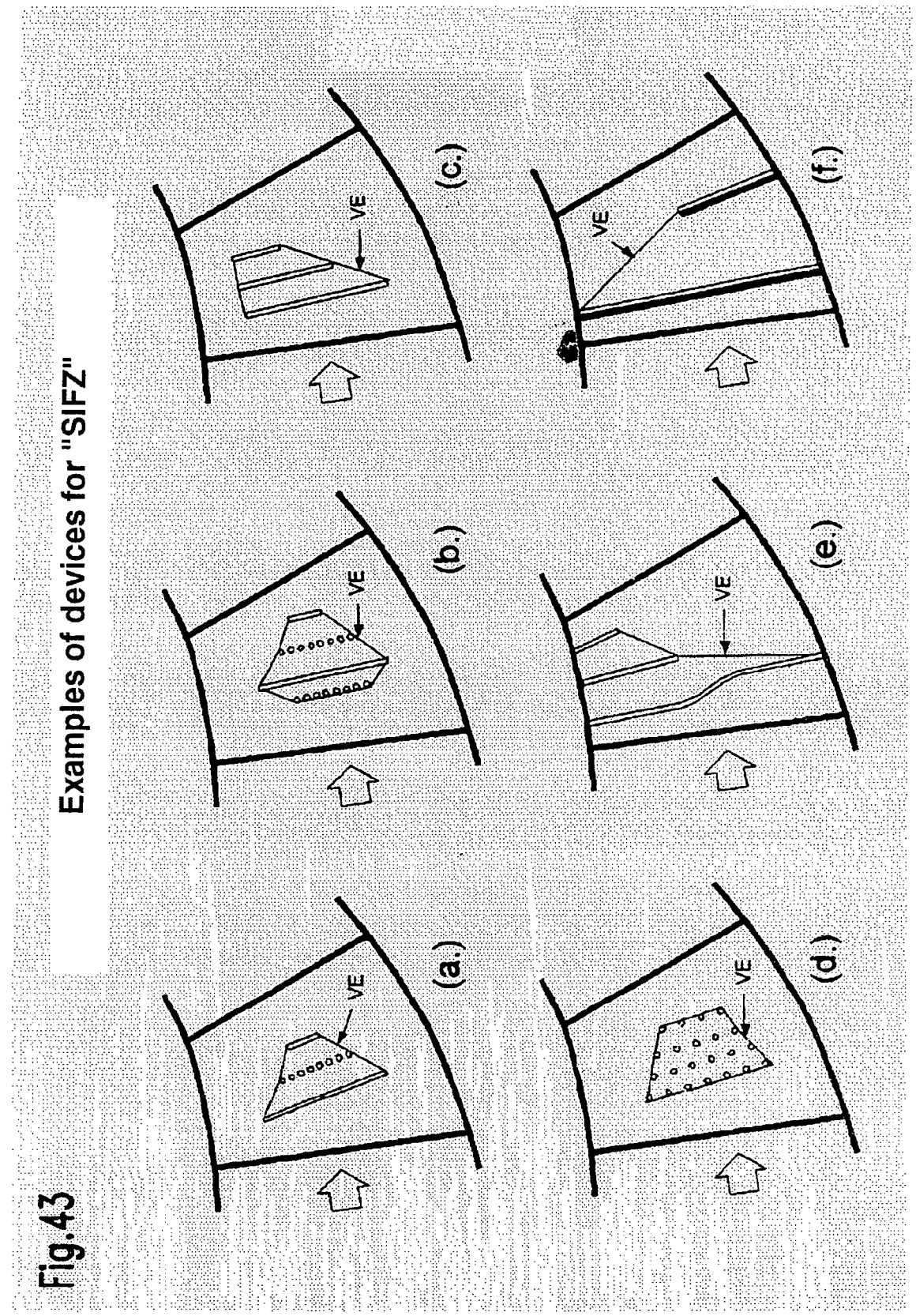

FIGS. 41 to 43 show examples of the inventive device for suction-side, intensity-variable fluid supply (SIFZ) on a rotor or stator row. Here, a formation of slots or functionally similar substitutes, respectively, is provided in aerodynamically critical zones on the blade suction side providing for variable intensity of fluid supply in meridional flow line-orthogonal direction.

Fluid supply is accomplished by a number of openings which can be allocated to different blade inner chambers.

As illustrated in FIG. 41, the following details apply:

Reference is made to a blade row of the turbomachine in the coordinate system (x, r) established by axial direction and radial direction. The definition of the device for suction-side, intensity-variable fluid supply (SIFZ) orientates by a number of meridional flow lines whose supporting points are established by an equidistant division of the annulus center orthogonal between hub and casing. This is exemplified in FIG. 41 for one annulus center orthogonal before (see equal chords a), one within (see equal chords b) and one behind (see equal chords c) the blade row.

FIG. 42 shows an embodiment of the device for suction-side, intensity-variable fluid supply (SIFZ) according to the present invention. The device comprises a combination of at least two openings (N>=2) provided within a partial area of the suction side of at least one blade of a rotor or stator row. The suction-side zone occupied by the device is defined by the envelope around all openings belonging to the combination (device envelope VE). The device is designed such that the maximum meridional extension $S(x)$ is along a certain meridional flow line.

In accordance with the present invention, the transition to adjacent meridional flow lines results in a meridional extension decreasing stepwise or continually in the direction of the casing and in the direction of the hub. Consequently, the following applies from flow line to flow line: $S(x)>=S(x+1)>= \ldots >=S(x+n)$ and/or $S(x)>=S(x-1)>= \ldots >=S(x-n)$. In the representation chosen, the device comprises a number of straight, parallel slots. However, each slot can be simply or multiply curved, have a constant or longitudinally varying width and a square or round (oblong-hole style) termination at the start and at the end point. Any inclination angle delta may exist between slot and meridional flow line. The slots extend vertically or obliquely at an angle of at least 5° to the suction-side surface through the wall material into a blade inner chamber SK.

In a modified form—with the same provisions applying to the positioning and the extension on the suction-side surface as well as the condition of the surface edges and the orientation in the suction-side wall—at least one slot is replaced by a single or multi-row hole formation.

In another modified form—with the same provisions applying to the positioning and the extension on the suction-side surface—at least one slot is designed as flat nozzle.

FIG. 43 shows different variants of a device for suction-side, intensity-variable fluid supply (SIFZ). Specifically, the examples show the following:

FIG. 43a shows a rotor or stator assembly, which features a formation of 2 slots and one hole row on the suction side to effect the meridional flow line-orthogonal variation of the fluid removal intensity in accordance with the present invention. According to the present invention, the device covers only part of the suction side and, in this example, is located in its central area. The combination of slots and holes is enclosed and identified by the device envelope VE. As can be seen, the meridional extension of the device here decreases continually in both, the direction of the casing and the direction of the hub.

FIG. 43b shows a modification of the rotor or stator assembly of FIG. 43a in accordance with the present invention, in which the slot and hole elements are arranged in a different sequence and the number of elements is increased.

FIG. 43c shows a rotor or stator assembly in accordance with the present invention which features a formation of 3 slots on the suction side. The device in this example of application is primarily orientated towards the casing. The combination of openings is enclosed and identified by the device envelope VE. Here, as illustrated, the meridional extension of the device decreases stepwise to zero in the direction of the casing and continually in the direction of the hub.

FIG. 43d shows a rotor or stator assembly which features a formation of holes on the suction side. The device in this example of application is located in the central area of the suction side. The device envelope indicates that in this example of application the meridional extension of the device decreases continually in both, the direction of the casing and the direction of the hub.

FIG. 43e shows a rotor or stator assembly which features a formation of 3 slots on the suction side. The device in this example of application is located on the casing. The device envelope indicates that the meridional extension of the device decreases continually in the direction of the hub.

FIG. 43f shows a rotor or stator assembly which features a formation of 2 flat nozzles on the suction side. The device in this example of application is located on the hub. The device envelope indicates that the meridional extension of the device decreases continually in the direction of the casing.

Figure 44:
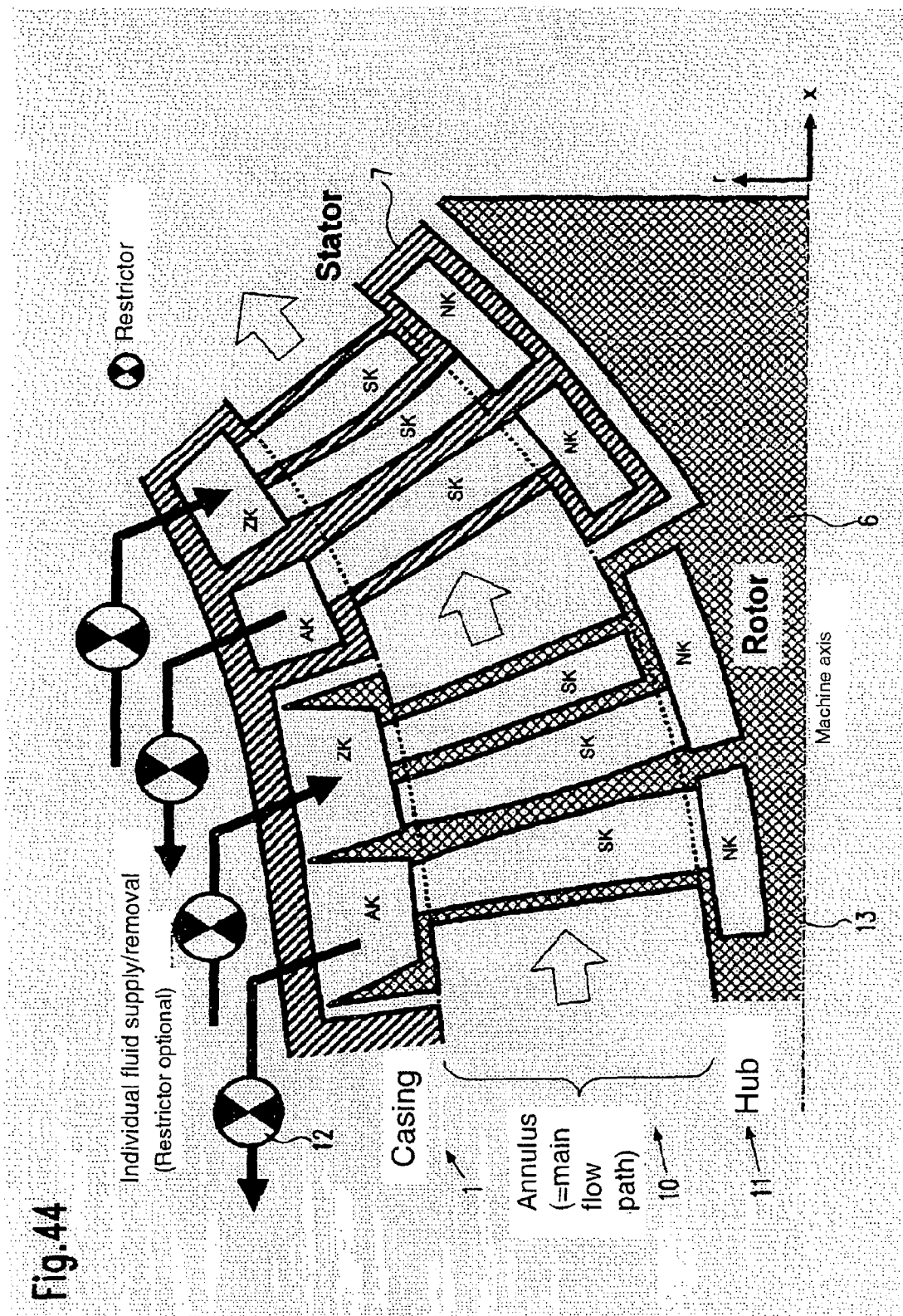
FIGS. 44 and 45 show different embodiments of chambers for simultaneous removal and supply of fluid on the same blade row (bi-functionality).
Figure 45:
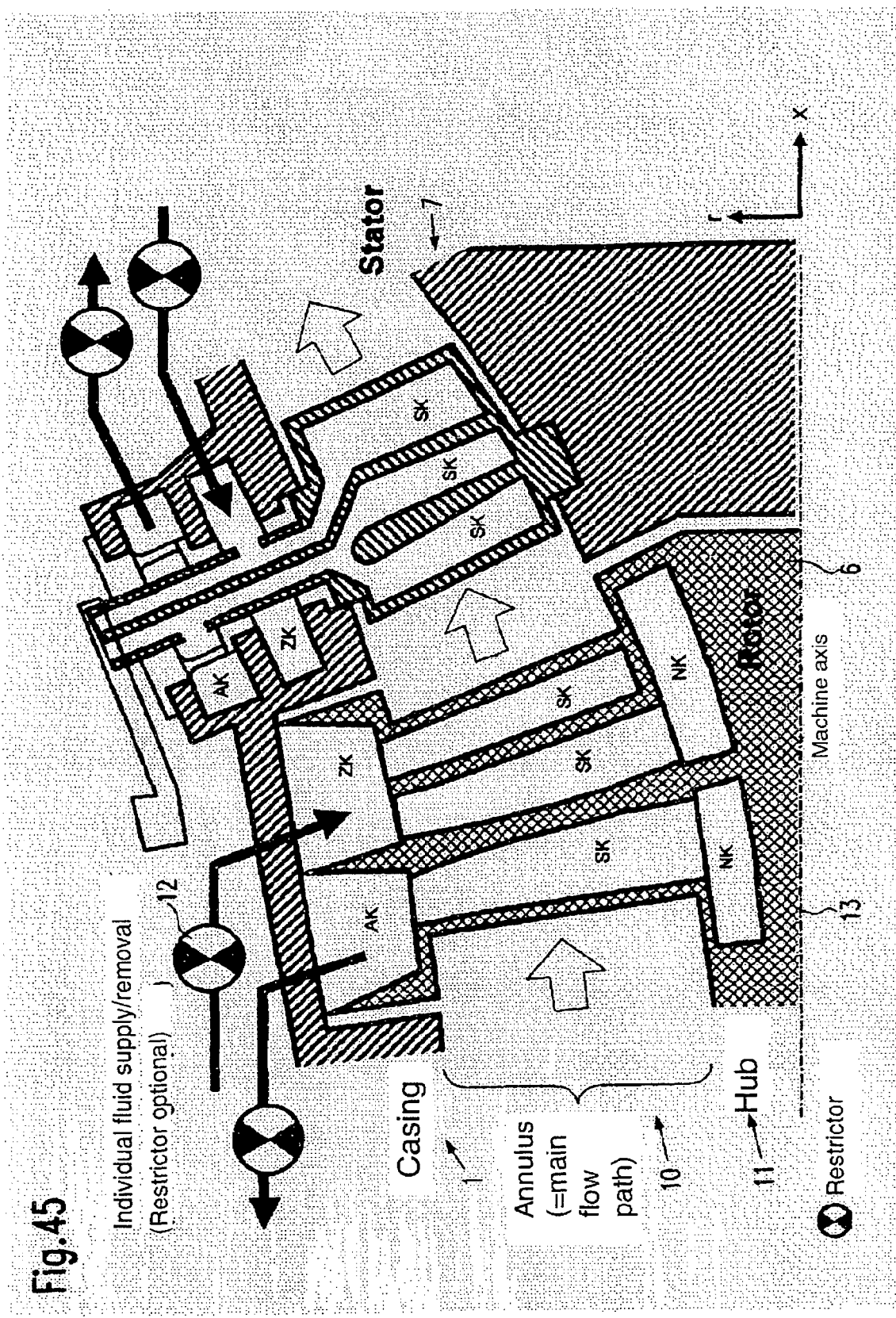

Finally, a particularly high degree of flow influencing can be obtained if one or more of the solutions for fluid supply according to the present invention are combined with measures for fluid removal in the area of the same blade row. In this case, according to the present invention, both, a chamber system for fluid feeding to the blade row from outside the annulus and subsequent fluid supply and a chamber system, which is not further to be defined, for the removal of fluid and subsequent issue from the blade row into an area outside the annulus exist on at least one blade row of the turbomachine. Fluid supply and fluid removal are here combined on one and the same blade of a rotor or stator, or are provided on different blades of the same rotor or stator row. FIGS. 44 and 45 exemplify some possible variants of blade rows with corresponding bi-functionality on one blade.

Summarizing, then, the turbomachine according to the present invention provides for a so far unequalled degree of boundary layer influencing. This can be obtained with the most different types of turbomachinery, such as blowers, compressors, pumps and fans as well as aircraft and ship propellers. Depending on the variant, the present invention provides for an aerodynamic load and a flow deflection which outperform the values obtained in the state of the art by up to 50 percent. For declared performance values of a turbomachine, the number of components installed, as compared to a conventional design, can be reduced by approximately 30 percent, with efficiency being maintained or even improved by up to 1 percent. This entails a cost reduction by 10 to 15 percent. If a novel blade concept is used in the compressor of an aircraft engine with approx. 25,000 pound thrust, a reduction of the specific fuel consumption of up to 0.5 percent and a weight saving of approx. 5 percent is achieved.

LIST OF REFERENCE NUMERALS 1 casing
2 blade
3 slot
4 slot
5 stator
6 rotor
7 stator
8 rotor blade
9 stator blade
10 annulus
11 rotor drum (hub)
12 restrictor element
13 machine axis

What is claimed is:

1. A turbomachine comprising:
   at least one rotor, with the rotor comprising several rotor blades attached to a rotating shaft,
   a casing which is passed by a fluid flowing through the rotor, and
   means for the supply of fluid for at least one blade of a blade row of the rotor on aerodynamically critical locations on at least one of a trailing edge and rim-near surfaces,
   wherein the means for the supply of fluid comprise openings in non-axially symmetrical arrangement, provided they are located outside boundaries of a bladed space, as shown in a meridional view, and that they are flush with a plain annulus wall.

2. A turbomachine in accordance with claim 1, comprising:
   at least one stator equipped with stationary stator blades which is passed by the fluid, wherein the means for the supply of fluid also supply fluid for the stator on aerodynamically critical locations on at least one of a trailing edge and rim-near surfaces.

3. A turbomachine in accordance with claim 2, wherein the means for the supply of fluid comprise openings in axially symmetrical arrangement, provided they are located outside boundaries of a bladed space, as shown in a meridional view, and situated on locations protruding into a flow path from a plain annulus wall.

4. A turbomachine in accordance with claim 2, wherein the trailing edge and rim-near surfaces are in the form of surfaces on at least one of a blade suction and pressure side of at least one of the rotor and the stator between 70 percent and 100 percent of a meridional blade chord length.

5. A turbomachine in accordance with claim 2, wherein the trailing edge and rim-near surfaces are in the form of surfaces on at least one of a blade suction side, a blade pressure side, a leading edge of at least one of the rotor and the stator, a trailing edge of at least one of the rotor and the stator, a hub between 0 percent and 25 percent of a local annulus width, and the casing between 75 percent and 100 percent of the local annulus width.

6. A turbomachine in accordance with claim 2, wherein the fluid is supplied via at least one slot.

7. A turbomachine in accordance with claim 2, wherein the fluid is supplied via at least one row of hole-type recesses.

8. A turbomachine in accordance with claim 2, wherein the fluid is supplied via at least one flat nozzle.

9. A turbomachine in accordance with claim 2, comprising, simultaneously with the means for fluid supply, means for fluid removal positioned at least one of before and within a bladed space of same blade areas of the rotor and the stator.

10. A turbomachine in accordance with claim 1, wherein the fluid to be supplied is routed via flow paths on a periphery of an annulus.

11. A turbomachine in accordance with claim 1, wherein the fluid to be supplied is routed within at least one of: the blades and components surrounding the blades.

12. A turbomachine in accordance with claim 11, wherein the fluid is supplied in free flow.

13. A turbomachine in accordance with claim 11, wherein the fluid is supplied to an annulus in an area of a respective blade row by means of at least one restrictor element arranged in the flow path.

14. A turbomachine in accordance with claim 13, wherein the fluid is supplied by a foreign source.

15. A turbomachine in accordance with claim 13, wherein the fluid is supplied from at least one of: locations of the turbomachine and an overall system including the turbomachine.

16. A turbomachine comprising:
    at least one rotor, with the rotor comprising several rotor blades attached to a rotating shaft,
    a casing which is passed by a fluid flowing through the rotor, and
    means for the supply of fluid for at least one blade of a blade row of the rotor on aerodynamically critical locations on at least one of a trailing edge and rim-near surfaces,
    wherein the trailing edge and rim-near surfaces are in the form of surfaces on at least one of a hub and a casing contour of an annulus, with firm connection to the blade, between a trailing edge plane and a plane which is located 25 percent of a meridional blade chord length before a leading edge.

17. A turbomachine comprising:
    at least one rotor, with the rotor comprising several rotor blades attached to a rotating shaft,
    a casing which is passed by a fluid flowing through the rotor, and
    means for the supply of fluid for at least one blade of a blade row of the rotor on aerodynamically critical locations on at least one of a trailing edge and rim-near surfaces,
    wherein the trailing edge and rim-near surfaces are in the form of surfaces on at least one of a hub and a casing contour of an annulus, in an area of free blade ends, and at least one of above shroudless rotors and below shroudless stators between a trailing edge plane and a plane which is located 35 percent of a meridional blade chord length before a leading edge.

18. A turbomachine comprising:
    at least one rotor, with the rotor comprising several rotor blades attached to a rotating shaft,
    a casing which is passed by a fluid flowing through the rotor, and
    means for the supply of fluid for at least one blade of a blade row of the rotor on aerodynamically critical locations on at least one of a trailing edge and rim-near surfaces,
    wherein the trailing edge and rim-near surfaces are in the form of surfaces on the blades at their free ends facing at least one of a hub and a casing contour of an annulus.

19. A turbomachine comprising:
    at least one rotor, with the rotor comprising several rotor blades attached to a rotating shaft,
    a casing which is passed by a fluid flowing through the rotor, and
    means for the supply of fluid for at least one blade of a blade row of the rotor on aerodynamically critical locations on at least one of a trailing edge and rim-near surfaces,
    wherein the means for fluid supply are provided on at least one blade of at least one of the rotor and the stator row which are distributed on a blade suction side over a defined area in meridional flow direction.

20. A turbomachine in accordance with claim 19, wherein the means for the supply of fluid are arranged such that their meridional extension in meridional flow line-orthogonal direction decreases towards at least one annulus wall.

* * * * *